United States Patent [19]

Hirotsune et al.

[11] Patent Number: 5,709,978
[45] Date of Patent: Jan. 20, 1998

[54] SUPPERRESOLUTION READOUT THIN FILM AND INFORMATION RECORDING MEDIUM

[75] Inventors: Akemi Hirotsune, Higashimurayama; Motoyasu Terao, Nishitama-gun; Yasushi Miyauchi, Akishima, all of Japan

[73] Assignee: Hitachi, Ltd., Tokyo, Japan

[21] Appl. No.: 261,072

[22] Filed: Jun. 16, 1994

[30] Foreign Application Priority Data

Jun. 18, 1993 [JP] Japan ................. 5-147843

[51] Int. Cl.⁶ ................. G11B 7/00; G11B 7/24
[52] U.S. Cl. ................. 430/270.13; 430/270.11; 430/945; 428/64.5; 428/64.6; 369/121
[58] Field of Search ................. 430/270.13, 945, 430/270.11; 369/121; 428/64.4, 64.5, 64.6

[56] References Cited

U.S. PATENT DOCUMENTS

| | | | |
|---|---|---|---|
| 4,653,024 | 3/1987 | Young et al. | 365/113 |
| 5,153,873 | 10/1992 | Spruit et al. | 369/275.2 |
| 5,194,363 | 3/1993 | Yoshioka et al. | 430/270.13 |
| 5,221,588 | 6/1993 | Morimoto et al. | 430/270.13 |
| 5,294,523 | 3/1994 | Nagata et al. | 430/270.13 |
| 5,304,440 | 4/1994 | Ono et al. | 430/270.13 |

FOREIGN PATENT DOCUMENTS

| | | | |
|---|---|---|---|
| 1-211249 | 8/1989 | Japan | 430/270.13 |
| 3-197173 | 8/1991 | Japan | 430/270.13 |
| 3-292632 | 12/1991 | Japan | |
| 4-228127 | 8/1992 | Japan | |
| 5-73961 | 3/1993 | Japan | |

OTHER PUBLICATIONS

Abstract of JP1-2773338, "Optical Recording Medium", Fujimori et al. (Nov./1989).

Takeo OHTA, et al. "Million Cycle Overwritable Phase Change Optical Disk Media", *Optical Data Storage Topical Meeting (1989)*, SPIE vol. 1078, pp. 27-34 (English translation).

*Primary Examiner*—John A. McPherson
*Attorney, Agent, or Firm*—Pennie & Edmonds, LLP

[57] ABSTRACT

A recording film 3 of phase change type of Sb—Te—Ge system or Sb—Te—In system has at least one of lanthanoid elements and elements selected from among Ag, Ba, Co, Cr, Ni, Pt, Si, Sr, Au, Cd, Cu, Li, Mo, Mn, Zn, Al, Fe, Pb, Na, Cs, Ga, Pd, Bi, Sn, Ti, and V added thereto. A high melting point component $3b$ is precipitated in the recording film 3 to coexist with a phase change component $3a$, thereby preventing the recording film 3 from flowing and segregating during recording and erasing. The recording film 3 can be made not as recording film, but as superresolution readout thin film to mask an optical disc recorded by ruggedness, an optical disc of phase change type, and a magneto-optical disc, thereby increasing number of possible superresolution readouts to a great extent.

21 Claims, 11 Drawing Sheets

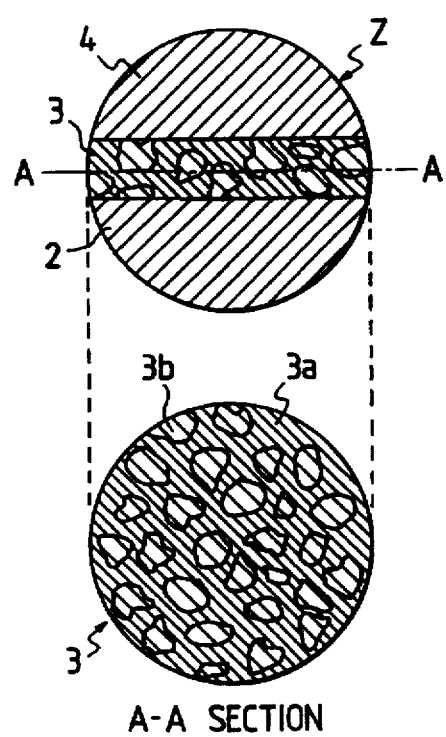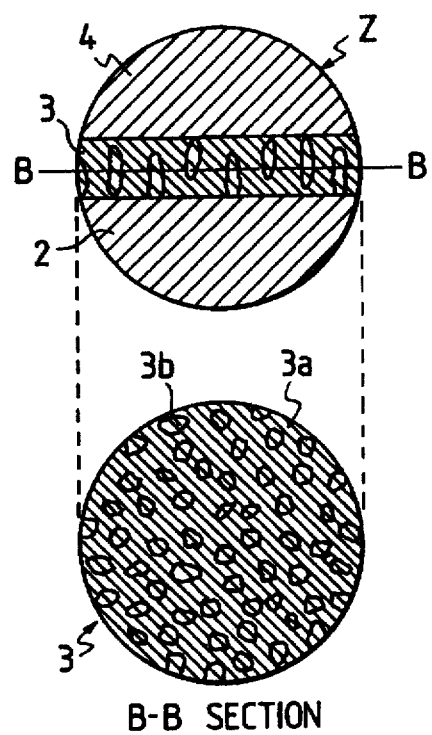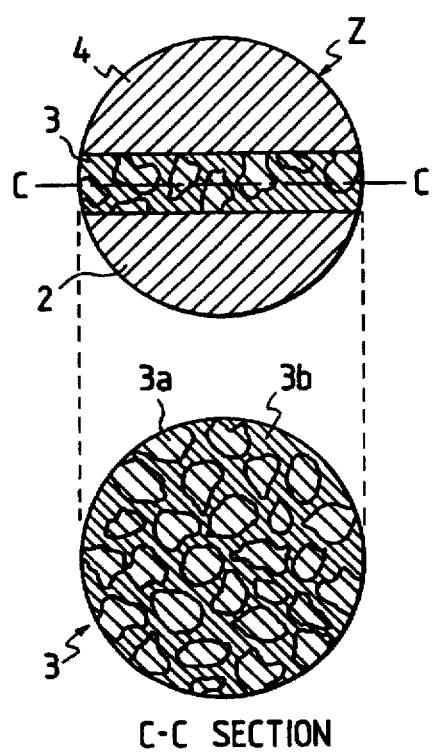

D-D SECTION

Cr=10atm %

RECORDED PIT

SUPPERRESOLUTION READOUT THIN FILM AND INFORMATION RECORDING MEDIUM

BACKGROUND OF THE INVENTION

The present invention relates to an information recording thin film, a method of its fabrication, and an information recording medium. More particularly, it concerns an information recording thin film or a superresolution readout thin film, a method of its fabrication, and an information recording medium having the information recording thin film or the superresolution readout thin film used therein that can record and reproduce information obtained by frequency-modulation of analog signals, such as video signal and audio signal, and digital information, such as computer data, facsimile signal, and digital audio signal in real time with use of energy beam, such as electron beam.

There have been many prior disclosures about principles of recording information in thin film, or recording film, by irradiation of laser beam. The known phase transition (or called the phase change) of film material, photo-darkening, and change of atomic arrangement by irradiation of laser beam do not deform the thin film virtually. They have the advantage that two disk members can be directly stuck together to obtain information recording media of double-side disc structure. The known recording film of GeSeTe system or InSbTe system has the advantage that information can be rewritten.

However, the recording films of the kinds mentioned are deteriorated in rewriting characteristics by flow of the recording film if recording is made as much times as $10^5$ at bit-position-recording or $10^4$ at bit-edge-recording. There have been proposed some methods to overcome such a disadvantage as the flow of the prior arts.

For example, the Japanese Patent Laid-Open No. 4-228127 disclosed a method of preventing the flow with the recording film made micro-cell. T. Ohta et al., "Optical Data Storage", '89 Proc. SPIE, 1078, 27 (1989), disclosed a method preventing the flow in the way that the recording film is made thinner to lower the heat capacity and makes use of increased effect of the adhesive force with the adjoining layer.

The usual optical discs can have analog information signals frequency-modulated with video signals or audio signals and digital information signals, such as computer data, facsimile signals, digital audio signals, transferred to surfaces of the substrate in the form of ruggedness. The usual optical discs also can record signals or data in real time with recording beams, such as laser beam and electron beam, on the recording thin film or the like.

The signal reproduction resolution of the usual optical discs is mostly determined in terms of a wavelength $\lambda$ of a light source of a reproduction optical system and an numeric aperture NA. The reading resolution is limited to a record mark interval of 2 NA/$\lambda$.

One of the techniques of high-density recording disclosed so far is the Japanese Patent Laid-Open No. 3-292632 in which a medium having the reflectance changed with phase change is used to reproduce the data recorded by ruggedness. Another technique is the Japanese Patent Laid-Open No. 5-73961 which has a medium of melting masking layer for reproducing the data recorded at a high density on a phase change recording film.

The term "phase changes" as used herein are construed to include not only a phase change between crystal and amorphous states, but also a phase change between melting which is a change to liquid phase and recrystallization and a phase change among crystal states as well.

The prior recording films for use as rewritable recording films of phase transition type are all involved in such problems as (1) not enough number of possible rewritings, (2) too slow crystallization speed with high number of possible rewritings, and (3) too low reproduced signal intensity with high number of possible rewritings.

Also, the technique disclosed in the Japanese Patent Laid-Open No. 3-292632 uses a $Sb_2Se_3$ film on which phase change is partially made inside a scanning spot of reading light to change the reflectance so that phase bits only in areas of high reflectance can be read. This technique uses the film of a high melting point for which a laser irradiation power has to be too high to use for an optical disc of phase change type and magneto-optical disc other than the optical disc having information recorded by phase bit. The technique also has such a disadvantage that frequent readings cause the film to flow and segregate little by little, resulting in fewer number of possible superresolution readouts.

Further, the other technique disclosed in the Japanese Patent Laid-Open No. 5-73961 uses the medium of melting masking layer on which melting is partially made inside the scanning spot of reading light to change the reflectance, thereby making smaller apparent spot size. The medium used in the technique is the melting masking layer having low melting point and low viscosity. The technique also has the disadvantage that frequent readings cause the film to flow and segregate little by little, resulting in fewer number of possible superresolution readouts.

SUMMARY OF THE INVENTION

In view of solving the foregoing problems of the prior arts, it is an object of the present invention to provide an information recording thin film, a method of its fabrication, and an information recording medium having the thin film used therein while keeping high recording and reproducing characteristics.

Another object of the present invention is to overcome the foregoing disadvantages to provide a superresolution readout thin film capable of increasing number of possible superresolution readouts in a way of preventing flow and segregation for use in an optical disc recorded by ruggedness, a phase change type optical disc, and a magneto-optical disc for analog information signals, such as video and audio signals, and digital information signals, such as computer data, facsimile signals, and digital audio signals.

Briefly, the foregoing objects are accomplished in accordance with aspects of the present invention by the information recording thin film, the method of its fabrication, and the information recording medium described below. These include the followings.

(1) A first information recording thin film, whose atomic arrangement is changed by irradiation of an energy beam, and which was formed directly on a substrate or through a protective layer, wherein mean composition of the information recording thin film in a thickness direction thereof is denoted by a general representation $$Sb_xTe_yA_pB_qC_r \qquad (1)$$

where symbol A denotes at least one of elements selected from group 1, including Ge and In, symbol B is at least one of lanthanoid elements, including La, Ce, Pr, Nd, Pm, Sm, Eu, Gd, Tb, Dy, Ho, Er, Tm, Yb, and Lu, and elements selected from group 2, including Ag, Ba, Co, Cr, Ni, Pt, Si, Sr, Au, Cd, Cu, Li, Mo, Mn, Al, Fe, Pb, Na, Cs, Ga, Pd, Bi, Sn, Ti, and V, and symbol C is at least one of elements other than Sb, Te, and the elements denoted by symbol A and symbol B, and where said x, y, p, q, and r are all in units of atm % (atomic %) and in ranges of $2 \leq x \leq 41$, $25 \leq y \leq 75$, $0.1 \leq p \leq 60$, $3 \leq q \leq 40$, and $0.1 \leq r \leq 30$, respectively.

(2) A second information recording thin film, whose atomic arrangement is changed by irradiation of an energy beam, and which was formed directly on a substrate or through a protective layer, wherein mean composition of the information recording thin film in a thickness direction thereof is denoted by a general representation $$Sb_xTe_yA_pB_q \qquad (2)$$

where symbol A denotes at least one of elements selected from group 1, including Ge and In, and symbol B is at least one of lanthanoid elements and elements selected from group 2, including Ag, Ba, Co, Cr, Ni, Pt, Si, Sr, Au, Cd, Cu, Li, Mo, Mn, Zn, Al, Fe, Pb, Na, Cs, Ga, Pd, Bi, Sn, Ti, and V, and where x, y, p, and q are all in units of atm % and in ranges of $2 \leq x \leq 41$, $25 \leq y \leq 75$, $0.1 \leq p \leq 60$, and $3 \leq q \leq 40$, respectively.

This thin film excludes the elements denoted by symbol C of the fist information recording thin film mentioned above.

(3) A third information recording thin film, whose atomic arrangement is changed by irradiation of an energy beam, and which was formed directly on a substrate or through a protective layer, wherein mean composition of the information recording thin film in a thickness direction is denoted by a general representation $$Sb_xTe_yB_qC_r \qquad (3)$$

where symbol B denotes at least one of lanthanoid elements and elements selected from a group, including Ag, Ba, Co, Cr, Ni, Pt, Si, Sr, Au, Cd, Cu, Li, Mo, Mn, Zn, Al, Fe, Pb, Na, Cs, Ga, Pd, Bi, Sn, Ti, and V, and symbol C is at least one of elements other than Sb, Te, and the elements denoted by symbol B, and where x, y, q, and r are all in units of atm % and in ranges of $2 \leq x \leq 41$, $25 \leq y \leq 75$, $3 \leq q \leq 40$, and $0.1 \leq r \leq 30$, respectively.

This thin film excludes the elements denoted by symbol A of the fist information recording thin film mentioned above.

(4) A fourth information recording thin film, whose atomic arrangement is changed by irradiation of an energy beam, and which was formed directly on a substrate or through a protective layer, wherein mean composition of the information recording thin film in a thickness direction thereof is denoted by a general representation $$Sb_xTe_yB_q \qquad (4)$$

where symbol B denotes at least one of lanthanoid elements and elements selected from a group, including Ag, Ba, Co, Cr, Ni, Pt, Si, Sr, Au, Cd, Cu, Li, Mo, Mn, Zn, Al, Fe, Pb, Na, Cs, Ga, Pd, Bi, Sn, Ti, and V, and where x, y, and q are all in units of atm % and in ranges of $2 \leq x \leq 41$, $25 \leq y \leq 75$, and $3 \leq q \leq 40$, respectively.

This thin film excludes the elements denoted by symbol A and symbol C of the fist information recording thin film mentioned above.

The contents x, y, p, q, and r in paragraphs (1) to (4) above are limited to ranges of $2 \leq x \leq 41$, $25 \leq y \leq 75$, $0.1 \leq p \leq 60$, $3 \leq q \leq 40$, and $0.1 \leq r \leq 30$, respectively. The reason is that an error rate is too high for of $x<2$ and $p>60$, and a crystallization temperature is too low for $x>41$ and $p<0.1$. For $y<25$ and $q<3$, the C/N is too low after $10^5$ rewritings. For $y>75$, erasing takes too much time. For $q>40$, the erase ratio is too low. For $r<0.1$, the elements denoted by symbol C provide no effect of increasing number of possible rewritings. For $r>30$, the reproduced signal intensity is lowered, and erase residue is increased.

In paragraphs (1) to (4) above, the most preferable ones of the elements denoted by symbol B include lanthanoid elements, such as La, and a group of Ni, Cu, Cr, and Mn. The next preferable ones are a group of Co, Sr, Ba, and Si. The following preferable ones are a group of Pt, Au, Ag, Pd, Al, Cd, Mo, Zn, Fe, Pb, Ga, Bi, and Sn. The C/N of reproduced signal is made lower in that order of groups.

Number of the elements denoted by symbol B may be one, but preferably two or more. Adequate combination of the added elements B' can easily improve the thin film characteristics.

If In is selected from the elements denoted by symbol A, the erase characteristic is made higher. For Ge, the reproduction waveform distortion is made less.

If Ge is used for the elements denoted by symbol A, it is preferable to select Ag from the elements denoted by symbol A to obtain higher C/N even for a high-sensitivity disc.

The elements denoted by symbol C should be at least one of elements other than Sb, Te, and the elements denoted by symbol A and symbol B. If the elements denoted by symbol A and symbol B are Ge and Cr, for example, the should be the ones other than Sb, Te, Ge, and Cr.

The elements denoted by symbol C include, for example, Tl, Se, S, As, Hg, B, C, N, P, O, Be, Mg, Ca, Ra, K, Rb, actinides, halogen elements, and inert gas elements.

The most preferable ones of the elements denoted by symbol C include Tl, Se, S, and N. Se and S provide an effect of increasing oxidation resistance. N is effective in lowering the flow speed of the recording film.

Addition of Tl (thallium) of not less than 1% and not more than 20% provides an advantage that erasing speed of information can be made higher.

If the thin film already contains the other elements denoted by symbol A and symbol B, even the elements denoted by symbol A and symbol B can be used for the elements denoted by symbol C.

For example, the Sb—Te—Ge—Cr system that is a system including Ge and Cr as the elements denoted by symbol A and symbol B may have Cr of less than 30 atm % added thereto and Ag, an element denoted by symbol B, added thereto up to a quantity in which its sum with Cr is not more than 50 atm %. Ag can be of the elements denoted by either symbol B or symbol C. Change of contents of the elements denoted in paragraphs (1) to (4) above in a film thickness direction, or the composition change in the film thickness direction, is ordinarily little. It may be made if the quantities of the elements are within the limits given in paragraphs (1) to (4). The change pattern may be determined as desired. The composition change should be preferably made continuously in view of the recording and playback characteristics.

Contents of Sb, Se, and S near either or both interfaces of the thin film should be preferably much more than the ones inside, or close to, it. This can increase the oxidation resistance.

More preferable ranges of the contents x, y, q, and r in paragraphs (1) to (4) above are $8 \leq x \leq 30$, $34 \leq y \leq 67$, $4 \leq q \leq 22$, and $0 \leq r \leq 10$, respectively.

If the element A is In, the content p should be preferably $17 \leq p \leq 45$, more preferably $25 \leq p \leq 45$ for any of the ranges of contents x, y, q, and r in paragraphs (1) to (4) above and the more preferable ranges mentioned above. If the element A is Ge, the content p should be preferably $4 \leq p \leq 17$, more preferably $4 \leq p \leq 10$.

If the contents x, y, p, q, and r are in the preferable ranges, the C/N after $10^5$ rewritings can be made good and the crystallization temperature and the erase time can be made proper. If they are in the more preferable ranges, the characteristics can be further better.

If the element A is In, ratio p/x of the content p to the content x of Sb should be preferably $1 \leq p/x \leq 3$. If the element A is Ge, the ratio should be preferably $0.25 \leq p/x \leq 1$. These ranges can make the reproduced signal intensity high, the erase characteristics excellent, the amorphous state stable, and the error rate less.

If the content r of the element C is 0, or if the thin film is the second or fourth information recording thin film, it is advantageous in easy fabrication.

(5) An information recording thin film, whose atomic arrangement is changed by irradiation of an energy beam, and which was formed directly on a substrate or through a protective layer, wherein mean composition of the information recording thin film in a thickness direction thereof is denoted by a general representation $$(Ge_a Sb_b Te_c)_{1-d} X_d \qquad (5)$$

where symbol X denotes at least one of elements, including Ag, Ba, Co, Cr, Ni, Pt, Si, Sr, Au, Cd, Cu, Li, Mo, Mn, Zn, Al, Fe, Pb, Na, Cs, Ga, Pd, Bi, Sn, Ti, V, In, W, Zn, and lanthanoid elements, and where a, b, c, and d are in ranges of $0.02 \leq a \leq 0.19$, $0.04 \leq b \leq 0.4$, $0.5 \leq c \leq 0.75$, and $0.03 \leq d \leq 0.3$, respectively.

(6) Said a, b, c, and d are in ranges of $0.25 \leq a \leq 0.65$, $0 \leq b \leq 0.2$, $0.35 \leq c \leq 0.75$, and $0.03 \leq d \leq 0.3$, respectively.

(7) In the information recording thin film described in any of paragraphs (1) to (6) above, symbol B and symbol X has concentration gradient in the film thickness direction.

(8) In the information recording thin film described in any of paragraphs (1) to (6), wherein the thin film contains precipitates of relatively higher melting point than the remaining component, and the precipitate contains an element or elements denoted by symbol B or symbol X.

(9) In the information recording thin film described in any of paragraphs (2), (5) and (6), wherein the thin film contains precipitates of relatively higher melting point than the remaining component, and the precipitates contains an element or elements denoted by at least one of said B and said X, and wherein at least a part of the high melting point component exist in a mean thickness range of 1 to 10 nm in a non-continuous film state on a light incoming side of the thin film.

(10) In the information recording thin film described in any of paragraphs (2), (5) and (6), wherein the thin film contains precipitates of relatively higher melting point than the remaining component, and the precipitates contains an element or elements denoted by at least one of said B and said X, and wherein sum of numbers of atoms of elements composing the high melting point component is in a range of 10 to 50% of sum of total numbers of all atoms of elements composing the thin film.

(11) In the information recording thin film described in any of paragraphs (2), (5) and (6), wherein the thin film contains precipitates of relatively higher melting point than the remaining component, and the precipitates contains an element or elements denoted by at least one of said B and said X, and wherein content of the high melting point component is changed in the film thickness direction.

(12) In the information recording thin film described in any of paragraphs (2), (5) and (6), wherein the thin film contains precipitates of relatively higher melting point than the remaining component, and the precipitates contains an element or elements denoted by at least one of said B and said X, and wherein the mean composition is given by $$L_j H_k \qquad (6)$$

where L is a low melting point component composed of an element or a compound, and H is a high melting point component composed of an element or a compound compositions, and where taking a composition of $$20 \leq k/(j+k) \leq 40 \text{ as a reference composition} \qquad (7)$$

and content of each of the component elements of the information recording thin film is in a range of ±10 atm % of a value determined by the reference composition.

(13) In the information recording thin film described in any of paragraphs (2), (5) and (6), wherein the thin film contains precipitates of relatively higher melting point than the remaining component, and the precipitates contains an element or elements denoted by at least one of said B and said X, and wherein the melting point of the high melting point component is not lower than 780° C.

(14) In the information recording thin film described in any of paragraphs (2), (5) and (6), wherein the thin film contains precipitates of relatively higher melting point than the remaining component, and the precipitates contains an element or elements denoted by at least one of said B and said X, and wherein difference of the melting point of the high melting point component from the melting point of the remaining component of the thin film is not smaller than 150° C.

(15) In the information recording thin film described in any of paragraphs (2), (5) and (6), wherein the thin film contains precipitates of relatively higher melting point than the remaining component, and the precipitates contains an element or elements denoted by at least one of said B and said X, and wherein the precipitates of the high melting point component is distributed in a granular or columnar shape.

(16) In the information recording thin film described in any of paragraphs (2), (5) and (6), wherein the thin film contains precipitates of relatively higher melting point than the remaining component, and the precipitates contains an element or elements denoted by at least one of said B and said X, and wherein maximum outside dimension of each of the precipitates of the high melting point component in the film plane direction is not less than 5 nm and not larger than 50 nm.

(17) In the information recording thin film described in any of paragraphs (2), (5) and (6), wherein the thin film contains precipitates of relatively higher melting point than the remaining component, and the precipitates contains an element or elements denoted by at least one of said B and said X, and wherein each of the precipitates of the high melting point component extends like column from both interfaces of the thin film in the film thickness direction, and length of the precipitate in the film thickness direction is not shorter than 5 nm and not longer than a half of thickness of the thin film.

(18) In the information recording thin film described in any of paragraphs (2), (5) and (6), wherein the thin film contains precipitates of relatively higher melting point than the remaining component, and the precipitates contains an element or elements denoted by at least one of said B and said X, and wherein each of the precipitates of the high melting point component extends like column from one of both interfaces of the thin film in the film thickness direction, and length of the precipitate in the film thickness direction is not shorter than 10 nm and not longer than thickness of the thin film.

(19) In the information recording thin film described in any of paragraphs (2), (5) and (6), wherein the thin film contains precipitates of relatively higher melting point than the remaining component, and the precipitates contains an element or elements denoted by at least one of said B and said X, and wherein length of each of the precipitates of the high melting point component in the film thickness direction is not shorter than 10 nm and not longer than thickness of the thin film.

(20) In the information recording thin film described in any of paragraphs (2), (5) and (6), wherein the thin film contains precipitates of relatively higher melting point than the remaining component, and the precipitates contains an element or elements denoted by at least one of said B and said X, and wherein, length of a line connecting centers of two adjoining precipitates of the high melting point component passing an area between the precipitates in the film plane direction is not shorter than 15 nm and not longer than 70 nm.

(21) In the information recording thin film described in any of paragraphs (2), (5) and (6), wherein the thin film contains precipitates of relatively higher melting point than the remaining component, and the precipitates contains an element or elements denoted by at least one of said B and said X, and wherein the thin film contains porous precipitate of relatively higher melting point than the remaining component, and the remaining component is distributed in pores of the porous precipitate.

(22) In the information recording thin film described in any of paragraphs (2), (5) and (6), wherein the thin film contains precipitates of relatively higher melting point than the remaining component, and the precipitates contains an element or elements denoted by at least one of said B and said X, and wherein maximum pore dimension of the pores of the porous precipitate of the high melting point component in a film plane direction is not longer than 80 nm, and maximum wall thickness of an area between two adjoining pores in the film plane direction is not thicker than 20 nm.

(23) In the information recording thin film described in any of paragraphs (2), (5) and (6), wherein the thin film contains precipitates of relatively higher melting point than the remaining component, and the precipitates contains an element or elements denoted by at least one of said B and said X, and wherein the melting point of the remaining component of the thin film is not higher than 650° C.

(24) In the information recording thin film described in any of paragraphs (2), (5) and (6), wherein the thin film contains precipitates of relatively higher melting point than the remaining component, and the precipitates contains an element or elements denoted by at least one of said B and said X, and wherein the melting point of the remaining component of the thin film is not higher than 250° C.

(25) In the information recording thin film described in any of paragraphs (2), (5) and (6), wherein the thin film contains precipitates of relatively higher melting point than the remaining component, and the precipitates contains an element or elements denoted by at least one of said B and said X, and wherein at least one of the real part and the imaginary part of the complex refractive index of the thin film is changed by not less than 20% by irradiation of the energy beam as compared with the one before the irradiation.

(26) In an information recording thin film formed directly on a substrate or through a protective layer to record or reproduce information in a way that atomic arrangement was changed by irradiation of an energy beam, the thin film contains precipitates of relatively higher melting point than the remaining component, and the precipitates are distributed in the remaining component of the thin film.

(27) In the information recording thin film described in paragraph (26), maximum outside dimension of each of the precipitates of the high melting point component in a film plane direction is not less than 5 nm and not larger than 50 nm.

(28) In the information recording thin film described in paragraph (26), wherein the precipitates of the high melting point component extend like column from both interfaces of the thin film in the film thickness direction, and length of each of the precipitates in the film thickness direction is not shorter than 5 nm and not longer than a half of thickness of the thin film.

(29) In the information recording thin film described in any of paragraphs (26) and (27), the precipitates of the high melting point component extends like column from one of both interfaces of the thin film in the film thickness direction, and length of each of the precipitates in the film thickness direction is not shorter than 10 nm and not longer than thickness of the thin film.

(30) In the information recording thin film described in any of paragraphs (26) and (27), length of each of the precipitates of the high melting point component in the film thickness direction is not shorter than 10 nm and not longer than thickness of the thin film.

(31) In the information recording thin film described in any of paragraphs (26) to (30), length of a line connecting centers of two adjoining precipitates of the high melting point component passing an area between the precipitates in the film plane direction is not shorter than 15 nm and not longer than 70 nm.

(32) In an information recording thin film formed directly on a substrate or through a protective layer to record or reproduce information in a way that atomic arrangement was changed by irradiation of an energy beam, the thin film contains porous precipitate of relatively higher melting point than the remaining component of the thin film, and the remaining component is distributed in pores of the porous precipitate.

(33) In an information recording thin film described in paragraph (32), maximum inside dimension of the pores of the porous precipitate of the high melting point component in a film plane direction is not longer than 80 nm, and maximum wall thickness of an area between two adjoining pores in the film plane direction is not thicker than 20 nm.

(34) In the information recording thin film described in any of paragraphs (32) and (33), the melting point of the remaining component of the thin film is not higher than 650° C.

(35) In the information recording thin film described in any of paragraphs (26) and (32), the melting point of the remaining component of the thin film is not higher than 250° C.

(36) In the information recording thin film described in any of paragraphs (26) and (32), at least one of the real part and an imaginary part of the complex refractive index of the thin film is changed by not less than 20% by irradiation of the energy beam as compared with the one before the irradiation.

(37) In the information recording thin film described in any of paragraphs (26) to (35), sum of numbers of atoms composing the high melting point component is in a range of 10 to 50% of sum of total numbers of all atoms composing the thin film.

(38) In the information recording thin film described in any of paragraphs (26) and (32), mean composition of the thin film is given by $$L_j H_k$$

where L is a low melting point component composed of an element or a compound, and H is a high melting point component composed of an element or a compound, and where taking a composition of $20 \leq k/(j+k) \leq 40$, as a reference composition, content of each of the component elements of the information recording thin film is in a range of ±10 atm % of a value determined by the reference composition.

(39) In the information recording thin film described in any of paragraphs (26) to (32), the melting point of the high melting point component is not lower than 780° C.

(40) In the information recording thin film described in any of paragraphs (26) and (32), difference of the melting point of the high melting point component from that of the remaining component of the thin film is not smaller than 150° C.

(41) In the information recording thin film described in any of paragraphs (1), (5) and (6), wherein the thin film contains precipitates of relatively higher melting point than the remaining component, and the precipitates contains an element or elements denoted by at least one of said B and said X, and wherein the element denoted by symbol B or symbol X is preferably Mo, Si, Pt, Co, Mn, or W, or more preferably Cr.

(42) A method of fabricating information recording thin film directly on a substrate or through a protective layer to record or reproduce information in a way that atomic arrangement was changed by irradiation of an energy beam, comprising a step of forming thin films directly on the substrate or through a protective layer, and a step of generating or growing a high melting point component in the thin film by irradiation of an energy beam to the thin film.

(43) A method of fabricating information recording thin film directly on a substrate or through a protective layer to record or reproduce information in a way that atomic arrangement was changed by irradiation of an energy beam, comprising a step of forming island-shaped seed crystals directly on the substrate or through a protective layer by way of depositing a material of high melting point component or a material having a composition approximate to the composition of the high melting point component, and a step of depositing materials containing the high melting point component and the remaining component to grow the high melting point component selectively on the seed crystals and at the same time to grow the remaining component to fill among the seed crystals.

Mean thickness of the thin film for forming the above-mentioned island-shaped seed crystal should be preferably not thinner than 1 nm and not thicker than 10 nm. The thin film thinner than 1 nm has little effect for growing the high melting point component. The thin film thicker than 10 nm has increase of noises caused.

The high melting point component in the second method of fabrication tends to grow from a single interface of the information recording thin film toward its inside.

The first and second methods of fabricating the information recording thin film can have film deposition by way of any of vacuum evaporation, gas evaporation, sputtering, ion beam evaporation, ion plating, electron beam evaporation, and similar known arts. In particular, the sputtering practice is preferable.

The sputtering process can have highly uniform film and low noise level accomplished by way of sputtering of a target having the same composition as the recording thin film. On the other hand, the rotary simultaneous sputtering process having a target having the same composition as the high melting point component and a target having the same composition as the remaining composition is effective to make fast precipitation of the high melting point component and to increase the number of possible rewritings.

(44) A method of fabricating information recording thin film directly on a substrate or through a protective layer to record or reproduce information in a way that atomic arrangement was changed by irradiation of an energy beam, comprising a step of changing content of a high melting point component in a film thickness direction at the time of forming the thin film comprising a phase change component and the high melting point component directly on the substrate or through a protective layer.

(45) An information recording medium, comprising the information recording thin film described in any of paragraphs (1) to (6), (26) and (32) as a recording layer.

(46) An information recording medium comprising the information recording thin film described in any of paragraphs (1) to (6), (26) and (32) as a superresolution readout masking layer.

(47) An information recording medium comprising the information recording thin film described in any of paragraphs (1) to (6), (26) and (32) as a reflective layer for superresolution readout.

(48) In the information recording medium described in any of paragraphs (1) to (6), (26) and (32), the melting point of the remaining component after precipitation of the high melting point component is not higher than 650° C.

(49) In the information recording medium described in any of paragraphs (1) to (6), (26) and (32), reflectance of the reflective layer is not lower than 60%.

(50) An information recording medium, comprising the information recording thin film described in any of paragraphs (1) to (6), (26) and (32) as a recording layer or a superresolution readout masking layer and comprising a double-structure intermediate layer of a $SiO_2$ layer on a reflective layer side and a $ZnS$—$SiO_2$ layer on a recording layer side.

(51) An information recording medium, comprising an information recording thin film, whose atomic arrangement is changed by irradiation of an energy beam, and which was formed directly on a substrate or through a protective layer as a recording layer or a masking layer for superresolution readout, and comprising a reflective layer of at least one of Si—Sn, Si—Ge, and Si—In compounds or compositions approximate to them.

(52) An information recording medium, comprising an information recording thin film, whose atomic arrangement is changed by irradiation of an energy beam, formed directly on a substrate or through a protective layer as a recording layer or a masking layer for superresolution readout, and comprising a reflective layer of which thickness is not thinner than 150 nm and not thicker than 300 nm.

(53) An information recording medium, comprising an information recording thin film, whose atomic arrangement is changed by irradiation of an energy beam, formed directly on a substrate or through a protective layer as a recording layer or a masking layer for superresolution readout, the protective layer is a double-structure layer of a $SiO_2$ layer on a reflective layer side and a $ZnS$—$SiO_2$ layer on a recording layer side.

(54) Now, description is made by reference to FIG. 3 illustrating the cross-section of the recording medium. The material used for the protective layer 2 and the intermediate layer 4 should be preferably any of $ZnS$—$SiO_2$, materials of Si—N system, materials of Si—O—N system, $SiO_2$, SiO, $Ti_2O_5$, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $ZnO_2$ and similar oxides, TaN, AlN, $Si_3N_4$, materials of Al—Si—N system, such as $AlSiN_2$, or similar nitrides, ZnS, $Sb_2S_3$, CdS, $In_2S_3$, $Ga_2S_3$, GeS, $SnS_2$, PbS, $Bi_2S_3$, and similar sulphides, $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, and similar selenides, $CeF_3$, $MgF_2$, $CaF_2$, and similar fluorides, Si, Ge, $TiB_2$, $B_4C$, SiC, B, C, and materials similar to the compositions of all the materials mentioned above for the protective layer 2.

For the multi-layers, a double layer film of a material containing not less than 70 mol % of ZnS, for example $(ZnS)_{80}(SiO_2)_{20}$, and a material containing at least one of Si and Ge not less than 70 atm %, for example, Si, or oxide of Si, for example $SiO_2$ is preferable. To prevent the recording sensitivity from decreasing, $ZnS$—$SiO_2$ layer should be put on the recording film side, and its thickness should not be thinner than 3 nm. To make low thermal expansion coefficient of the $SiO_2$, etc. layer suppress the recording film flow effectively, the thickness of the $ZnS$—$SiO_2$ layer is preferably not thicker than 10 nm. The double layer film should be preferably provided in place of the protective layer 2. Alternatively, it may be provided in place of the intermediate layer 4. For the protective layer 2, thickness of the $SiO_2$, etc. layer should be preferably between 50 nm and 250 nm. If the double layer film is used instead of the intermediate layer, thickness of the $SiO_2$, etc. layer should be preferably between 10 nm and 80 nm. The double layer film is preferable not only for the recording film of the present invention, but also for other already known phase change recording film.

If the refractive index of the intermediate layer 4 was in a range of 1.7 to 2.3, its film thicknesses should be preferably in ranges of 1 to 100 nm and 180 nm to 400 nm.

As material for the protective layer 5, Al—Ti or Si—Ge mixed material is preferable as it can make the light absorbance of the record mark area lower than that of the area other than the record mark area. This can prevent the erase residue due to light absorbance difference and does not lower the number of possible rewritings. Content of Ge should be preferably between 10 atm % and 80 atm % to avoid reduction of the number of possible rewritings.

In turn, Si—Sn or Si—In mixed materials or mixed materials of two or more of these mixed materials is preferable as it provides similar results. Those materials for the reflective layer are preferable as they are effective not only for use with the phase change film of the present invention, but also for use with other phase change films to make the number of possible rewritings higher than the conventional materials for the reflective layer.

Further, the Al—Ti reflective layer may be alternatively replaced by a layer of any of elements, including Si, Ge, C, Au, Ag, Cu, Al, Ni, Fe, Co, Cr, Ti, Pd, Pt, W, T, Mo, and Sb, alloys formed mainly of one of them, alloys of more than two of them, or multi-layers of above-mentioned layers, or a composite layer of at least one of them with an oxide or oxides or similar materials.

In the example is used the substrate 1 of polycarbonate having concavities or convexities and tracking guide formed directly on the surface. The polycarbonate may be alternatively replaced by any of polyolefin, epoxy, acrylic resin, chemically toughened glass having ultra-violet light curing resin layers formed on the surfaces thereof, and similar ones.

Any of the intermediate layer 4, the reflective layer 5, and the protective layer 2 can be omitted to make the medium lamination simple. For example, the medium can be formed of substrate 1/protective layer 2/recording layer 3, substrate 1/recording layer 3/intermediate layer 4, or substrate 1/recording layer 3/reflective layer 5. Even such simple medium laminations provided superior characteristics to the conventional ones, with better results even in more number of rewritings.

As described so far, the information recording thin film shown in FIG. 3 can make more number of rewriting times than the conventional ones while it keeps high recording, reproduction, and erase characteristics. It also has the advantage that the recording and erasing laser beam power may be low.

As examples, the above-mentioned high melting point component may be replaced by any of the high melting point compounds listed below, high melting point compounds having compositions close to their ones, mixtures of them, and compounds of three or more elements having compositions close to the mixed compositions.

$LaTe_3$, $LaTe_2$, $La_2Te_3$, $La_3Te_4$, LaTe, $La_2Te_5$, $La_4Te_7$, $La_3Te$, $La_2Sb$, $La_3Sb_2$'LaSb, $LaSb_2$, $La_3Ge$, $La_5Ge_3$, $La_4Ge_3$, $La_5Ge_4$, LaGe, $La_3Ge_5$, $Ag_2Te$, $Cr_3Te_4$, $Cr_5Te_8$'$Cr_2Te_3$, $Cr_4Te_5$, CrSb, $Cr_3Ge$, $Cr_5Ge_3$, $Cr_{11}Ge_8$'CrGe, $Cr_{11}Ge_{19}$, $PtTe_2$'$Pt_4Te_5$, $Pt_5Te_4$, $Pt_4Sb$, $Pt_3Sb_2$, PtSb, $Pt_3Ge$, $Pt_2Ge$, $Pt_3$,$Ge_2$', PtGe, $Pt_2Ge_3$, $PtGe_3$, NiTe, $NiTe_{0.85}$, NiSb, $Ni_3Ge$, $Ni_5Ge_2$, $Ni_5Ge_3$, NiGe, CoTe, $CoTe_2$, $Co_3Te_4$, $CoSb,CoSb_2$, $CoSb_3$, $Co_5Ge_2$, $Co_5Ge_3$, CoGe, $Co_5Ge_7$, $CoGe_2$, $Si_2Te_3$, SiSb, SiGe, CeTe, $Ce_3Te_4$, $Ce_2,Te_3$', $Ce_4Te_7$, $CeTe_2$, $CeTe_3$, $Ce_2Sb$, $Ce_5Sb_3$, $Ce_4Sb_5$, $CeSb,CeSb_2$, $Ce_3Ge$, $Ce_5,Ge_3$, $Ce_4Ge_3$'$Ce_5Ge_4$', CeGe, $Ce_3Ge_5$, $Ce_5Si_3$, $Ce_3Si_2$, $Ce_5Si_4$'CeSi, $Ce_3Si_5$, $CeSi_2$, $Cr_3Si$, $Cr_5Si_3$, CrSi, $CrSi_3$, $CrSi_2$, $Co_3Si$, CoSi, $CoSi_2$, $NiSi_2$, NiSi, $Ni_3Si_2$, $Ni_2Si$, $Ni_5Si_2$, $Ni_3Si$, $Pt_5Si_2$, $Pt_2Si$, PtSi, $LaSi_2$, $Ag_3In$, $Ag_2In$, $Bi_2Ce$, BiCe, $Bi_3Ce_4$,$Bi_3Ce_5$, $BiCe_2$, $Cd_{11}Ce$, $Cd_6Ce$, $Cd_{58}Ce_{13}$, $Cd_3Ce$, $Cd_2Ce$, CdCe, $Ce_3In$, $Ce_2In$, $Ce_{1+x}In$, $Ce_3In_5$, $CeIn_2$, $CeIn_3$, $Ce_2Pb$, CePb, $CePb_3$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, CeZn, $CeZn_2$, $CeZn_3$, $Ce_3Zn_{11}$, $Ce_{13}Zn_{58}$, $CeZn_5$, $Ce_3Zn_{22}$, $Ce_2Zn_{17}$, $CeZn_{11}$, $Cd_{21}Co_5$, CoGa, $CoGa_3$, CoSn, $Cr_3Ga$, CrGa, $Cr_5Ga_6$, $CrGa_4$, $Cu_9Ga_4$, $Cu_3Sn$, $Cu_3Zn$, $Bi_2La$, BiLa, $Bi_3La_4$, $Bi_3La_5$, $BiLa_2$, $Cd_{11}La$, $Cd_{17}La_2$, $Cd_9La_2$, $Cd_2La$, CdLa, $Ga_6La$, $Ga_2La$, GaLa, $Ga_3La_5$, $GaLa_3$, $In_3La$, $In_2La$, $In_5La_3$, $In_xLa$, InLa, $InLa_2$, $InLa_3$, $La_5Pb_3$, $La_4Pb_3$, $La_{11}Pb_{10}$, $La_3Pb_4$, $La_5Pb_4$, $LaPb_2$, $LaPb_3$, LaZn, $LaZn_2$, $LaZn_4$, $LaZn_5$, $La_3Zn_{22}$, $La_2Zn_{17}$, $LaZn_{11}$, $LaZn_{13}$, NiBi, $Ga_3Ni_2$, GaNi, $Ga_2Ni_3$, $Ga_3Ni_5$, $GaNi_3$, $Ni_3Sn$, $Ni_3Sn_2$, $Ni_3Sn_4$, NiZn, $Ni_5Zn_{21}$, $PtBi$, $PtBi_2$, $PtBi_3$, $PtCd_2$, $Pt_2Cd_9$, $Ga_7Pt_3$, $Ga_2Pt$, $Ga_3Pt_2$, GaPt, $Ga_3Pt_5$, $GaPt_2$, $GaPt_3$, $In_7Pt_3$, $In_2Pt$, $In_3Pt_2$, InPt, $In_5Pt_6$, $In_2Pt_3$, $InPt_2$, $InPt_3$, $Pt_3Pb$, PtPb, $Pt_2Pb_3$, $Pt_3Sn$, PtSn, $Pt_2Sn_3$, $PtSn_2$, $PtSn_4$, $Pt_3Zn$, $PtZn_2$, AlS, $Al_2S_3$, BaS, $BaC_2$, CdS, $Co_4S_3$, $Co_9S_8$, CoS, CoO, $Co_3O_4$, $Co_2O_3$, $Cr_2O_3$, $Cr_3O_4$, CrO, CrS, CrN, $Cr_2N$, $Cr_3C_2$, $Cr_7C_3$, $Cr_3C_2$, $Cu_2S$, $Cu_9S_5$, CuO, $Cu_2O$, $In_4S_5$, $Cr_{23}C_6$, $In_3S_4$, $La_2S_3$, $La_2O_3$, $Mo_2C$, MoC, $Mn_{23}C_6$, $Mn_4C$, $Mn_7C_3$, NiO, $SiS_2$, $SiO_2$, $Si_3N_4$, $Cu_2Te$, CuTe, $Cu_3Sb$, $Mn_2Sb$, MnTe, $MnTe_2$, $Mn_5Ge_3$, $Mn_{3.25}Ge$, $Mn_5Ge_2$'$Mn_3Ge_2$, $Ge_3W$, $Te_2W$, AlSb, $Al_2Te_3$, $Fe_2Ge$, $FeGe_2$, $FeSb_2$, $Mo_3Sb_7$, $Mo_3Te_4$, $MoTe_2$, PbTe, $GePd_2$, $Ge_2Pd_5$, $Ge_9Pd_{25}$, $GePD_5$, $Pd_3Sb$, $Pd_5Sb_3$, PdSb, SnTe, $Ti_5Ge_3$, $Ge_{31}V_{17}$, $Ge_8V_{11}$, $Ge_3V_5$, $GeV_3$, $V_5Te_4$, $V_3Te_4$, ZnTe, $Ag_2Se$, $Cu_2Se$, $Al_2Se_3$, InAs, CoSe, $Mn_3In$, $Ni_3In$, NiIn, $Ni_2In_3$, $Ni_3In_7$, PbSe, $Co_3Si$, $Ce_5Si_2$, $Ce_3Si_2$, $Ce_5Si_4$, $CeSi$, $Ce_3Si_5$, $CeSi_2$, $Cr_5Si_3$, $CrSi$, $CrSi_3$, $CrSi_2$, $Cr_3Si$, $CoSi$, $CoSi_2$, $NiSi_2$, $NiSi$, $Ni_3Si_2$, $Ni_2Si$, $Ni_5Si_2$, $Ni_3Si$, $Pt_5Si_2$, $Pt_2Si$, $PtSi$, $LaSi_2$, $Bi_2Ce$, $BiCe$, $Bi_3Ce_4$, $Bi_3Ce_5$, $BiCe_2$, $Cd_{11}Ce$, $Cd_6Ce$, $Cd_{58}Ce_{13}$, $Cd_3Ce$, $Cd_2Ce$, $CdCe$, $Cd_2Pb$, $CePb$, $CePb_3$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, $CeZn$, $CeZn_2$, $CeZn_3$, $Ce_3Zn_{11}$, $Ce_{13}Zn_58$, $CeZn_5$, $Ce_3Zn_{22}$, $Ce_2Zn_{17}$, $CeZn_{11}$, $Cd_{21}Co_5$, $CoGa$, $CoGa_3$, $CoSn$, $Cr_3Ga$, $CrGa$, $Cr_5Ga_6$, $CrGa_4$, $Cu_9Ga_4$, $Cu_3Sn$, $Cu_3Zn$, $Bi_2La$, $BiLa$, $Bi_3La_4$, $Bi_3La_5$, $BiLa_2$, $Cd_{11}La$, $Cd_{17}La_2$, $Cd_9La_2$, $Cd_2La$, $CdLa$, $Ga_6La$, $Ga_2La$, $GaLa$, $Ga_3La_5$, $GaLa_3$, $La_5Pb_3$, $La_4Pb_3$, $La_{11}Pb_{10}$, $La_3Pb_4$, $La_5Pb_4$, $LaPb_2$, $LaPb_3$, $LaZn$, $LaZn_2$, $LaZn_4$, $LaZn_5$, $La_3Zn_{22}$, $La_2Zn_{17}$, $LaZn_{11}$, $LaZn_{13}$, $NiBi$, $Ga_3Ni_2$, $GaNi$, $Ga_2Ni_3$, $Ga_3Ni_5$, $GaNi_3$, $Ni_3Sn$, $Ni_3Sn_2$, $Ni_3Sn_4$, $NiZn$, $Ni_5Zn_{21}$, $PtBi$, $PtBi_2$, $PtBi_3$, $PtCd_2$, $Pt_2Cd_9$, $Ga_7Pt_3$, $Ga_2Pt$, $Ga_3Pt_2$, $GaPt$, $Ga_3Pt_5$, $GaPt_2$, $GaPt_3$, $Pt_3Pb$, $PtPb$, $Pt_2Pb_3$, $Pt_3Sn$, $PtSn$, $Pt_2Sn_3$, $PtSn_2$, $PtSn_4$, $Pt_3Zn$, and $PtZn_2$.

Of all the high melting point components mentioned above, particularly preferable ones are:

$LaSb$, $CrSb$, $CoSb$, $Cr_3Te_4$, $Cr_2Te_3$, $Cr_4Te_5$, $CoTe$, $Co_3Te_4$, $LaTe_3$, $Cu_2Te$, $CuTe$, $Cu_3Sb$, $MnTe$, $MnTe_2$, and $Mn_2Sb$.

The reason is that as their refractive indexes are approximate to the remaining component, noises are hardly generated and the melting points are high.

The oxide, sulphide, nitride, or carbide contained in the high melting point component should be preferably less than 40% of number of all the component atoms of the high melting point component mentioned above, more preferably less than 10% of the high melting point component. If the content is not less than 40 atm %, it cannot make small the difference of its complex refractive index from that of the component other than the high melting component of the thin film, that is, the remaining component, and causes oxygen and other elements to diffuse into the remaining component, thereby easily deteriorating the recording and reproduction characteristics.

Any of the information recording thin film described in paragraphs (1) to (4) should preferably have any of the high melting point components mentioned above mixed with a reversibly phase-changing component as the information recording thin film makes recording, reproduction, or erasing in the state in which the high melting point component has a precipitate distributed therein.

The term "phase changes" as used herein are construed to include not only a phase change between crystal and amorphous states, but also a phase change among crystal states.

The reversibly phase-changing components available are known phase change recording materials and any of reversibly phase-changing materials as well. Of numbers of the available compounds mentioned in paragraph (11) above, preferable high melting point components are compounds containing transition metal elements, such as Cr. Content of any of the transition metal elements preferably should not be more than 40 atm %, more preferably less than 34 atm %, of total numbers of all atoms of elements composing the thin film. Such conditions, if met, advantageously enable it to increase an effect of making low reflectance of the interface between the precipitated high melting point component and the phase change component of Te system or Sb system. A real part n1 and an imaginary part $k_1$ of the complex refractive index of the high melting point component should be preferably ±40%, more preferably ±20%, of the respective values of the phase change component in the crystal state in view of preventing light scattering on the interface between the melting point component and the phase change component.

Also, it is preferable that difference of $n_1$ from $n_2$ should not be greater than ±10%, difference of $k_1$ from $k_2$ should not be greater than ±70%, the interface reflectivity represented by $|[(n_1+ik_1)-(n_2+ik_2)]/[(n_1+ik_1)+(n_2+ik_2)]|^2$ should not be higher than 6%. Further, it is more preferable that the difference of $n_1$ from $n_2$ should not be greater than ±10%, the difference of $k_1$ from $k_2$ should not be greater than ±70%, the interface refractive index should not be higher than 2%. Such conditions, if met, preferably enable the film thickness to be thick to increase the reproduced signal intensity and to prevent light scattering on the interface.

Preferable ranges of the refractive indexes n and k of the high melting point component for a Sb—Te—Ge—Cr system of the phase change component are $$5.0 \leq n \leq 6.2 \text{ and } 1.1 \leq k \leq 6.1.$$

Those for a In—Sb—Te system of the phase change component are $$1.5 \leq n \leq 1.8 \text{ and } 0.6 \leq k \leq 3.$$

To change the refractive indexes of the components, a proper additive, such as N, may be doped therein. The refractive indexes are not always changed in proportion to quantity of the additive, but changed with a binding state of the additive elements in the thin film. Therefore, it is preferable to check the refractive indexes by means of simple experiment.

If the precipitates of the high melting point component in the information recording thin film cannot be clearly identified, it should be regarded as follows. If appropriate one of the compositions of the remaining component for example, the phase change component, is subtracted and if 80% or more, or more preferably 90% or more, of the remaining parts is a composition of the high melting point component meeting a melting point condition of the present invention, then the high melting point component of the present invention is regarded to be precipitated.

The "protective layer" used for protection of the information recording thin film may be either of organic or inorganic material. The inorganic material, however, has preferably superior heat resistance to the organic material. If the inorganic protective layer formed apart from the substrate to have increased mechanical strength is made thick, it may be easily cracked and a transmittance and a sensitivity of the information recording thin film are decreased. To prevent these, a layer of organic material should be preferably made thick and closely stuck to a side of the protective layer opposite to the information recording thin film. The layer of organic material may be either a layer formed apart from the substrate or an organic substrate. The layer of organic material makes the thin film deformation hard to occur.

The organic protective layer can be formed of any of acrylic resin, polycarbonate, polyolefin, epoxy resins, polyimide, polystyrene, polyethylene, polyethylene terephtalate, polytetrafluoroethylene (teflon), and similar fluoroplastics. The protective layer, also, may be alternatively formed of any of adhesives, such as copolymer of ethylene and vinyl acetate known as hot-melt resin. The protective layer, further, may be alternatively formed of any of ultra-violet light curing resins having at least one of the resins mentioned above as main component. The substrate of an organic material may also serve as the protective layer.

The inorganic protective layer may be formed of any of inorganic materials having as main component oxides, fluorides, nitrides, sulphides, selenides, carbides, borides, boron, carbon, or metals. The substrate formed of any of inorganic materials having as main component glass, quartz, sapphire, iron, titanium, or aluminum may also serve as the inorganic protective layer. The inorganic protective layer should be formed of: any oxide of at least one element selected from among a group of Ce, La, Si, In, Al, Ge, Pb, Sn, Bi, Te, Ta, Sc, Y, Ti, Zr, V, Nb, Cr, and W; any sulphide or selenide of at least one element selected from among a group of Cd, Zn, Ga, In, Sb, Ge, S, and Pb; any of fluoride of Mg, Ce, Ca, and the like; any nitride of Si, Al, Ta, B, and the like; and, borides or carbides. Main component of the inorganic protective layer should be one of the following compounds, any one having a composition close to them, or one of their mixtures.

$CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $ZnS$, $CdSe$, $ZnSe$, $In_2S_3$, $In_2Se_3$, $Sb_2S_3$, $Sb_2Se_3$, $Ga_2S_3$, $Ga_2Se_3$, $MgF_2$, $CeF_3$, $CaF_2$, $GeS$, $GeSe$, $GeSe_2$, $SnS$, $SnS_2$, $SnSe$, $SnSe_2$, $PbS$, $PbSe$, $Bi_2Se_3$, $Bi_2S_3$, $TaN$, $Si_3N_4$, $AlN$, $AlSiN_2$, $Si$, $TiB_2$, $B_4C$, $SiC$, $B$, $C$

Of the inorganic materials listed above, preferable sulphides include ZnS and ones having composition close to it as these have adequate refractive indexes and their films are stable. Preferable nitrides include TaN, $Si_3N_4$, $AlSiN_2$, AlN (aluminum nitride), and ones having composition close to it as their surface reflectance are not too high and their films are stable and rigid. Preferable oxides include $Y_2O_3$, $Sc_2O_3$, $CeO_2$, $TiO_2$, $ZrO_2$, $SiO_2$, $Ta_2O_5$, $In_2O_3$, $Al_2O_3$, $SnO_2$, and ones having composition close to these as their films are stable.

Si also may be used. The above-mentioned protective layer may be made double-layer, triple-layer, or multi-layer of inorganic material-inorganic material or inorganic material-organic material to increase the protection effect further.

Also, the above-mentioned protective layer may be made of a mixture for ease of film formation. A $(ZnS)_{80}(SiO_2)_{20}$ layer of 50 to 500 nm thick, for example, provides high protection effect and good recording, erasing, and rewriting characteristics and can be formed easily.

Further, the above-mentioned protective layer may be made of organic and inorganic composite materials.

The inorganic protection layer may be formed in composition itself by way of electron beam evaporation, sputtering, or the like. It can be made easily made by reactive sputtering or sputtering of at least one of metal, semi-metal, and semiconductor and reaction with at least one of oxygen, sulfur, and nitrogen.

If light is irradiated to a thin film, in general, a light reflected from the light incidence side surface of the thin film overlaps the one reflected from another surface to interfere. To read a signal by change of reflectance of the recording thin film, a light "reflective layer" is preferably provided near the thin film. This increases effect of the interference, thereby increasing the reproduced (read) signal. Instead, there may be provided a light reflecting and absorbing layer.

To make the interference effect further higher, it is preferable to have an "intermediate layer" between the recording thin film and the reflective layer. The intermediate layer serves to prevent dispersion from occurring mutually between the recording thin film and the reflective layer when rewriting is carried out. The intermediate layer also reduces loss of heat to the reflective layer to increase the recording sensitivity. The intermediate layer further can prevent erase residue.

Proper selection of material for the intermediate layer enables it to serve for at least parts of the function of the information recording thin film. If the intermediate layer is formed of selenide, for example, at least parts of the element of the recording thin film are diffused into the intermediate layer or react with the element of the intermediate layer, or at least parts of the element of the intermediate layer are diffused into the recording thin film or the reflecting layer, thereby serving for parts of the function of the recording thin film.

The intermediate layer should preferably have thickness of not thinner than 3 nm and not thicker than 400 nm. The recording medium should preferably have the reflectance minimized near a wavelength of the reading light in at least one of the recording and erasing states when the absorption is low and the recording sensitivity is high, and preferably have the reflectance made around 20% or more reflectance in the other state.

The reflective layer should be formed mainly of any of materials, such as Au, having higher heat conductivity than 2.0 W/cm-deg to make its heat diffusivity high. Such a material can securely make the recording thin film amorphous with a laser beam of high power irradiated to the thin film even if the thin film tends to be crystallized at a high rate. In this case, it is particularly preferable that the intermediate layer also should be formed of a material of high heat conductivity, for example, $Al_2O_3$, AlN, $Si_3N_4$, ZnS, or materials having a composition similar to them, or formed of a material having an intermediate heat conductivity of not lower than 0.02 W/cm-deg and not higher than 0.1 W/cm-deg, such as $SiO_2$, and by making the intermediate layer thin. It should be noted that the reflective layer should be preferably formed of a material having lower heat conductivity than the value mentioned above in terms of making the recording sensitivity high.

The reflective layer can be arranged either on the substrate side of the information recording thin film or the opposite side of the information recording thin film.

It is further preferable to form a protective layer (covering layer) of an inorganic material available for the above-mentioned protective layer on the side of the reflective layer opposite to the intermediate layer. The three-layer structure of intermediate layer, reflective layer, and protective layer is on the whole stronger than the single-layer of protective layer.

Forming the substrate, the recording thin film, the protective layer, intermediate layer, and the reflective layer can be made by selecting an adequate process from among vacuum evaporation, evaporation in gas, sputtering, ion beam deposition, ion plating, electron beam deposition, injection molding, casting, spin coating, and plasma polymerization.

It is most preferable to use the sputtering process for forming all of the recording thin film, the protective layer, intermediate layer, the reflective layer, and the protective layer adjoining the reflective layer.

The above-mentioned information recording thin film may be alternatively dispersed in any of the oxides, the fluorides, the nitrides, the organic materials, the carbon, or the carbides that were mentioned above available for the protective layer, by way of coevaporation or cosputtering. (It should be noted that these materials are not used for the protective layer.) The dispersion may control the light absorption coefficient and reflectivity so that the reproduced signal intensity can be increased. For the purpose, the dispersed one should be shaped to granular or columnar form of size not grater than spot diameter of the reading light.

Mixture ratio of number of atoms of oxygen, fluorine, nitrogen, and carbon occupying the thin film to that of the whole thin film should be preferably not greater than 40%, more preferably not greater than 20%.

Such composite thin films usually lower the crystallization speed and the sensitivity. However, the thin films composed with the organic materials can increase the sensitivity.

If information is recorded by way of phase transition (phase change), in general, the recording film should be preferably crystallized on the whole surface in advance. The substrate having an organic material used therefor, however, cannot be made to high temperature. For the reason, it has to be crystallized in another way.

Preferable methods of crystallization include, for example, irradiation of a laser beam focused to spot diameter of not greater than 2 μm, irradiation of ultra-violet ray of a xenon lamp or a mercury lamp, and heating, irradiation of light of a flash lamp, irradiation of laser beam spot by a high-power gas laser or a high-power semiconductor laser of around 1 W, and combination of heating with laser beam irradiation.

The irradiation of the laser beam focused to spot diameter of not greater than 2 μm to the information recording thin film, if used, usually has to be made a plurality of times. If the laser beam is single, irradiation has to be made repeatedly, thus taking long time. To avoid this, we should use a semiconductor laser array or a plurality of split beams of a gas laser to irradiate to a plurality of positions simultaneously. This allows a multiple of laser beam irradiations by only a single turn of the recording medium.

The beam spots may be arranged on a single recording track. They can be preferably arranged in parallel with two or more tacks. They can be more preferably irradiated on and between the tracks simultaneously. It is not needed to make the laser beam spot powers identical.

For irradiation of single beam from the gas laser or the high-power semiconductor laser, the spot diameter should be preferably not smaller than 5 μm and not greater than 5 mm for efficient recording. Note that the spot diameter for a circular light spot is a diameter at a position having light intensity of $1/e^2$ and the one for an elliptic light spot is a major axis at that position.

Alternatively, crystallization may be made only on the recording tracks and spaces between the tracks may be left amorphous, or only the spaces between the tracks may be crystallized.

For example, if a thin film is to be formed mainly of Sb, Te, Ge, and Cr by way of rotary vacuum evaporation deposition from a plurality of evaporation sources, it occurs often that atoms of Sb, Te, Ge, and Cr are not bound well just after the deposition. If the thin film is alternatively formed by sputtering, also, atomic arrangement is disordered to a great extent. To avoid such adversities, first a laser beam of high power density should be irradiated to the recording track to heat to precipitate high melting point components and if needed, to melt the thin film selectively. After that, a laser beam of low power density should be irradiated to the recording track to crystallize. This process is advantageous in that the whole track can be made to have uniform reflectance.

Some information recording thin film have no high melting point component therein before having the energy beam, such an laser beam, irradiated thereto. They can be made to have the high melting point component precipitated or grown therein by the crystallization process described above. The precipitated or grown high melting point components, as described before, distribute in the granular or columnar shape independently in the thin film or distribute continuously in the porous state. In the former independent granular or columnar state, the large number of precipitates of high melting point component is distributed in the remaining component (ordinarily, the phase change component) of the thin film. In the latter continuous porous state, the remaining component is filled in numbers of pores of the precipitate of the high melting point component.

The high melting point component in the first method of fabrication tends to grow from the both interfaces of the information recording thin film toward its inside.

It is possible to record, or overwrite, information with use of the laser beam power-modulated between the power levels for crystallizing the thin film and for making it to a state near amorphous, irrespective of the state of the thin film after the crystallization.

The method described here is effective not only for the first to sixth information recording thin films described before, but also the thin films of other compositions.

The high melting point component to be precipitated may be any of a compound, an element, and an alloy and plurality of them.

The first to sixth information recording thin films of the present invention do not always make use of the change between the amorphous and crystal states to record information, but can make use of some change of atomic arrangement associated with little change of film shape, enough to cause change of optical properties. The precipitate of the above-mentioned high melting point component can securely prevent the thin film from flowing and segregating.

For example, the change may be a change of size or shape of granular crystal or changes, between crystal and quasi-stable state such as $\pi$ and $\gamma$. The change also may be a change of ratio of the amorphous areas and crystal areas from a mixed amorphous and crystal state to the other mixed state.

Further, the change to record information may be diffusion or chemical reaction of atoms composing the recording thin film, between the recording thin film and at least one of the protective layer, and intermediate layer. The change to record information also may be both of atom movement and phase change.

The following further describes structure of the superresolution readout thin film of the present invention.

(55) The superresolution readout thin film of the present invention to provide a superresolution effect by irradiation of a superresolution readout beam is characterized in that the thin film contains a phase change component and a precipitated high melting point component. The superresolution readout thin film is formed directly on a substrate or through a protective layer comprising at least one of inorganic material and organic material.

(56) The high melting point component having relatively higher melting point than the phase change component is precipitated in any of a columnar state, a granular state and a porous state.

(57) Mean composition of the superresolution readout thin film available is denoted by a general representation $$D_xE_yF_z \qquad (8)$$

where symbol D denotes at least one of elements selected from among Sn, Pb, Bi, Zn, Ga, In; symbol E is at least one of elements selected from a group, including As, B, C, N, O, S, Se, Si, Te, Ag, Al, Au, Ba, Be, Ca, Cd, Co, Cr, Cs, Cu, Fe, Ge, Hf, Hg, Ir, K, Li, Mg, Mn, Mo, Na, Nb, Ni, Os, Pd, Pt, Rb, Re, Rh, Ru, Sb, Sc, Sr, Ta, Ti, V, W, Y, and Zr; and symbol F is at least one of elements other than the elements denoted by symbol D and symbol E, at least one of elements selected from among Tl, Br, Cl, F, H, I, P as example; and where e, f, and g are all in units of atm % and should be preferably in ranges of $30 \leq e \leq 95$, $5 \leq f \leq 50$, and $0 \leq g \leq 20$, respectively, and should be more preferably in ranges of $40 \leq e \leq 84$, $13 \leq f \leq 40$, and $0 \leq g \leq 10$, respectively.

The elements denoted by symbol F should be elements other than Sn and Te if the elements denoted by symbol D and symbol E, respectively. Also, it was preferable that high melting point components of combinations of D, D', E, and F, whose D were two elements, such as Sn and Zn, including combinations D–E, E–F, and D'–E had no eutectic points or had melting points 150° C. not lower than melting points of D and D–D' even having the eutectic points.

As examples, the above-mentioned superresolution readout film component may be leplaced by any of the component listed below and mixtures of them.

Pb—Se, Pb—Ce, Pb—La, Pb—Pt, Pb—Si, Sn—Sb, Sn—Se, Sn—Co, Sn—Cu, Sn—Ni, Sn—Pt, Bi—Te, Bi—Se, Bi—Ce, Bi—Cu, Bi—Cd, Bi—Pt, Zn—Ni, Zn—Pt, Zn—La, Zn—Ce, Ga—Cr, Ga—Cu, Ga—Ni, Ga—La, Ga—Pt, Ga—Ce, In—Se, In—Sb, In—Te, In—As, In—Mn, In—Ni, In—Ag, Pb—Sn—Se, Pb—Sn—Ce, Pb—Sn—La, Pb—Sn—Pt, Pb—Sn—Si, Pb—Sn—Sb, Pb—Sn—Co, Pb—Sn—Cu, Pb—Sn—Ni, Sn—Bi—Sb, Sn—Bi—Se, Sn—Bi—Co, Sn—Bi—Cu, Sn—Bi—Ni, Sn—Bi—Pt, Sn—Bi—Te, Sn—Bi—Ce, Sn—Bi—Cd, Zn—Sn—Sb, Zn—Sn—Se, Zn—Sn—Co, Zn—Sn—Cu, Zn—Sn—Ni, Zn—Sn—Pt, Zn—Sn—Ni, Zn—Sn—La, Zn—Sn—Ce, Sn—Ga—Sb, Sn—Ga—Se, Sn—Ga—Co, Sb—Ga—Cu, Sn—Ga—Ni, Sn—Ga—Pt, Sn—Ga—Cr, Sn—Ga—La, Sn—Ga—Ce, Bi—Ga—Te, Bi—Ga—Se, Bi—Ga—Cu, Bi—Ga—Cd, Bi—Ga—Pt, Bi—Ga—Cr, Bi—Ga—Ni, Bi—Ga—La, Bi—Ga—Ce, In—Ga—Cr, In—Ga—Cu, In—Ga—Ni, In—Ga—La, In—Ga—Pt, In—Ga—Ce, In—Ga—Se, In—Ga—Sb, In—Ga—Te, In—Ga—As, In—Ga—Mn, In—Ga—Ag, In—Bi—Te, In—Bi—Se, In—Bi—Cu, In—Bi—Cd, In—Bi—Pt, In—Bi—Sb, In—Bi—As, In—Bi—Mn, In—Bi—Ni, In—Bi—Ag, In—Bi—Ce.

(58) Also, mean composition of the superresolution readout thin film available is denoted by a general representation

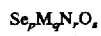 (11)

where M denotes at least one of elements selected from among In, Sb, Bi, Te, Au, B, Cs, Sn, Tl, S, Ge, Fe, and Zn; N is at least one of elements, including As, C, N, O, Si, Ag, Al, Ba, Be, Ca, Cd, Co, Cr, Cu, Hf, Hg, Ir, K, Li, Mg, Mn, Mo, Na, Nb, Ni, Os, Pd, Pt, Rb, Re, Rh, Ru, Sc, Sr, Ta, Ti, V, W, Y, Zr, Pb, Ga, U, and Se, and elements other than the elements denoted by M above; and O is at least one of elements other than the elements denoted by Se, M, and N above, including Br, Cl, F, H, I, and P as examples; and where p, q, r, and s are all in units of atm % and should be preferably in ranges of $40 \leq p \leq 95$, $0 \leq q \leq 55$, and $5 \leq r \leq 50$, and $0 \leq s \leq 20$, respectively, and should be more preferably in ranges of $50 \leq p \leq 80$, $0 \leq q \leq 40$, and $10 \leq r \leq 40$, and $0 \leq s \leq 10$, respectively.

As examples, the above-mentioned superresolution readout film component may be leplaced by any of the component listed below and mixtures of them.

Se—In—Si, Se—In—Ag, Se—In—Al, Se—In—Ba, Se—In—Ca, Se—In—Cd, Se—In—Co, Se—In—Cu, Se—In—Mg, Se—In—Mn, Se—In—Mo, Se—In—Ni, Se—In—Pd, Se—In—Pt, Se—In—Ta, Se—In—Ti, Se—In—V, Se—In—W, Se—In—Y, Se—In—Pb, Se—Sb—Si, Se—Sb—Ag, Se—Sb—Al, Se—Sb—Ba, Se—Sb—Ca, Se—Sb—Cd, Se—Sb—Co, Se—Sb—Cr, Se—Sb—Cu, Se—Sb—Mg, Se—Sb—Mn, Se—Sb—Mo, Se—Sb—Ni, Se—Sb—Pd, Se—Sb—Pt, Se—Sb—Ta, Se—Sb—Ti, Se—Sb—V, Se—Sb—W, Se—Sb—Y, Se—Sb—Pb, Se—Bi—Si, Se——Bi—Ag, Se—Bi—Al, Se—Bi—Ba, Se—Bi—Ca, Se—Bi—Cd, Se—Bi—Co, Se—Bi—Cr, Se—Bi—Cu, Se—Bi—Mg, Se—Bi—Mn, Se—Bi—Mo, Se—Bi—Ni, Se—Bi—Pd, Se—Bi—Pt, Se—Bi—Ta, Se—Bi—Ti, Se—Bi—V, Se—Bi—W, Se—Bi—Y, Se—Bi—Pb, Se—Te—Si, Se—Te—Ag, Se—Te—Al, Se—Te—Ba, Se—Te—Ca, Se—Te—Cd, Se—Te—Co, Se—Te—Cr, Se—Te—Cu, Se—Te—Mg, Se—Te—Mn, Se—Te—Mo, Se—Te—Ni, Se—Te—Pd, Se—Te—Pt, Se—Te—Ta, Se—Te—Ti, Se—Te—V, Se—Te—W, Se—Te—Y, Se—Te—Pb, Se—Au—Si, Se—Au—Ag, Se—Au—Al, Se—Au—Ba, Se—Au—Ca, Se—Au—Cd, Se—Au—Co, Se—Au—Cr, Se—Au—Cu, Se—Au—Mg, Se—Au—Mn, Se—Au—Mo, Se—Au—Ni, Se—Au—Pd, Se—Au—Pt, Se—Au—Ta, Se—Au—Ti, Se—Au——V, Se—Au—W, Se—Au—Y, Se—Au—Pb, Se—B—Si, Se—B—Ag, Se—B—Al, Se—B—Ba, Se—B—Ca, Se—B—Cd, Se—B—Co, Se—B—Cr, Se—B—Cu, Se—B—Mg, Se—B—Mn, Se—B—Mo, Se—B—Ni, Se—B—Pd, Se—B—Pt, Se—B—Ta, Se—B—Ti, Se—B—V, Se—B—W, Se—B—Y, Se—B—Pb, Se—Cs—Si, Se—Cs—Ag, Se—Cs—Al, Se—Cs—Ba, Se—Cs—Ca, Se—Cs—Cd, Se—Cs—Co, Se—Cs—Cr, Se—Cs—Cu, Se—Cs—Mg, Se—Cs—Mn, Se—Cs—Mo, Se—Cs—Ni, Se—Cs—Pd, Se—Cs—Pt, Se—Cs—Ta, Se—Cs—Ti, Se—Cs—V, Se—Cs—W, Se—Cs—Y, Se—Cs—Pb, Se—Sn—Si, Se—Sn—Ag, Se—Sn—Al, Se—Sn—Ba, Se—Sn—Ca, Se—Sn—Cd, Se—Sn—Co, Se—Sn—Cr, Se—Sn—Cu, Se—Sn—Mg, Se—Sn—Mn, Se—Sn—Mo, Se—Sn—Ni, Se—Sn—Pd, Se—Sn—Pt, Se—Sn—Ta, Se—Sn—Ti, Se—Sn—V, Se—Sn—W, Se—Sn—Y, Se—Sn—Pb, Se—Tl—Si, Se—Tl—Ag, Se—Tl—Al, Se—Tl—Ba, Se—Tl—Ca, Se—Tl—Cd, Se—Tl—Co, Se—Tl—Cr, Se—Tl—Cu, Se—Tl—Mg, Se—Tl—Mn, Se—Tl—Mo, Se—Tl—Ni, Se—Tl—Pd, Se—Tl—Pt, Se—Tl—Ta, Se—Tl—Ti, Se—Tl—V, Se—Tl—W, Se—Tl—Y, Se—Tl—Pb, Se—S—Si, Se—S—Ag, Se—S—Al, Se—S—Ba, Se—S—Ca, Se—S—Cd, Se—S—Co, Se—S—Cr, Se—S—Cu, Se—S—Mg, Se—S—Mn, Se—S—Mo, Se—S—Ni, Se—S—Pd, Se—S—Pt, Se—S—Ta, Se—S—Ti, Se—S—V, Se—S—W, Se—S—Y, Se—S—Pb, Se—Ge—Si, Se—Ge—Ag, Se—Ge—Al, Se—Ge—Ba, Se—Ge—Ca, Se—Ge—Cd, Se—Ge—Co, Se—Ge—Cr, Se—Ge—Cu, Se—Ge—Mg, Se—Ge—Mn, Se—Ge—Mo, Se—Ge—Ni, Se—Ge—Pd, Se—Ge—Pt, Se—Ge—Ta, Se—Ge—Ti, Se—Ge—V, Se—Ge—W, Se—Ge—Y, Se—Ge—Pb, Se—Fe—Si, Se—Fe—Ag, Se—Fe—Al, Se—Fe—Ba, Se—Fe—Ca, Se—Fe—Cd, Se—Fe—Co, Se—Fe—Cr, Se—Fe—Cu, Se—Fe—Mg, Se—Fe—Mn, Se—Fe—Mo, Se—Fe—Ni, Se—Fe—Pd, Se—Fe—Pt, Se—Fe—Ta, Se—Fe—Ti, Se—Fe—V, Se—Fe—W, Se—Fe—Y, Se—Fe—Pb, Se—Zn—Si, Se—Zn—Ag, Se—Zn—Al, Se—Zn—Ba, Se—Zn—Ca, Se—Zn—Cd, Se—Zn—Co, Se—Zn—Cr, Se—Zn—Cu, Se—Zn—Mg, Se—Zn—Mn, Se—Zn—Mo, Se—Zn—Ni, Se—Zn—Pd, Se—Zn—Pt, Se—Zn—Ta, Se—Zn—Ti, Se—Zn—V, Se—Zn—W, Se—Zn—Y, and Se—Zn—Pb.

(59) In the superresolution readout thin film, the mean composition thereof is given by

 (6)

where L is a low melting point component composed of the an element or a compound, and H is a high melting point component composed of an element or a compound, and where taking a composition of $$20 \leq k/(j+k) \leq 40 \tag{7}$$

as a reference composition content of each of the component elements of the superresolution readout thin film should be preferably in a range of ±10 atm % of a value determined by the reference composition, more preferably in that ±5 atm %.

For example, if the reference composition of the superresolution readout thin film is $(GeSb_2Te_4)_{80}(Cr_4Te_5)_{20}$, L in Eq. 7 is $GeSb_2Te_4$, H is Cr4Te5, and k/(j+k) is 20. Atomic compositions of the elements are that Ge of L is 11%, Sb of L is 23%, Te of L is 46%, Cr of H is 9%, and Te of H is 11%. Thus, the preferable ranges of the values determined by Eq. 7 ±10 atm % are that Ge of L is 1 to 21%, Sb of L is 13 to 33%, Te of L is 36 to 56%, Cr of H is 0 to 19%, and Te of H is 1 to 21%.

(60) In the superresolution readout thin film, the low melting point component and the high melting point component contains a metal element or a semi-metal element preferably by not less than 50 atm %, more preferably by not less than 65 atm %.

(61) The composition given in Eq. 2 above can be used not only as the phase change recording film, but also as the phase change recording film for the recording medium without the superresolution readout thin film. The recording film can be used to fabricate a medium of greater reflectance difference between the crystallization state and an amorphous state.

Sum of atoms of the high melting point components should be preferably in a range of 10 to 50% of a total number of atoms composing the superresolution readout thin film, more preferably 20 to 40%.

(62) In combination of the high melting point component and the phase change component, each component should preferably contain the same element in a range of 30 to 80 atm %. The melting point of the high melting point component should be preferably not lower than 150° C. than from that of the phase change component which is the remaining component after precipitation.

(63) The mean composition of the high melting point component can be at least one selected from among the group A listed below, compositions close to them, and compounds having melting points of not lower than 800° C. The term "compositions close to them" means that composition deviations are in a range of ±10% of the compositions listed (as will be referred to hereinafter). $BaPd_2$, for example, has Ba of 33 atm % and Pd of 67 atm %. The allowable deviation ranges of ±10% of $BaPd_2$ are 23 to 43% for Ba and 57 to 77% for Pd.

Group A $BaPd_2$, $BaPd_5$, NdPd, $NdPd_3$, $NdPd_5$, $Nd_7Pt_3$, $Nd_3Pt_2$, NdPt, $Nd_3Pt_4$, $NdPt_2$, $NdPt_5$, $Bi_2Nd$, BiNd, $Bi_3Nd_4$, $Bi_3Nd_5$, $BiNd_2$, $Cd_2Nd$, CdNd, $Mn_2Nd$, $Mn_{23}Nd_6$, $Mn_{12}Nd$, $Nd_5Sb_3$, $Nd_4Sb_3$, NdSb, $NdSb_2$, $Fe_2Nd$, $Fe_{17}Nd_2$, $Cs_3Ge_2$, CsGe, $CsGe_4$, $Nd_5Si_3$, $Nd_5Si_4$, NdSi, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3Te_4$, NdTe, $Ce_3Ir$, $Ce_2Ir$, $Ce_{55}Ir_{45}$, $CeIr_2$, $CeIr_3$, $Ce_2Ir_7$, $CeIr_5$, CaPd, $CaPd_2$, CaGe, $Ca_2Ge$, $GeNa_3$, GeNa, $CaSi_2$, $Ca_2Si$, CaSi, $Se_2Sr$, $Se_3Sr_2$, SeSr, $GeSr_2$, GeSr, $Ge_2Sr$, SnSr, $Sn_3Sr_5$, $SnSr_2$, $Ce_2Tl$, $Ce_5Tl_3$, $CeTl_3$, $Ce_3Tl_5$, CeTl, BATl, $Pd_{13}Tl_9$, $Pd_5Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, CeSe, $Ce_5Ge_3$, $Ce_4Ge_3$, $Ce_5Ge_4$, CeGe, $Ce_3Ge_5$, $Ce_5Si_3$, $Ce_3Si_2$, $Ce_5Si_4$, CeSi, $Ce_3Si_5$, $CeSi_2$, $CeTe_3$, $Ce_2Te_5$, $CeTe_2$, $Ce_4Te_7$, $Ce_3Te_4$, CeTe, $La_3Se_7$, $LaSe_2$, $La_4Se_7$, $La_2Se_3$, $La_3Se_4$, LaSe, $GeLa_3$, $Ge_3La_5$, $Ge_3La_4$, $Ge_4La_5$, GeLa, $Ge_5La_3$, $BaSe_2$, $Ba_2Se_3$, BaSe, PdSe, $Mo_3Se_4$, $MoSe_2$, $Ba_2Ge$, $BaGe_2$, BaGe, $Ba_2Te_3$, BaTe, $Ge_2Pd_5$, $GePd_2$, $Ge_9Pd_{25}$, GePd, $Ge_3Pt$, $Ge_3Pt_2$, GePt, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$, GeNi, $Ge_3Ni_5$, $Ge_2Ni_5$, $GeNi_3$, $NiTe_{0.85}$, $NiTe_{0.775}$, $Ni_{3\pm x}Te_x$, $Cr_{11}Ge_{19}$, CrGe, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Cr_{1-x}Te$, $Ge_3Mn_5$, $GeMn_2$, $Mn_6Si$, $Mn_9Si_2$, $Mn_3Si$, $Mn_5Si_2$, $Mn_5Si_3$, MnSi, $Mn_{11}Si_{19}$, $Mn_2Sn$, $Mn_{3.25}Sn$, MnTe, $Te_2W$, $FeGe_2$, $Fe_5Ge_3$, $Fe_3Ge$, $Fe_2Si$, $Fe_5Si_3$, FeSi, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, MoSn, $MoSn_2$, $Mo_3Te_4$, $MoTe_2$, $Si_2Ti$, SiTi, $Si_4Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, CoGe, $Co_5Ge_3$, $Co_4Ge$, $Co_3Te_4$, $Ge_7Re_3$, $Re_5Si_3$, ReSi, $ReSi_2$, $Re_2Te$

(64) Also, the mean composition of the high melting point component can be at least one compound selected from among the above-mentioned group A and the group B listed below, compositions close to them, and compounds having melting points of not lower than 600° C.

Group B $Cs_3Ge$, $Ba_2Tl$, $GePd_3$, $Fe_6Ge_5$, $FeTe_2$, $Co_5Ge_2$, $Nd_3Pd$, $Cs_3Te_2$, $Ce_4Ir$, NaPd, $Ca_9Pd$, $Ca_3Pd_2$, $Ca_2Ge$, $Se_3Sr$, $Ce_3Tl$, $CeSe_2$, $Ce_3Ge$, $BaSe_3$, $GeSe_2$, GeSe, $BaTe_2$, $GePd_5$, $Ge_8Mn_{11}$, $MnTe_2$, $Ge_3W_2$, FeGe, $Fe_4Ge_3$, $Fe_3Sn$, $Fe_3Sn_2$, FeSn, $CoTe_2$

(65) Further, the mean composition of the high melting point component can be at least one compound selected from among the above-mentioned group B and the group C listed below, compositions close to them, and compounds having melting points of not lower than 400° C.

Group C $Ba_4Tl$, CsTe, $Ba_4Tl$, $Ba_{13}Tl$, $Cd_{11}Nd$, $Cd_6Nd$, $Cs_5Te_4$, $Ca_3Pd$, $Ca_5Pd_2$, $Sn_3Sr$, $Ba_{13}Tl$, $PdTl_2$, $FeSe_2$, FeSe, $Cr_2Te_3$, $CrTe_3$, $FeSn_2$

(66) The mean composition of the phase change component with use of any of the high melting point components listed in the group A should be preferably at least one selected from among the group D listed below, compositions close to them, and compounds having melting points of not higher than 650° C.

Group D

Sn, Pb, Sb, Te, Zn Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeSb_2Te_4$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, $Ba_2Tl$

(67) The mean composition of the phase change component with use of any of the high melting point components listed in the group B should be preferably at least one selected from among the group E listed below, compositions close to them, and compounds having melting points of not higher than 450° C.

Group E

Sn, Pb, Te, Zn, Cd, Se,In, Ga, S, Tl, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $Ba_4Tl$

(68) The mean composition of the phase change component with use of any of the high melting point components listed in the group C should be preferably at least one

23 selected from among the group F listed below, compositions close to them, and compounds having melting points of not higher than 250° C.

Group F

Sn, Se, In, Ga, S, InBi, In$_2$Bi, TeBi, Tl—Se, Tl—Te, Pb—Sn, Bi—Sn, Se—Te, S—Se, Bi—Ga, Sn—Zn, Ga—Sn, Ga—In

(69) The composition or film thickness of the superresolution readout thin film should have preferably different on inside tracks thereof from on outside tracks thereof. Circumferences around the tracks of the superresolution readout thin film should be preferably crystallized. The superresolution readout thin film according to the present invention can be applied to information recording media, such as a ROM disc having information already recorded thereon and a RAM disc capable of recording information.

(70) A superresolution readout apparatus for the information recording medium having the superresolution readout thin film according to the present invention should be preset to a superresolution readout power level at which the high melting point component can be kept in solid phase without melting the whole film even in a maximum temperature range for the superresolution readout thin film. Otherwise, the apparatus should preferably have manual or automatic setting means for that purpose. The apparatus, also, should preferably have means for increasing the superresolution readout laser power level greater than two times, more preferably three times, the one needed for auto-focusing and tracking. The apparatus provides greater results than the one having the superresolution readout laser power level made constant even with use of the medium other than those of the present invention.

(71) The superresolution readout laser pulse beam should be pulse and preferably meet relationships $$0.4 \, \lambda/NA \leq vT \leq 1.5 \, \lambda/NA \quad (9)$$

$$0.3 \leq x/T \leq 0.5 \quad (10)$$

where k is a proportion constant, T is a period of the laser pulses, v is the linear velocity, $\lambda/NA$ is the spot diameter, and x is a pulse width. The superresolution readout laser pulse beam should more preferably meet a relationship $$0.5 \, \lambda/NA \leq vT \leq 0.9 \, \lambda/NA \quad (12)$$

The following describes actions and effects of the present invention obtained in the structures described above.

(72) An information recording thin film, whose atomic arrangement is changed by irradiation of an energy beam, and which was formed directly on a substrate or through a protective layer to record or reproduce information, wherein an information recording and reproducing apparatus using an information recording medium including the thin film or a medium initial crystallizing apparatus is used to repeatedly irradiate a laser beam to the thin film, thereby precipitating a high melting point component of relatively higher melting point than the remaining component of the thin film, and the precipitates of high melting point component are distributed in an area of the remaining component of the thin film.

(73) A method of recording to and reproducing information from an information recording thin film, whose atomic arrangement was changed by irradiation of an energy beam, and which was formed directly on a substrate or through a protective layer, wherein

24 an information recording and reproducing step or a medium initial crystallizing step having an information recording medium including the thin film is repeatedly irradiated by a laser beam, thereby precipitating a high melting point component of relatively higher melting point than the remaining component of the thin film, and distributes the precipitates of the high melting point component in an area of the remaining component of the thin film.

(74) The information recording thin film according to any of paragraphs (1), (5) and (6), wherein the information recording medium including the thin film is repeatedly irradiated by a laser beam of an information recording and reproducing apparatus or a medium initial crystallizing apparatus, thereby precipitates a high melting point component of relatively higher melting point than the remaining component of the thin film, and the precipitates distributes in the remaining component of the thin film, and the precipitates contain an element denoted by at least one of the said B and the said X.

(75) A method of fabricating an information recording medium for recording information to and reproducing information from an information recording thin film, whose atomic arrangement was changed by irradiation of an energy beam, and which was formed directly on a substrate or through a protective layer, comprising a step of forming the protective layer, the recording film or a superresolution readout film, an intermediate layer, and a reflective layer on the substrate, a step of sticking to the layers formed above a second substrate or the other substrate having the layers formed in the same way as above, and a step of generating or growing precipitates of a high melting point component in the thin film by irradiation of the energy beam to the medium.

(76) A method of fabricating an information recording medium for recording information to and reproducing information from an information recording thin film, whose atomic arrangement was changed by irradiation of an energy beam, and which was formed directly on a substrate or through a protective layer, comprising a step of forming the protective layer on the substrate, a step of forming island-shaped seed crystals by way of depositing a material of high melting point component or a material having a composition close to the composition of the high melting point component, a step of depositing materials containing the high melting point component and the remaining component onto the seed crystals to grow the high melting point component selectively on the seed crystals and at the same time to grow the remaining component to fill among the seed crystals, a step of forming an intermediate layer and a reflective layer, and a step of sticking to the layers formed above a second substrate or the other substrate having the layers formed in the same way as above.

(77) A method of fabricating an information recording medium for recording information to and reproducing from an information recording thin film, whose atomic arrangement was changed by irradiation of an energy beam, and which was formed directly on a substrate or through a protective layer, comprising a step of forming the protective layer on the substrate, a step of changing content of a high melting point component in a film thickness direction while forming the thin film composed of a phase change component and the high melting point component, a step of forming an intermediate layer and a reflective layer, and a step of sticking to the layers formed above a second substrate or the other substrate having the layers formed in the same way as above.

As described before, the first to sixth information recording thin films of the present invention and the information recording media having them used therein have the elements denoted by symbols B and X added to Sb and Te. The thin films therefore can generate the precipitates of high melting point component that cannot be melted by irradiation of the recording and reproducing light, such as the laser beam, therein. This can effectively prevent any thin film from flowing and segregating even if the remaining components other than the high melting point component are melted by the light. As a result, it is possible to effectively prevent the thin film from flowing and segregating in number of rewritings. This assures that the carrier-to-noise ratio (C/N) can be made so stable that the thin film can have information rewritten or read more times than usual while keeping the recording and reproduction characteristics high.

If Sb, Te, and any of the elements denoted by symbols B and X are made to coexist with any of the elements denoted by symbol A added thereto, the amorphous state can be kept stably. In addition, crystallization can be made at a high speed in the recording and erasing modes. Also, crystallization can be controlled to an optimum speed so that the carrier-to-noise ratio and erase ratio can be made high.

As described before, the fifth and sixth information recording thin films of the present invention and the information recording media having them used therein have the advantage that the precipitate of high melting point components contained therein are free of melting even if the recording and reproducing light, such as the laser beam, is irradiated to them. This can effectively prevent any thin film from flowing and segregating even if the remaining components other than the high melting point component are melted by the light. As a result, this assures that the thin film can have information rewritten or read more times than usual while keeping the recording and reproduction characteristics high. The first information recording medium of the present invention having any one of the first to sixth information recording thin films can have information rewritten or read more times than usual while keeping the recording and reproduction characteristics high.

The second information recording medium of the present invention has the light spot irradiated to the masking layer formed of any one of the first to sixth information recording thin films. In the high temperature portion in the light spot is melted at least remaining component other than the high melting point component. The real part or imaginary part (extinction coefficient) of the refraction index of the high temperature portion is made smaller than that of the low temperature portion outside the light spot. The masking layer therefore partially masks parts of the light spot area as if reducing the diameter of the light spot. As a result, it is possible to read smaller record mark than the diameter of the light spot, that is, superresolution readout can be made.

The third information recording medium of the present invention has the light spot irradiated to the reflective layer formed of any one of the first to sixth information recording thin films. The real part or extinction coefficient of the refraction index of the high temperature portion inside the light spot area is made smaller than that of the low temperature portion outside the light spot. The light irradiated to and reflected from the high temperature portion of the reflective layer has too low contrast given to read the record mark. As a result, the light spot is seen as if its diameter is reduced. It is thus possible to read smaller record mark than the diameter of the light spot, that is, superresolution readout can be made.

It is made to precipitate the melting point component having relatively higher melting point than the phase change component. This can effectively prevent the superresolution readout film melted by the laser irradiation from flowing and segregating while superresolution readout is made. Thus, the present invention can rewrite or read information more times than usual while keeping the recording and reproduction characteristics high.

For the mean composition of the superresolution readout thin film given by the general representation Eq. 8, any of the elements denoted by symbol D is melted at the low temperature. This enables superresolution readout at the low temperature. It can be made even on optical discs other than the optical discs having information recorded by phase bits, including the phase change optical disc. If any of the elements denoted by symbol E is made to coexist with that of symbol D, a compound of elements of symbols D and E or any element of symbol E or a compound of any elements together of symbol E is made to become high melting point component. This can effectively prevent the superresolution readout film from flowing and segregating while this is melted. If Tl is made to coexist coexists with that of symbol D as an element of symbol F, for example, the C/N can be made high.

As described above, the superresolution readout apparatus of the present invention has the high laser power made only during superresolution readout. This can prevent the superresolution readout film from deteriorating, enabling a great numbers of superresolution readout times. If the relationships, Eqs. 9 and 10, of the period T of the laser pulse, the line speed v, the spot diameter $\lambda/NA$, and the pulse width x are met, the masking area can be kept to an adequate size while superresolution readout is made, thereby being capable of making the superresolution readout characteristics high. The apparatus provides superior results to the one having the superresolution readout laser power kept constant even if it is used for media other than those of the present invention.

BRIEF DESCRIPTION OF THE DRAWINGS

In the accompanying drawings:

FIG. 1A is a partial cross-section illustrating a state that numbers of granular precipitates of a high melting point component in an information recording medium in an embodiment according to the present invention;

FIG. 1B is a partial cross-section illustrating a state that numbers of columnar precipitates of a high melting point component in an information recording medium in an embodiment according to the present invention;

FIG. 1C is a partial cross-section illustrating a state that numbers of a porous precipitate of a high melting point component in an information recording medium in an embodiment according to the present invention;

DETAILED DESCRIPTION OF THE PREFERRED EMBODIMENTS

The following describes in detail embodiments according to the present invention by reference to the accompanying drawings.

Embodiment 1

(1) Structure and preparation

Figure 3:
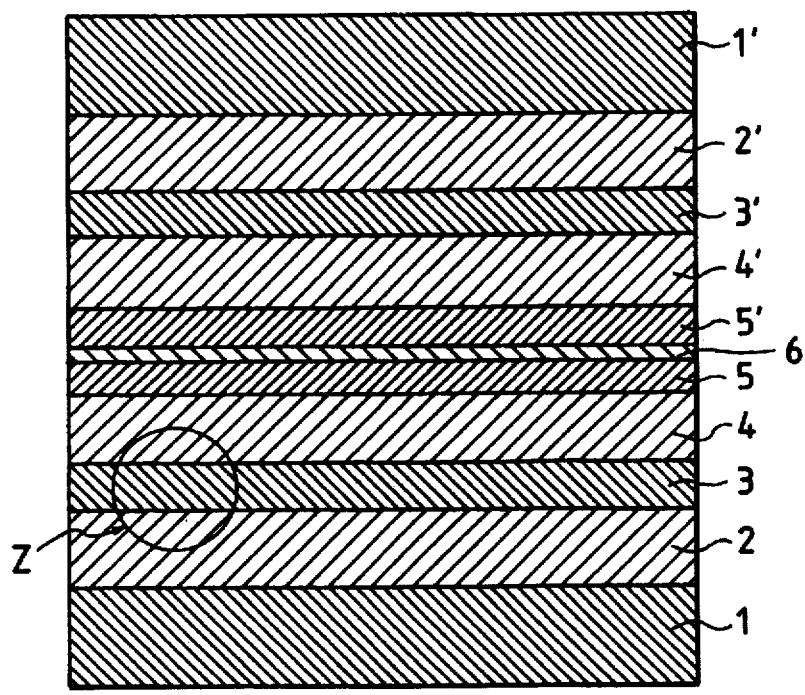
FIG. 3 is a cross-sectional structure illustrating an information recording medium in an embodiment according to the present invention.

FIG. 3 depicts a cross-sectional structure illustrating a disc-shaped information recording medium having an information recording thin film of an embodiment 1 of the present invention. The medium was prepared as follows.

First, the inventors formed a substrate 1 of 13 cm diameter and 1.2 mm thick having cross-sectionally U-shaped tracking groove on its surface. The substrate 1 was put in a magnetron sputtering apparatus to form films on the substrate 1 successively. The apparatus is an apparatus having a plurality of targets by which laminated films can be successively formed. The apparatus also is excellent in uniformity and reproductivity of thickness of the films formed.

The inventors formed a protective layer 2 of $(ZnS)_{80}(SiO_2)_{20}$ to 125 nm thick on the substrate 1 with use of the magnetron sputtering apparatus. On the protective layer 2 was formed a film of high melting point component of $Cr_4Te_5$ (not shown) in the shape of a mass of islands to 3 nm mean thick. On the protective layer 2 and Cr—Te islands, a recording layer 3 composed of $Sb_{16}Te_{55}Ge_{16}Cr_{13}$, that is, $(Ge_2Sb_2Te_5)_7(Cr_4Te_5)_3$ to approximately 30 nm thick was formed. In the process, they used a rotary simultaneous sputtering method with a $Cr_4Te_5$ target and $Ge_2Sb_2Te_5$ target. It is preferable that size of individual islands of the island-shaped Cr—Te film is around 2 to 20 nm, and intervals between the centers of the islands are 1.5 to 10 times the size of the individual islands.

Forming the islands-shaped $Cr_4Te_5$ film is not always needed. In that case, the high melting point components in the recording layer 3 are only the ones precipitated during the initial crystallization.

In turn, on the recording layer 3 was formed an intermediate layer 4 of $(ZnS)_{80}(SiO_2)_{20}$ film to around 25 nm thick. On the intermediate layer 4 was formed a reflective layer 5 of $Al_{97}Ti_3$ film to 80 nm thick with use of the same magnetron sputtering apparatus. This completed a first disc member.

Also, the inventors obtained a second disc member of the same structure as the first disc member with the very same process. The second disc member has a substrate 1' of 13 cm diameter and 1.2 mm thick, a protective layer 2' of $(ZnS)_{80}(SiO_2)_{20}$ of 125 nm thick, a recording layer 3' composed of $Sb_{16}Te_{55}Ge_{16}Cr_{13}$, that is, $((Ge_2Sb_2Te_5)_7(Cr_4Te_5)_3)$ of approximately 30 nm thick, an intermediate layer 4' of $(ZnS)_{80}(SiO_2)_{20}$ film of around 25 nm thick, and a reflective layer 5' of $Al_{97}Ti_3$ film of 80 nm thick laminated successively.

After that, the inventors stuck the reflective layer 5 of the first disc member and the reflective layer 5' of the second member together via an adhesive layer 6 of hot-melt adhesive of vinyl chloride-vinyl acetate system to obtain the disc-like information recording medium shown in FIG. 3. Alternative adhesives available for the adhesive layer 6 include ultra-violet light curing resins, epoxy resins, hot-melt resins, such as copolymer of vinyl chloride and vinyl acetate.

The above-mentioned medium having the reflective layers 5 and 5' stuck together on their whole surfaces can have more number of possible rewritings than the one having them stuck not on the whole surfaces. The above-mentioned medium having no adhesive on portions of the reflective layers 5 and 5' corresponding to recording areas, also, has higher recording sensitivity a little than the one having the adhesive on them.

(2) Initial crystallization

The recording films 3 and 3' of the medium made as described above were initial-crystallized. The following explains only the recording layer 3 as the recording layer 3' is the very same as that.

The medium was revolved at 1,800 rpm. A laser beam of 830 nm wavelength of a semiconductor laser was kept at a power level of approximately 1 mW at which recording cannot be made. The laser beam was focused by a lens of a recording head a numerical aperture (NA) of 0.55 to irradiate the recording layer 3 through the substrate 1. A laser beam reflected by the recording layer 3 was detected. Tracking was made so that a spot center of the reflected laser beam should always coincide with a center of a tracking groove of the substrate 1. At the same time, the recording head was driven while automatic focusing was made so that the laser beam should be focused on the recording layer 3.

First, to make the initial crystallization, continuous oscillation laser beams of 12, 13, and 14 mW powers were irradiated 500 times each onto the same recording track of the recording layer 3. Finally, a continuous (DC) laser beam of 15 mW power was irradiated onto it 1,000 times. Irradiation time of each revolution, or beam spot passing time, is approximately 0.1 μsec.

Then, a continuous laser beam of 8 mW power was irradiated onto the recording track 500 times. Irradiation time of each revolution, or beam spot passing time, is approximately 0.1 μsec. The laser beam power may be in a range of 5 to 9 mW.

The lower power laser beam irradiation of 8 mW of the two kinds may be omitted.

With the laser beam irradiations of different powers, the initial crystallization can be made well.

The above-mentioned laser beam irradiations can be made with use of a semiconductor laser array or a plurality of split beams of a gas laser. It is preferable for them to use an elliptic laser beam spot of a high-power gas laser or semiconductor laser which is made long in a radial direction of the medium. With this, the initial crystallization can be completed with rather fewer number of revolution times of the medium.

If the plurality of laser beam spots are used, they may not be put on the same recording track, but shifted a little in the radial direction of the medium. This is effective in allowing the initial crystallization over a larger area at a time and in little erasing residue.

In turn, a high-power continuous laser beam of 18 mW for recording was irradiated to the recording layer 3 every time a circular, high-power continuous laser beam spot of 12 mW for recording was irradiated to it for approximately 0.1 μsec. This was to make the recording layer 3 amorphous to form recording points. After that, the inventors investigated what times a lower-power continuous laser beam of 8 mW for initial crystallization had to be irradiated to the recording points to crystallize.

As a result, it was found that the number of irradiation times of the continuous laser beam of 8 mW needed for crystallization was reduced as the number of irradiation times of the continuous laser beam of 12 mW is increased up to five times. That is, the inventors found that the recording points could be easily crystallized with increase of the number of irradiation times. This can be presumed that irradiation of the continuous laser beam of 12 mW precipitated many minute crystals of high melting point component $Cr_4Te_5$ into the recording layer 3 so that composition of the remaining, or phase changing parts, approached to that of $Ge_2Sb_2Te_5$ which could be crystallized at a high speed.

Note that a melting point of $Cr_4Te_5$ is 1,250° C., and that of $Ge_2Sb_2Te_5$ is 630° C.

(3) Recording and erasing

The inventors recorded data in the recording area of the recording layer 3 initial-crystallized as described above in a way that the recording laser beam power was changed between an intermediate level of 8 mW and a high level of 18 mW according to an information signal to be recorded while tracking and automatic focusing were made as described above. When the recording laser beam passed beyond positions at which recording was to be made, the laser beam power was decreased to a low power level of 1 mW at which reproduction was made. The recording laser beam can make amorphous areas formed in the recording area or its adjoining area as recoring points.

It is particularly preferable that a power ratio of the high level of the recording laser beam to the intermediate level is in a range of 1:0.3 to 1:0.8. Besides, the recording laser beam may be changed to other power levels than above mentioned power levels every short time.

In such a recording method as described above, the area which was already recorded can be directly rewritten with new data. In other words, the method allows the single circular light spot to overwrite new data on the area which was already recorded.

Recording can also be made in an alternative way. A continuous laser beam is irradiated to the medium at a level, for example, 9 mW, near the intermediate level of 8 mW of the above-mentioned power-modulated recording laser beam for a first single or plurality of turns at the time of rewriting to erase the recorded data once. After that, for a next one turn, the recording laser beam is power-modulated between the low level of 1 mW for the reproduction (reading) laser beam and the high level of 18 mW of the recording laser beam or between the intermediate level of 8 mW and the high level of 18 mW of the recording laser beam according to the data signal to be recorded in the medium. The way that the preceding data are erased before recording provides little erase residue of the preceding data and high carrier-to-noise ratio (C/N).

If erasing is made before rewriting as described above, it is preferable that the power level of the continuous laser beam irradiated first should be set in a range of 0.4 to 1.1 to the high level of 1 which corresponds to 18 mW of the above-mentioned recording laser beam. In that range, writing can be made well.

The above-mentioned method is effective for the other recording layer in addition to the one of the present invention.

It was found that the above mentioned information recording medium could repeat recording and erasing more than $10^5$ times in a severe condition that the laser beam power was made 15% higher than the optimum level. When a signal of 2 MHz was recorded, the C/N of the reproduced signal was as high as around 50 dB.

As mentioned above, the recording medium is rewritable more than $10^5$ times. A probable reason for that is that the high melting point component precipitated in the recording layer 3 prevents the remaining component (phase change component) of the recording layer 3 from material flowing and segregating.

It should be noticed that when the intermediate layer 4 of $ZnS$—$SiO_2$ formed on the recording layer 3 and the reflective layer 5 of Al—Ti were omitted, noise increased a little in one order smaller number of repetition times of recording and erasing.

(4) Relationships with content y of Te

The inventors measured the change of irradiation time of the laser beam needed for erasing recorded data with the change of content y of Te in the recording layer 3 composed of the above-mentioned $Ge_2Sb_2Te_5$ and $Cr_4Te_5$ while a relative ratio of the other elements were kept constant. They also measured the change of the carrier-to-noise ratio (C/N) of a reproduced signal after rewriting was made $10^5$ times under the severe condition of laser beam power 15% higher than the optimum level with the change of content y of Te. As results, the following data were obtained.

| | The laser beam irradiation times needed for erasing were: |
|---|---|
| y = 34: | 0.5 μsec |
| y = 40: | 0.1 μsec |
| y = 50: | 0.1 μsec |
| y = 60: | 0.1 μsec |
| y = 67: | 0.5 μsec |
| y = 70: | 1.0 μsec |
| y = 75: | 1.5 μsec |
| y = 80: | 5.0 μsec |
| | The carrier-to-noise ratios (C/N) of the reproduced signal after rewriting was made $10^5$ times were: |
| y = 20: | 42 dB |
| y = 25: | 46 dB |
| y = 30: | 49 dB |
| y = 34: | 50 dB |
| y = 40: | 50 dB |
| y = 50: | 50 dB |
| y = 60: | 50 dB |

We can see from the results that the characteristics were not changed after rewriting was made as much times as $10^5$ with the content y of Te being in the range of $25 \leq y \leq 75$.

(5) Relationships with composition of elements other than Cr

Figure 6:
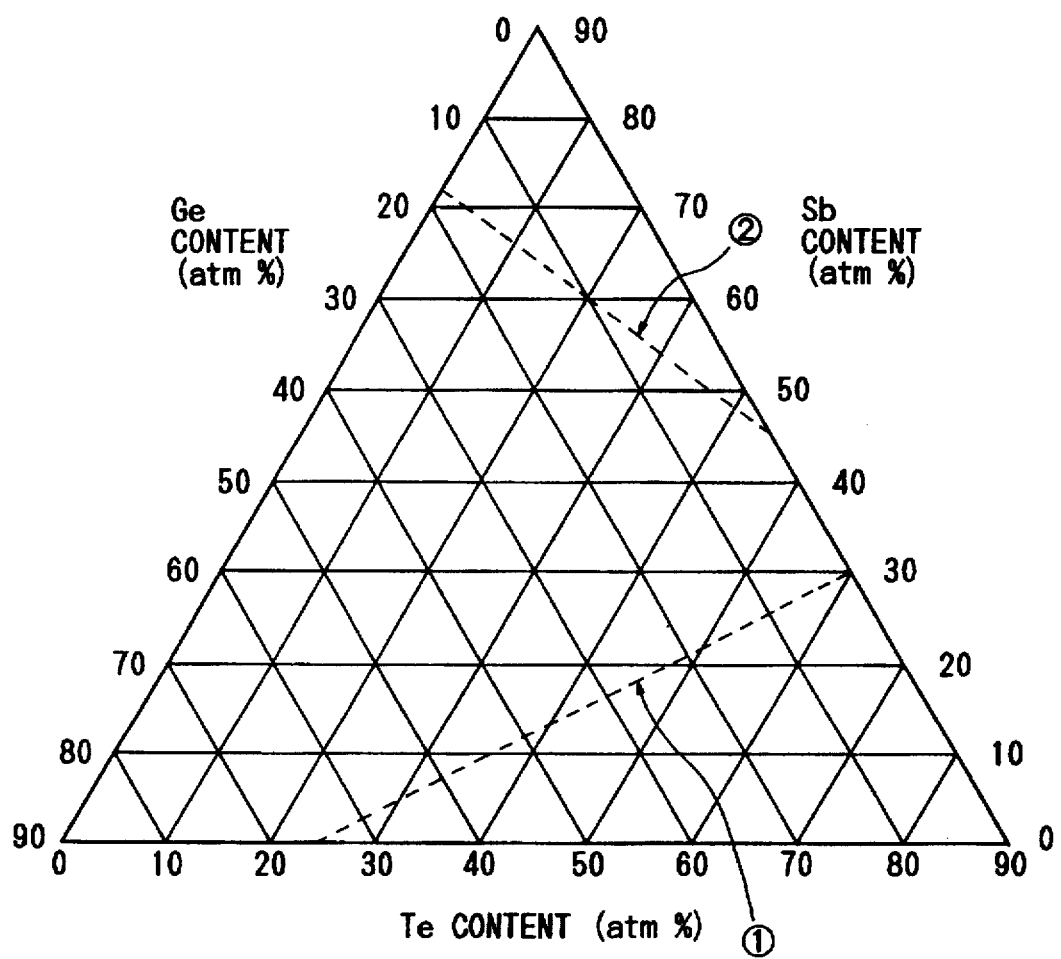
FIG. 6 is a ternary system triangular composition diagram illustrating compositions of a recording thin film in an embodiment according to the present invention.

The inventors measured crystallization temperature of unrecorded portion of the recording layer 3 when the composition of the recording layer 3 was changed on line 1 connecting $Ge_{65}Te_{25}Cr_{10}$ and $Sb_{30}Te_{60}Cr_{10}$ in a ternary system triangular composition diagram in FIG. 6 in which content of Cr was kept constant and when the temperature was increased at a constant speed. They also measured change of bit error rate when the recording layer 3 was put at 80° C. temperature and 95% relative humidity for 1,000 hours. As results, the following data were obtained.

| | Crystallization temperature |
|---|---|
| $Sb_{30}Te_{60}Cr_{10}$ | 120° C. |
| $Sb_{28}Te_{58}Ge_4Cr_{10}$ | 150° C. |
| $Sb_{25}Te_{55}Ge_{10}Cr_{10}$ | 160° C. |
| $Sb_{22}Te_{51}Ge_{17}Cr_{10}$ | 170° C. |
| $Sb_{12}Te_{38}Ge_{40}Cr_{10}$ | 190° C. |
| $Sb_2Te_{28}Ge_{60}Cr_{10}$ | 220° C. |
| | Change of bit error rate |
| $Sb_{30}Te_{60}Cr_{10}$ | 2 times |
| $Sb_{28}Te_{58}Ge_4Cr_{10}$ | 2 times |
| $Sb_{25}Te_{55}Ge_{10}Cr_{10}$ | 2 times |
| $Sb_{22}Te_{51}Ge_{17}Cr_{10}$ | 2.5 times |
| $Sb_{12}Te_{38}Ge_{40}Cr_{10}$ | 4 times |
| $Sb_2Te_{23}Ge_{60}Cr_{10}$ | 5 times |

We can see from the results that the crystallization temperatures were sufficiently high even with change of the composition of elements other than Cr and the change of bit error rate was not too high at the high temperature and humidity.

Also, the inventors measured crystallization temperature of unrecorded portion of the recording layer 3 when the composition of the recording layer 3 was changed on line 2 connecting $Sb_{45}Te_{45}Cr_{10}$ and $Ge_{18}Te_{72}Sb_{10}$ in the ternary system triangular composition diagram in FIG. 6 in which content of Cr was kept constant and when the temperature was increased at a constant speed. They also measured change of bit error rate when the recording layer 3 was put at 80° C. temperature and 95% relative humidity for 1,000 hours. As results, the following data were obtained.

| | Crystallization temperature |
|---|---|
| $Sb_2Te_{71}Ge_{17}Cr_{10}$ | 210° C. |
| $Sb_4Te_{69}Ge_{17}Cr_{10}$ | 200° C. |
| $Sb_8Te_{67}Ge_{15}Cr_{10}$ | 190° C. |
| $Sb_{23}Te_{58}Ge_9Cr_{10}$ | 170° C. |
| $Sb_{30}Te_{54}Ge_6Cr_{10}$ | 150° C. |
| $Sb_{38}Te_{49}Ge_3Cr_{10}$ | 130° C. |
| $Sb_{41}Te_{47}Ge_2Cr_{10}$ | 110° C. |
| | Change of bit error rate |
| $Sb_2Te_{71}Ge_{17}Cr_{10}$ | 5 times |
| $Sb_4Te_{69}Ge_{17}Cr_{10}$ | 3 times |
| $Sb_8Te_{67}Ge_{15}Cr_{10}$ | 2 times |
| $Sb_{23}Te_{58}Ge_9Cr_{10}$ | 1.5 times |
| $Sb_{30}Te_{54}Ge_6Cr_{10}$ | 1.5 times |
| $Sb_{38}Te_{49}Ge_3Cr_{10}$ | 1 time |
| $Sb_{41}Te_{47}Ge_2Cr_{10}$ | 1 time |

We can see from the results that the crystallization temperatures were sufficiently high even with change of the composition of elements other than Cr and the change of bit error rate was not too high at the high temperature and humidity.

Further, the inventor measured change of bit error rate with ratio (p/x) of content p of Ge to content x of Sb changed when the recording layer 3 was put at 80° C. temperature and 95% relative humidity for 1,000 hours. As results, the following data were obtained.

| | Change of bit error rate |
|---|---|
| (p/x) = 0.15 | 2.0 times |
| (p/x) = 0.25 | 1.5 times |
| (p/x) = 0.5 | 1.5 times |
| (p/x) = 1.0 | 1.5 times |
| (p/x) = 2.0 | 3.0 times |

We can see from the results that the change of bit error rate was very little when the ratio (p/x) of content p of Ge to content x of Sb was in the range of $0.25 \leq p/x \leq 1.0$.

Still further, the inventors measured the carrier-to-noise ratio (C/N) of a reproduced signal after rewriting was made $10^5$ times under the severe condition of laser beam power 15% higher than the optimum level when content of $Cr_4Te_5$ was changed with ratio of remaining content x of Sb to y of Te to p of Ge kept x:y:p=2:5:2. As results, the following contents q of Cr were obtained.

| | The carrier-to-noise ratios (C/N) of the reproduced signal after rewriting was made $10^5$ times were: |
|---|---|
| q = 0 | 42 dB |
| q = 3 | 46 dB |
| q = 4 | 48 dB |
| q = 10 | 50 dB |
| q = 20 | 50 dB |
| q = 34 | 48 dB |

Still further, the inventors measured an "erase ratio" of a reproduced signal after rewriting was made $10^5$ times under the severe condition of laser beam power 15% higher than the optimum level when content q of Cr was changed. The erase ratio is a ratio of a previously recorded signal before and after a new signal of different frequency is overwritten on it, being in dB. As results, the following erase ratios were obtained.

| | Erase ratio |
|---|---|
| q = 22 | 25 dB |
| q = 34 | 23 dB |
| q = 40 | 20 dB |
| q = 50 | 17 dB |

We can see from the results that the erase ratio is decreased with the content q of Cr.

Still further, the inventors measured the carrier-to-noise ratio (C/N) of a reproduced signal after rewriting was made $10^5$ times under the severe condition of laser beam power 15% higher than the optimum level when content x of Sb was changed in a system in which Cr was added by 10%, with content y of Te kept constant.

| | The carrier-to-noise ratios (C/N) of the reproduced signal after rewriting was made $10^5$ times were: |
|---|---|
| x = 38 | 48 dB |
| x = 30 | 50 dB |
| x = 15 | 50 dB |
| x = 8 | 50 dB |
| x = 4 | 48 dB |
| x = 2 | 46 dB |
| x = 0 | 45 dB |

We can see from the results that carrier-to-noise ratios (C/N) of the reproduced signal are well when the content x of Sb is larger than 2 atomic %.

As described so far, we can see that embodiment 1 provides greatly excellent features. The recording layer 3 composed of $Sb_{16}Te_{55}Ge_{16}Cr_{13}$, that is, $((Ge_2Sb_2Te_5)_7(Cr_4Te_5)_3)$ has the change of bit error rate not higher than two times when the recording layer 3 is put at 80° C. temperature and 95% relative humidity for 1,000 hours. The recording layer 3 also has the carrier-to-noise ratio (C/N) and the erase ratio of the reproduced signal not lower than 50 dB and 28 dB, respectively, after rewriting is made $10^5$ times under the severe condition of laser beam power 15% higher than the optimum level. Therefore, the recording layer 3 is rewritable not less than $2 \times 10^5$ times.

(6) Example 1 of other added elements

Parts or all of the additive Cr can be replaced by at least one of Ag, Cu, Ba, Co, La, Ni, Pt, Si, and Sr and lanthanoid elements to obtain characteristics similar to the ones mentioned above. When Cu of quantity q was added, for example, the following data were obtained.

| | Number of possible rewritings |
|---|---|
| q = 0 | $5 \times 10^4$ |
| q = 1.0 | $8 \times 10^4$ |
| q = 4.0 | $1 \times 10^5$ |
| q = 10.0 | $2 \times 10^5$ |
| q = 20.0 | $2 \times 10^5$ |
| q = 34.0 | $2 \times 10^5$ |
| q = 40.0 | $1 \times 10^5$ |

We can see from the results that the number of possible rewritings can be greatly increased with addition of Cu.

(7) Example 2 of other added elements

It is preferable to add in addition to Cr, thallium Tl having an effect of quickening erasing and increasing the C/N. Tl is desirable to increase further the C/N and the number of possible rewritings than the addition of Cr alone. Sum of addition quantities of Cr and Tl should be preferably not more than 30 atm % (atomic %) so that erase residue cannot become too much. The sum of addition quantities of Cr and Tl should be more preferably between not less than 0.5 atm % and not more than 20 atm %.

For example, a recording layer of $Ge_{8.2}Sb_{16.4}Te_{64.4}Tl_{0.5}Cr_{10.5}$ provided C/N of 50 dB and number of possible rewritings of $2 \times 10^5$.

Parts or all of the additive Tl can be replaced by at least one of halogen elements to obtain characteristics similar to the ones mentioned above.

When the additive Tl was replaced by nitrogen N, the number of possible rewritings was further increased. When it was too much, the read signal level was decreased.

(8) Example 3 of other added elements

Also, the thallium Tl can be replaced by Se. When quantity of the additive Se was between not less than 1 atm % (atomic %) and not more than 10 atm % while relative ratios of the other elements were kept constant, oxidation resistance was effectively increased.

(9) Other examples of phase change component

Parts of $Ge_2Sb_2Te_5$ which is a phase change component of embodiment 1 can be replaced by at least one of $GeSb_2Te_4$, $GeSb_4Te_7$, $In_3SbTe_2$, $In_{35}Sb_{32}Te_{33}$, and $In_{31}Sb_{26}Te_{43}$, and close compositions to these to obtain characteristics similar to the ones mentioned above. Also, parts of Ge can be replaced by In to obtain the characteristics similar to the ones mentioned above.

(10) Other examples of high melting point component

The high melting point component to be precipitated may be any of proper compounds, elements, and alloys. Parts or all of $Cr_4Te_5$ which is a high melting point component of embodiment 1 can be replaced by at least one of high melting point components to provide effects similar to the ones mentioned above:

$LaTe_2$, $La_2Te_3$, $La_3Te_4$, $LaTe$, $La_2Te_5$, $La_4Te_7$, $LaTe_3$, $La_3Te$, $La_2Sb$, $La_3Sb_2$, $LaSb$, $LaSb_2$, $La_3Ge$, $La_5Ge_3$, $La_4Ge_3$, $La_5Ge_4$, $LaGe$, $La_3Ge_5$, $Ag_2Te$, $Cr_5Te_8$, $Cr_2Te_3$, $CrSb$, $Cr_3Ge$, $Cr_5Ge_3$, $Cr_{11}Ge_8$, $CrGe$, $Cr_{11}Ge_{19}$, $PtTe_2$, $Pt_4Te_5$, $Pt_5Te_4$, $Pt_4Sb$, $Pt_3Sb_2$, $PtSb$, $Pt_3Ge$, $Pt_2Ge$, $Pt_3Ge_2$, $PtGe$, $Pt_2Ge_3$, $PtGe_3$, $NiTe$, $NiTe_{0.85}$, $NiSb$, $Ni_3Ge$, $Ni_5Ge_2$, $Ni_5Ge_3$, $NiGe$, $CoTe_2$, $CoSb_2$, $CoSb_3$, $Co_5Ge_2$, $Co_5Ge_3$, $CoGe$, $Co_5Ge_7$, $CoGe_2$, $Si_2Te_3$, $SiSb$, $SiGe$, $CeTe$, $Ce_3Te_4$, $Ce_2Te_3$, $Ce_4Te_7$, $CeTe_2$, $CeTe_3$, $Ce_2Sb$, $Ce_5Sb_3$, $Ce_4Sb_5$, $CeSb$, $CeSb_2$, $Ce_3Ge$, $Ce_5Ge_3$, $Ce_4Ge_3$, $Ce_5Ge_4$, $CeGe$, $Ce_3Ge_5$, $Ce_5Si_3$, $Ce_3Si_2$, $Ce_5Si_4$, $CeSi$, $Ce_3Si_5$, $CeSi_2$, $Cr_3Si$, $Cr_5Si_3$, $CrSi$, $CrSi_3$, $CrSi_2$, $Co_3Si$, $CoSi$, $CoSi_2$, $NiSi_2$, $NiSi$, $Ni_3Si_2$, $Ni_2Si$, $Ni_5Si_2$, $Ni_3Si$, $Pt_5Si_2$, $Pt_2Si$, $PtSi$, $LaSi_2$, $Ag_3In$, $Ag_2In$, $Bi_2Ce$, $BiCe$, $Bi_3Ce_4$, $Bi_3Ce_5$, $BiCe_2$, $Cd_{11}Ce$, $Cd_6Ce$, $Cd_{58}Ce_{13}$, $Cd_3Ce$, $Cd_2Ce$, $CdCe$, $Ce_3In$, $Ce_2In$, $Ce_{1+x}In$, $Ce_3In_5$, $CeIn_2$, $CeIn_3$, $Ce_2Pb$, $CePb$, $CePb_3$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, $CeZn$, $CeZn_2$, $CeZn_3$, $Ce_3Zn_{11}$, $Ce_{13}Zn_{58}$, $CeZn_5$, $Ce_3Zn_{22}$, $Ce_2Zn_{17}$, $CeZn_{11}$, $Cd_{21}Co_5$, $CoGa$, $CoGa_3$, $CoSn$, $Cr_3Ga$, $CrGa$, $Cr_5Ga_6$, $CrGa_4$, $Cu_9Ga_4$, $Cu_3Sn$, $Cu_3Zn$, $Bi_2La$, $BiLa$, $Bi_3La_4$, $Bi_3La_5$, $BiLa_2$, $Cd_{11}La$, $Cd_{17}La_2$, $Cd_9La_2$, $Cd_2La$, $CdLa$, $Ga_6La$, $Ga_2La$, $GaLa$, $Ga_3La_5$, $GaLa_3$, $In_3La$, $In_2La$, $In_5La_3$, $In_xLa$, $InLa$, $InLa_2$, $InLa_3$, $La_5Pb_3$, $La_4Pb_3$, $La_{11}Pb_{10}$, $La_3Pb_4$, $La_5Pb_4$, $LaPb_2$, $LaPb_3$, $LaZn$, $LaZn_2$, $LaZn_4$, $LaZn_5$, $La_3Zn_{22}$, $La_2Zn_{17}$, $LaZn_{11}$, $LaZn_{13}$, $NiBi$, $Ga_3Ni_2$, $GaNi$, $Ga_2Ni_3$, $Ga_3Ni_5$, $GaNi_3$, $Ni_3Sn$, $Ni_3Sn_2$, $Ni_3Sn_4$, $NiZn$, $Ni_5Zn_{21}$, $PtBi$, $PtBi_2$, $PtBi_3$, $PtCd_2$, $PtCd_9$, $Ga_7Pt_3$, $Ga_2Pt$, $Ga_3Pt_2$, $GaPt$, $Ga_3Pt_5$, $GaPt_2$, $GaPt_3$, $In_7Pt_3$, $In_2Pt$, $In_3Pt_2$, $InPt$, $In_5Pt_6$, $In_2Pt_3$, $InPt_2$, $InPt_3$, $Pt_3Pb$, $PtPb$, $Pb_2Pb_3$, $Pt_3Sn$, $PtSn$, $Pt_2Sn_3$, $PtSn_2$, $PtSn_4$, $Pt_3Zn$, $PtZn_2$, $AlS$, $Al_2S_3$, $BaS$, $BaC_2$, $CdS$, $Co_4S_3$, $Co_9S_8$, $CoS$, $CoO$, $Co_2O_4$, $Co_2O_3$, $Cr_2O_3$, $Cr_3O_4$, $CrO$, $CrS$, $CrN$, $Cr_2N$, $Cr_{23}C_{63}$, $Cr_7C_3$, $Cr_3C_2$, $Cu_2S$, $Cu_9S_5$, $CuO$, $Cu_2O$, $In_4S_5$, $In_3S_4$, $La_2S_3$, $La_2O_3$, $Mo_2C$, $MoC$, $Mn_{23}C_6$, $Mn_4C$, $Mn_7C_3$, $NiO$, $SiS_2$, $SiO_2$, $Si_3N_4$.

Also, parts or all of $Cr_4Te_5$ can be replaced by at least one of high melting point compounds containing elements of group B, compounds approximate to them, and their mixed compositions or compounds of three or more elements approximate to them to provide effects similar to the ones mentioned above:

$Cu_2Te$, $CuTe$, $Cu_3Sb$, $Mn_2Sb$, $MnTe$, $MnTe_2$, $Mn_5Ge_3$, $Mn_{3.25}Ge$, $Mn_5Ge$, $Mn_3Ge_2$, $Ge_3W$, $Te_2W$, $AlSb$, $Al_2Te_3$, $Fe_2Ge$, $FeGe_2$, $FeSb_2$, $Mo_3Sb_7$, $Mo_3Te_4$, $MoTe_2$, $PbTe$, $GePd_2$, $Ge_2Pd_5$, $Ge_9Pd_{25}$, $GePd_5$, $Pd_3Sb$, $Pd_5Sb_3$, $PdSb$, $SnTe$, $Ti_5Ge_3$, $Ge_{31}V_{17}$, $Ge_8V_{11}$, $Ge_3V_5$, $GeV_3$, $V_5Te_4$, $V_3Te_4$, $ZnTe$, $Ag_2Se$, $Cu_2Se$, $Al_2Se_3$, $InAs$, $CoSe$, $Mn_3In$, $Ni_3In$, $NiIn$, $Ni_2In_3$, $Ni_3In_7$, and $PbSe$.

Of all the high melting point components mentioned above, the following ones are particularly preferable as their recording and erasing characteristics can be stabilized by fewer times of initial stabilization:

$LaSb$, $CrSb$, $CoSb$, $Cr_3Te_4$, $LaTe_3$, $Cr_4Te_5$, $Cr_2Te_3$, $Cr_3Te_4$, $CoTe$, $Co_3Te_4$, $Cu_2Te$, $CuTe$, $Cu_3Sb$, $MnTe$, $MnTe_2$, and $Mn_2Sb$.

(11) Quantities of contents of high melting point components

The oxide, sulphide, nitride, and carbide contained in the precipitate of the high melting point components should be preferably less than 40 atm % of the high melting point components, more preferably less than 10 atm % of the high melting point components. If the contents are too much, they prevent difference of their complex refractive indexes from that of the phase change component to be made little, and cause oxygen and other elements to diffuse into the phase change component, thereby deteriorating the recording and reproduction characteristics.

The above-mentioned compounds as examples of high melting point components had interface reflectance between the high melting point component and the phase-change component changed as shown below if content v' (atm %) of transient metal elements in the high melting point components is different.

| | Interface reflectance |
|---|---|
| v' = 25% | 1% |
| v' = 35% | 2% |
| v' = 50% | 6% |

We can see from the results that the interface reflectance is increased with the content v' (atm %) of the transient metal elements.

(12) Content of high melting point compound contained in recording thin film

Content a' of the high melting point compound contained in the recording thin film is given in terms of ratio of sum of number of atoms of elements composing the high melting point compound to that of all elements composing the recording thin film component. When the content a' was changed, the inventors found change of the number of possible rewritings and change of the erase ratio after rewriting was made $10^5$ times under the severe condition of laser beam power 15% higher than the optimum level. The change of C/N is due to change of the carrier level.

| | Number of possible rewritings |
|---|---|
| a' = 5 atm % | $4 \times 10^4$ |
| a' = 10 atm % | $1 \times 10^5$ |
| a' = 20 atm % | $1.5 \times 10^5$ |
| a' = 30 atm % | $2 \times 10^5$ |

| | Erase ratio after $10^5$ rewritings |
|---|---|
| a' = 30 atm % | 30 dB |
| a' = 40 atm % | 30 dB |
| a' = 50 atm % | 25 dB |
| a' = 60 atm % | 23 dB |

We can see from the results that the number of possible rewritings can be increased with the content a' of the high melting point compound contained in the recording thin film, but the erase ratio after $10^5$ rewritings is decreased with too much increase of the content a'. It is therefore preferable that the content a' is in a range of 10 atm % $\leq$ a' $\leq$ 50 atm %.

(13) Complex refractive index of high melting point component

Differences of a real part $n_1$ and an imaginary part (extinction coefficient) $k_1$ of the complex refractive index of the high melting point component from the respective ones $n_2$ and $k_2$ of crystallized phase change component are given as $$\Delta n = (|n_1 - n_2|/n_1) \times 100$$

and $$\Delta k = (|k_1 - k_2|/k_1) \times 100.$$

When the differences are changed, the inventors found changes of the C/N of the reproduced signal after rewriting was made $10^5$ times under the severe condition of laser beam power 15% higher than the optimum level. The change of C/N is mainly due to change of the noise level.

C/N of reproduced signal after $10^5$ rewritings

| | |
|---|---|
| $\Delta k$, $\Delta n$ = 10% | 49 dB |
| $\Delta k$, $\Delta n$ = 20% | 48 dB |
| $\Delta k$, $\Delta n$ = 30% | 47 dB |
| $\Delta k$, $\Delta n$ = 40% | 46 dB |
| $\Delta k$, $\Delta n$ = 50% | 43 dB |

We can see from the results that the above-mentioned differences $\Delta n$ and $\Delta k$ of the real parts and the imaginary parts (extinction coefficients) of the complex refractive indexes should be preferably little.

(14) Formation and size of precipitation of high melting point component

The above-mentioned high melting point components, such as $Cr_4Te_5$, are precipitated inside the recording layer 3 in such forms as shown in FIGS. 1A, 1B, and 1C. These figures show portion Z in FIG. 3.

FIG. 1A shows a state that numbers of granular precipitates of the high melting point component 3b are independently distributed in the recording layer 3. The other portion of the recording layer 3 than the high melting point component 3b, that is, the remaining component, is the phase change component 3a. Lateral length of the high melting point component 3b is virtually the same as the length perpendicular to the layer surfaces, or even difference is little. Some precipitates of the high melting point component 3b are in contact with either of the interfaces of the recording layer 3, and the other are separated from the interfaces.

The high melting point component 3b of the medium shown in FIG. 3 is made of $Cr_4Te_5$, and the phase change component 3a is of $Ge_2Sb_2Te_5$.

FIG. 1B shows the same state that numbers of granular precipitates of the high melting point component 3b are independently distributed in the recording layer 3 as in FIG. 1A. However, it is different in that the high melting point component 3b is columnarly precipitated. That is, the length of the high melting point component 3b perpendicular to the layer surfaces is longer than the lateral length. Cross-section of the high melting point component 3b is columnar. Some precipitates of the high melting point component 3b are in contact with either of the interfaces of the recording layer 3, and the other are in contact with the other interface. There are no precipitates that are in contact with both the interfaces.

FIG. 1C shows a state that numbers of granular precipitates of the high melting point component 3b are connected together to unite in the recording layer 3. That is, the high melting point component 3b is porously precipitated, and phase change component 3a is embed in numerous pores of the high melting point component 3b. The porous high melting point component 3b is in contact with both interfaces of the recording layer 3. The phase change component 3a is independently distributed in the recording layer 3. The distribution in FIG. 1C has the phase change component 3a replaced by the high melting point component 3b each other in FIG. 1A.

One of the states in FIGS. 1A, 1B, and 1C occurs depending on the filming conditions and initial crystallization conditions. Any of the states prevents the phase change component 3a from flowing and segregating due to the high melting point component 3b even if the recording layer 3 is heated to melt. As a result, the number of possible rewritings is increased.

The terms "maximum external dimension d'", "heights h, h', and h''", "distance i between precipitate centers", "maximum pore dimension p''", and "maximum wall thickness w" as used herein are defined as follows.

Figure 2A:
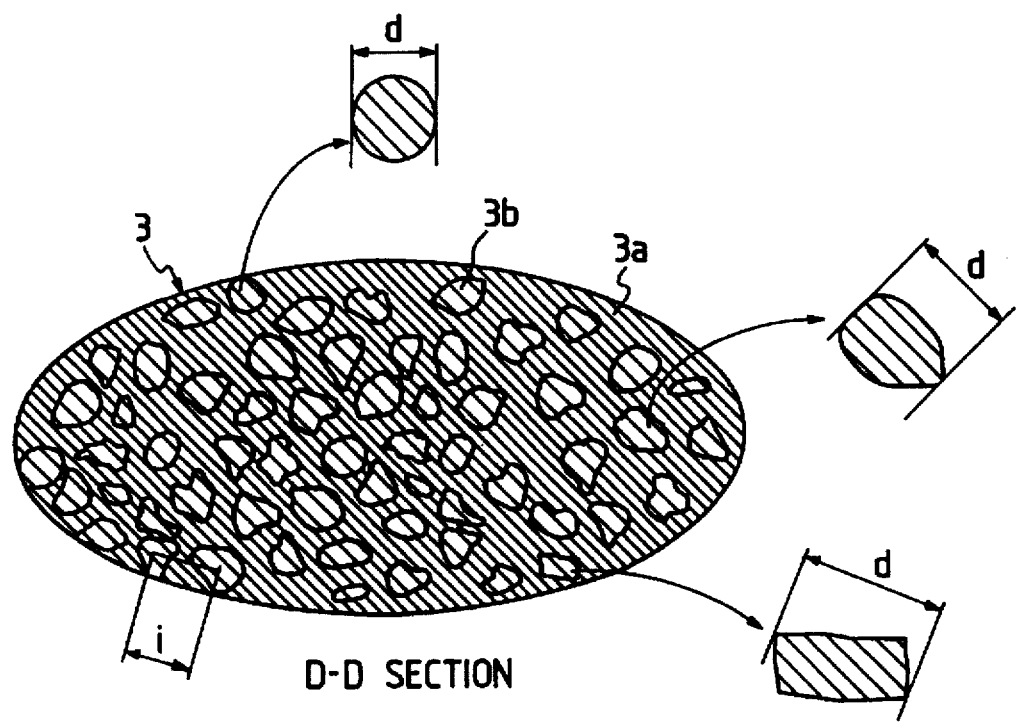
FIG. 2A is a cross-section D—D illustrating a state that numbers of granular or columnar precipitates of a high melting point component in an information recording medium in an embodiment according to the present invention.
Figure 2B:
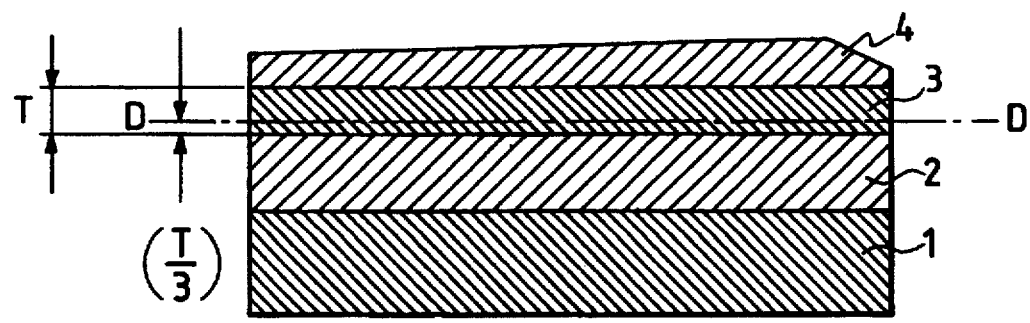
FIG. 2B is a partial cross-section perpendicular to a laminated film surface illustrating an information recording medium in an embodiment according to the present invention.

For the independent precipitate distribution of the high melting point component 3b as in FIGS. 1A and 1B, a section D—D (hereinafter referred to as the first reference section) as in FIG. 2B is taken at a distance of one third of thickness of the recording layer 3 from either of the interfaces in parallel with the interfaces. Lengths of the precipitates of the high melting point components 3b on the first reference section is should be measured. The maximum length in a direction is denoted as the maximum external dimension d'.

The maximum external dimension d', as shown in FIG. 2A, is diameter if shape of the precipitate on the first reference section is circular or near to circle. It is major axis if the shape is elliptic or near to ellipse. It is the longest diagonal if the shape is polygonal.

A section (hereinafter referred to as the second reference section) perpendicular to the interfaces of the recording layer 3 is taken. Lengths of the precipitates of the high melting point component 3b in a direction perpendicular to the interfaces is should be measured. The each of the lengths obtained is denoted as the height h.

Figure 4A:
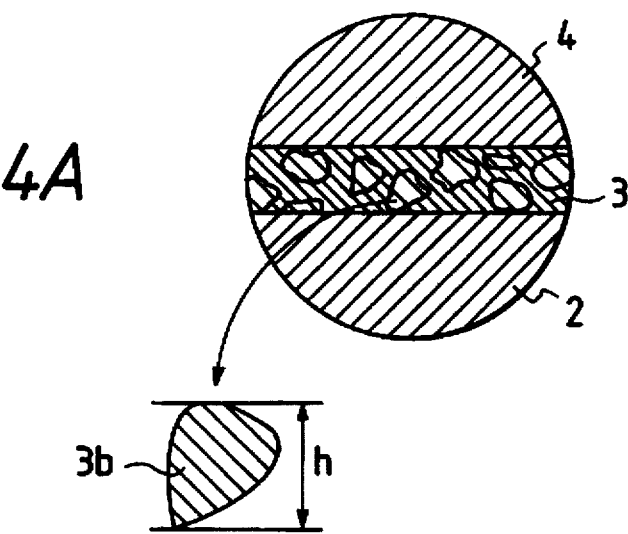
FIG. 4A is a cross-section illustrating measurement of size of granular precipitates of a high melting point component in an recording thin film in an embodiment according to the present invention.
Figure 4B:
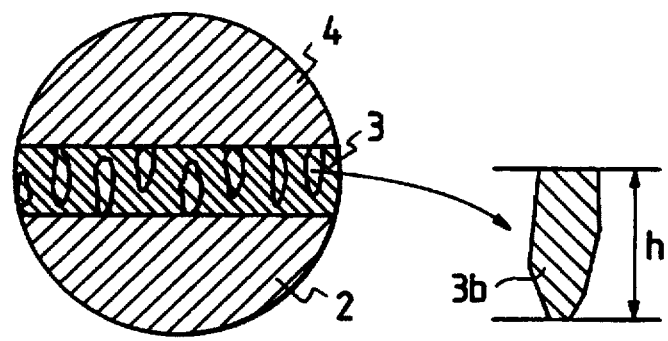
FIGS. 4B and C are cross-sections illustrating measurements of sizes of columnar precipitates of a high melting point component in an recording thin film in an embodiment according to the present invention.

The height h is applied to the distribution of granular precipitates of the high melting point component 3b as shown in FIG. 4A and to the distribution of columnar precipitates of the high melting point component 3b which are in contact with both the interfaces of the recording layer 3 as shown in FIG. 4B.

Figure 4C:
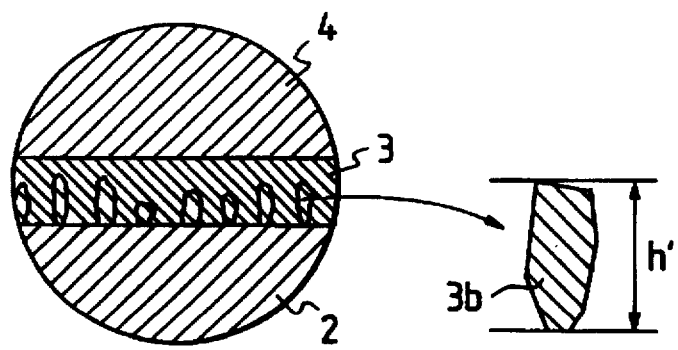

The heights h' and h" are similar to the above-mentioned height h. The height h' is different in that as shown in FIG. 4C, the columnar distributed precipitates of the high melting point component 3b are in contact with only the single interface of the recording layer 3. The height h" is different in that as the columnar distributed precipitates of the high melting point component 3b are not in contact with interfaces of the recording layer 3.

The distance i between precipitate centers, as shown in FIG. 2A, is a mean distance between centers of adjacent precipitates of the high melting point component 3b on the above-mentioned first reference section.

The maximum pore dimension p", as shown in FIG. 1C, is a maximum dimension of the holes of the precipitates of the high melting point component 3b on the above-mentioned reference section. The dimension is applied to the precipitates of the porous high melting point component 3b.

Figure 5:
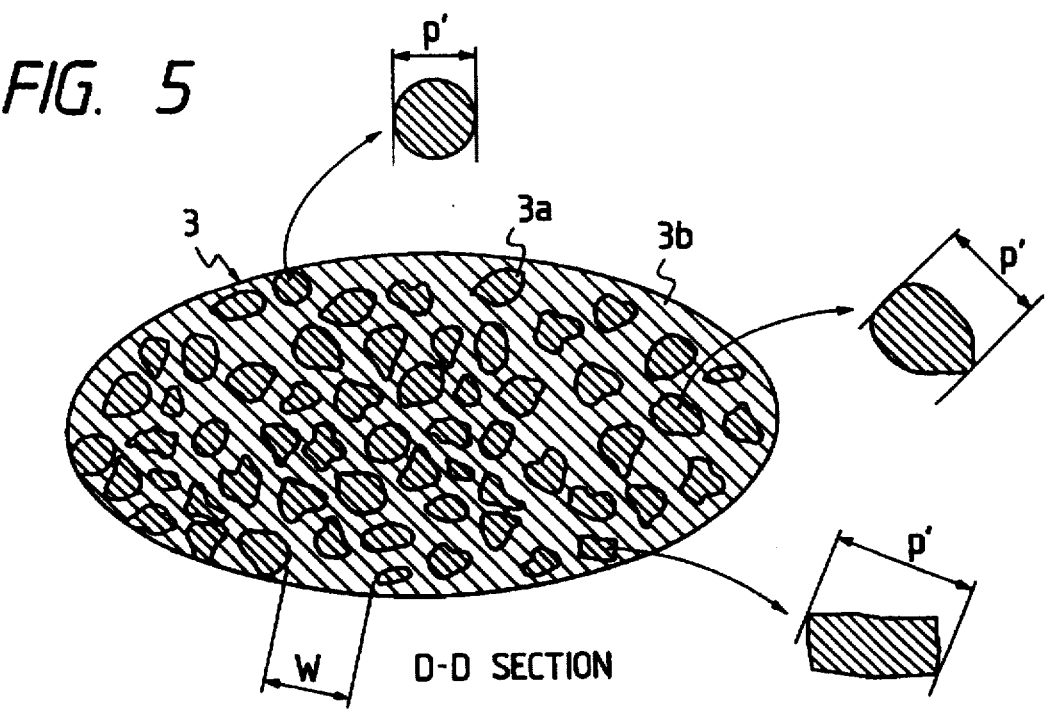
FIG. 5 is a cross-section parallel to film surface illustrating a state that numbers of porous precipitates of a high melting point component in an recording thin film in an embodiment according to the present invention.

The maximum pore dimension p", as shown in FIG. 5, is diameter if shape of the pores on the first reference section is circular or near to circle. It is major axis if the shape is elliptic or near to ellipse. It is the longest diagonal if the shape is polygonal.

The maximum wall thickness w, like the maximum pore dimension p" is applied to the precipitates of the porous high melting point component 3b. It, as shown in FIG. 5B, is a maximum value of walls between adjacent pores of the precipitates of the high melting point component 3b on the above-mentioned first reference section.

Identical references in FIGS. 1A, 1B, 1C, 2A, 2B, 3, 4A, 4B, 4C, and 5 indicate same portions.

(15) Relationships with size of precipitate of high melting point component

When the maximum external dimension d' of the precipitates of the high melting point component 3b was different, the number of possible rewritings and the carrier-to-noise ratio (C/N) of a reproduced signal after rewriting was made $10^5$ times under the severe condition of laser beam power 15% higher than the optimum level were changed as follows. The change of C/N is mainly due to change of the noise level. It is preferable that the number of possible rewritings and the C/N are $1 \times 10^5$ times and not lower than 46 dB, respectively.

|  | Number of possible rewritings |
|---|---|
| d' = 50 nm | $2 \times 10^5$ times |
| d' = 30 nm | $2 \times 10^5$ times |
| d' = 10 nm | $2 \times 10^5$ times |
| d' = 5 nm | $1.5 \times 10^5$ times |
| d' = 1 nm | $4 \times 10^4$ times |
|  | C/N of reproduced signal after $10^5$ rewritings |
| d' = 80 nm | 46 dB |
| d' = 50 nm | 47 dB |
| d' = 20 nm | 49 dB |
| d' = 15 nm | 49 dB |
| d' = 5 nm | 50 dB |

We can see from the results that the maximum external dimension d' should be preferably in a range of 5 nm $\leq$ d' $\leq$ 50 nm.

When the columnar high melting point component 3b was precipitated from the both interfaces of the recording layer 3 as shown in FIG. 4B, the number of possible rewritings was changed as the height h of the precipitate is different.

|  | Number of possible rewritings |
|---|---|
| h = 30 nm | $2 \times 10^5$ times |
| h = 20 nm | $1.5 \times 10^5$ times |
| h = 10 nm | $1 \times 10^5$ times |
| h = 0 nm | $4 \times 10^4$ times |

We can see from the results that the height h should be preferably in a range of 10 nm $\leq$ h.

When the columnar high melting point component 3b was precipitated from the single interface of the recording layer 3 as shown in FIG. 4C, the number of possible rewritings was changed as the height h' of the precipitate are different.

| | Number of possible rewritings |
|---|---|
| h' = 20 nm | $2 \times 10^5$ times |
| h' = 10 nm | $1.5 \times 10^5$ times |
| h' = 5 nm | $1 \times 10^5$ times |
| h' = 1 nm | $4 \times 10^4$ times |

When the columnar high melting point component 3b was precipitated inside without reaching interfaces of the recording film, the number of possible rewritings changed as the height "h" of the precipitate changed.

| | Number of possible rewritings |
|---|---|
| h" = 20 nm | $2 \times 10^5$ times |
| h" = 10 nm | $1.5 \times 10^5$ times |
| h" = 5 nm | $1 \times 10^5$ times |
| h" = 1 nm | $4 \times 10^4$ times |

We can see from the results that the heights h' and h" should be preferably in a range of 5 nm≦h', h".

When the distance i between precipitate centers of the high melting point component 3b was different, the number of possible rewritings and the carrier-to-noise ratio (C/N) of a reproduced signal after rewriting was made $10^5$ times under the severe condition of laser beam power 15% higher than the optimum level were changed as follows. The change of C/N is mainly due to change of the carrier level.

| | Number of possible rewritings |
|---|---|
| i = 120 nm | $8 \times 10^4$ times |
| i = 90 nm | $1.5 \times 10^5$ times |
| i = 70 nm | $1.8 \times 10^5$ times |
| i = 60 nm | $2 \times 10^5$ times |
| i = 40 nm | $2 \times 10^5$ times |
| i = 15 nm | $2 \times 10^5$ times |

| | C/N of reproduced signal after $10^5$ rewritings |
|---|---|
| i = 70 nm | 50 dB |
| i = 40 nm | 50 dB |
| i = 30 nm | 49 dB |
| i = 20 nm | 46 dB |
| i = 15 nm | 45 dB |
| i = 10 nm | 44 dB |
| i = 5 nm | 40 dB |

We can see from the results that the distance i between precipitate centers should be preferably in a range of 20 nm≦i≦90 nm.

When the laterally connected porous high melting point component 3b was precipitated as shown in FIG. 1C, the number of possible rewritings was changed as the maximum pore dimension p" of the precipitate is different.

| | Number of possible rewritings |
|---|---|
| p" = 50 nm | $1.5 \times 10^5$ times |
| p" = 60 nm | $1.5 \times 10^5$ times |
| p" = 80 nm | $1 \times 10^5$ times |
| p" = 100 nm | $4 \times 10^4$ times |

We can see from the results that the maximum pore dimension p" should be preferably in a range of p"≦80 nm.

When the maximum wall thickness w of the porous high melting point component 3b was different, the carrier-to-noise ratio (C/N) of a reproduced signal after rewriting was made $10^5$ times under the severe condition of laser beam power 15% higher than the optimum level was changed as follows. The change of C/N is mainly due to change of the carrier level.

| | C/N of reproduced signal after $10^5$ rewritings |
|---|---|
| w = 5 nm | 50 dB |
| w = 15 nm | 49 dB |
| w = 20 nm | 46 dB |
| w = 35 nm | 40 dB |

We can see from the results that the maximum wall thickness w should be preferably in a range of w≦20 nm.

(16) Relationship with melting point of high melting point component

When the melting point (m.p.) of the high melting point component 3b precipitated in the recording layer 3 was different, the inventors could presumed with computer simulation that the number of possible rewritings would change as follows.

| | Number of possible rewritings |
|---|---|
| m.p. = 600° C. | $7 \times 10^4$ times |
| m.p. = 780° C. | $1.5 \times 10^5$ times |
| m.p. = 930° C. | $2 \times 10^5$ times |

We can see from the results that the melting point of the high melting point component 3b should be preferably not lower than 780° C., more preferably not lower than 930° C.

When difference of the melting point of the remaining component (phase change component 3a) after precipitation of the high melting point component 3b from that of the high melting point component 3b changed, the inventors also could presumed with computer simulation that the number of possible rewritings would change as follows.

| | Number of possible rewritings |
|---|---|
| Difference of m.p. = 0° C. | $7 \times 10^4$ times |
| Difference of m.p. = 150° C. | $1.5 \times 10^5$ times |
| Difference of m.p. = 300° C. | $2 \times 10^5$ times |

We can see from the results that the melting point difference should be preferably not lower than 150° C., more preferably not lower than 300° C.

(17) Relationship with difference of crystallization temperatures of high melting point component and phase change component The inventors measured the temperature at which the heat generation due to crystallization began as it was raised at a constant speed of 10° C. per minute. The number of possible rewritings was changed with difference s of the crystallization temperatures of the high melting point component 3b and the phase change component 3a (low melting point component).

| | Number of possible rewritings |
|---|---|
| s = 5° C. | $4 \times 10^4$ times |
| s = 10° C. | $1 \times 10^5$ times |
| s = 30° C. | $1.5 \times 10^5$ times |
| s = 40° C. | $2 \times 10^5$ times |

We can see from the results that the melting point difference should be preferably not lower than 10° C., more preferably not lower than 30° C.

(18) Relationship with high melting point component evaporated in filming

In forming the information recording thin film of embodiment 1, the initial process has the high melting point component $Cr_4Te_5$ evaporated. When mean film thickness c' of the high melting point component $Cr_4Te_5$ was changed, the number of possible rewritings and the carrier-to-noise ratio (C/N) of a reproduced signal after rewriting was made $10^5$ times under the severe condition of laser beam power 15% higher than the optimum level were changed as follows. The change of C/N is mainly due to change of the carrier level.

|  | Number of possible rewritings |
|---|---|
| c' = 0 nm | $5 \times 10^4$ times |
| c' = 1 nm | $1 \times 10^5$ times |
| c' = 5 nm | $2 \times 10^5$ times |
|  | C/N of reproduced signal after $10^5$ rewritings |
| c' = 1 nm | 47 dB |
| c' = 5 nm | 47 dB |
| c' = 10 nm | 46 dB |
| c' = 20 nm | 40 dB |

We can see from the results that the mean film thickness c' should be preferably in a range of 1 nm $\leq$ c' $\leq$ 10 nm.

(19) Others

The embodiment 1 has the protective layer 2 and intermediate layer 4 formed of $ZnS$—$SiO_2$. The $ZnS$—$SiO_2$ may be alternatively replaced by any of materials of Si—N system, materials of Si—O—N system, $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $ZrO_2$, and similar oxides, TaN, AlN, $Si_3N_4$, materials (for example, $AlSiN_2$) of Al—Si—N system, or similar nitrides, ZnS, $Sb_2S_3$, CdS, $In_2S_3$, $Ga_2S_3$, GeS, $SnS_2$, PbS, $Bi_2S_3$, and similar sulphides, $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, and similar selenides, $CeF_3$, $MgF_2$, $CaF_2$, and similar fluorides, Si, $TiB_2$, $B_4C$, SiC, B, C, and similar amorphous, and the close composition materials of the above-mentioned materials. The protective layer 2 and intermediate layer 4 may be alternatively replaced by layers formed of mixture of the above-mentioned materials or multi-layers of them.

When the intermediate layer 4 was omitted, the recording sensitivity was decreased around 30%, the erase residue was increased around 5 dB, and the number of possible rewritings was decreased.

When the refractive index of the intermediate layer 4 was in a range of 1.7 to 2.3, the C/N obtained was not lower than 50 dB with film thicknesses being in ranges of 1 to 100 nm and 180 nm to 400 nm.

Also, embodiment 1 has the protective layer 5 formed of Al—Ti. The Al—Ti may be alternatively replaced by any of elements, including Au, Ag, Cu, Al, Ni, Fe, Co, Cr, Ti, Pd, Pt, W, Tb, Mo, and Sb, alloys formed mainly of them, layers of the alloys, multi-layers of the layers, composite layers of them with oxides or similar materials.

Further, embodiment 1 has the substrate 1 of polycarbonate having ruggedness formed directly on the surface for tracking guide. The polycarbonate may be alternatively replaced by any of polyolefin, epoxy, acrylic resin, chemically toughened glass having ultra-violet light curing resin layers formed on the surfaces thereof, and similar ones.

Any of the intermediate layer 4, the reflective layer 5, and the protective layer 2 can be omitted to make the medium lamination simple. For example, the medium can be formed of substrate 1/protective layer 2/recording layer 3, substrate 1/recording layer 3/intermediate layer 4, or substrate 1/recording layer 3/reflective layer 5. Even such simple medium structure provided superior characteristics to the conventional ones, with better results even in more number of rewritings.

As described so far, the information recording thin film of embodiment 1 can make number of rewriting times one or more places moved to the left than the conventional ones while it keeps high recording, reproduction, and erase characteristics. It also has the advantage that the recording and erasing laser beam power may be low.

Embodiment 2

In embodiment 2 of the present invention, the inventors prepared an information recording thin film in the same way as in embodiment 1 except that a recording layer 3 was formed of a Sb—Te—In—Cr system to which all of Ge of the corresponding Sb—Te—Ge—Cr system of embodiment 1 was replaced by In. The Sb—Te—In—Cr system has $Cr_{12}In_{35}Sb_{12}Te_{40}$, that is, $(Cr_4Te_5)_2(In_3SbTe_2)_7$. Also, embodiment 2 has the same initial crystallization of the thin film and information recording and reproduction methods as embodiment 1.

(1) Relationships with composition of elements other than Cr

The inventors measured crystallization temperature of unrecorded portion when the other composition was changed on a line connecting $In_{65}Te_{25}Cr_{10}$ and $Sb_{30}Te_{60}Cr_{10}$ in a ternary system triangular composition diagram (not shown) in which content of Cr was kept constant and when the temperature was increased at a constant speed. They also measured change of bit error rate when the recording layer 3 was put at 80° C. temperature and 95% relative humidity for 1,000 hours. As results, the following data were obtained.

|  | Crystallization temperature |
|---|---|
| $Sb_{30}Te_{60}Cr_{10}$ | 120° C. |
| $Sb_{22}Te_{51}In_{17}Cr_{10}$ | 140° C. |
| $Sb_{18}Te_{47}In_{25}Cr_{10}$ | 150° C. |
| $Sb_{10}Te_{35}In_{45}Cr_{10}$ | 170° C. |
| $Sb_7Te_{33}In_{50}Cr_{10}$ | 180° C. |
| $Sb_2Te_8In_{60}Cr_{10}$ | 220° C. |
|  | Change of bit error rate due to high temperature and high humidity |
| $Sb_{22}Te_{51}In_{17}Cr_{10}$ | 2 times |
| $Sb_{18}Te_{47}In_{25}Cr_{10}$ | 2 times |
| $Sb_{10}Te_{35}In_{45}Cr_{10}$ | 2 times |
| $Sb_7Te_{33}In_{50}Cr_{10}$ | 2.5 times |
| $Sb_2Te_8In_{60}Cr_{10}$ | 4 times |

We can see from the results that the crystallization temperatures were sufficiently low even with change of the composition of elements other than Cr and the change of bit error rate was not too high even after rewritings as much as $10^5$ times.

Also, the inventors measured crystallization temperature when the composition was changed on a line connecting $Sb_{65}Te_{25}Cr_{10}$ and $In_{47}Te_{43}Sb_{10}$ in the same ternary system triangular composition diagram in which content of Cr was kept constant and when the temperature was increased at a constant speed. They also measured change of bit error rate when the recording layer 3 was put at 80° C. temperature and 95% relative humidity for 1,000 hours. As results, the following data were obtained.

| | Crystallization temperature |
|---|---|
| $Sb_2Te_{42}In_{46}Cr_{10}$ | 210° C. |
| $Sb_4Te_{42}In_{44}Cr_{10}$ | 200° C. |
| $Sb_8Te_{41}In_{41}Cr_{10}$ | 190° C. |
| $Sb_{15}Te_{39}In_{36}Cr_{10}$ | 180° C. |
| $Sb_{30}Te_{34}In_{26}Cr_{10}$ | 150° C. |
| $Sb_{38}Te_{32}In_{20}Cr_{10}$ | 130° C. |
| $Sb_{41}Te_{32}In_{17}Cr_{10}$ | 110° C. |

| | Change of bit error rate due to high temperature and high humidity |
|---|---|
| $Sb_2Te_{42}In_{46}Cr_{10}$ | 5 times |
| $Sb_4Te_{42}In_{44}Cr_{10}$ | 3 times |
| $Sb_8Te_{41}In_{41}Cr_{10}$ | 2 times |
| $Sb_{15}Te_{39}In_{36}Cr_{10}$ | 1.5 times |
| $Sb_{30}Te_{34}In_{26}Cr_{10}$ | 1.5 times |
| $Sb_{38}Te_{32}In_{20}Cr_{10}$ | 1 time |
| $Sb_{41}Te_{32}In_{17}Cr_{10}$ | 1 time |

We can see from the results that the crystallization temperatures were sufficiently low even with change of the composition of elements other than Cr and the change of bit error rate was not too high even after rewritings as much as $10^5$ times.

Further, the inventors measured change of bit error rate with ratio (p/x) of content p of In to content x of Sb changed when the recording layer 3 was put at 80° C. temperature and 95% relative humidity for 1,000 hours. As results, the following data were obtained.

| | Change of bit error rate |
|---|---|
| (p/x) = 0.5 | 3.0 times |
| (p/x) = 1.0 | 2.0 times |
| (p/x) = 2.0 | 2.0 times |
| (p/x) = 3.0 | 2.0 times |
| (p/x) = 4.0 | 3.0 times |

We can see from the results that the change of bit error rate was little when the ratio (p/x) of content p of In to content x of Sb was in the range of $1.0 \leq p/x \leq 3.0$.

The inventors similar measurements with use of an In—Sb—Te—Cu system to which Cr was replaced by Cu, and obtained similar results when ratio (p/x) of content p of In to content x of Sb was changed.

(2) Other examples of phase change component

A parts or all of $In_3SbTe_2$ which is a phase change component of embodiment 2 can be replaced by at least one of $Ge_2Sb_2Te_5$, $GeSb_4Te_7$, $GeSb_2Te_4$, $In_{35}Sb_{32}Te_{33}$, and $In_{31}Sb_{26}Te_{43}$ to obtain characteristics similar to the ones mentioned above. Also, parts of In can be replaced by Ge to obtain the characteristics similar to the ones mentioned above.

(3) Other examples of high melting point component

A parts or all of $Cr_4Te_5$ which is a high melting point component of embodiment 2 can be replaced by at least one of high melting point components, high melting point compounds, compounds approximate to them, and their mixed compositions or compounds of three or more elements approximate to them to provide effects similar to the ones mentioned above:

$LaTe_3$, $LaTe_2$, $La_2Te_3$, $La_3Te_4$, $LaTe$, $La_2Te_5$, $LaSb$, $La_4Te_7$, $La_3Te$, $La_2Sb$, $La_3Sb_2$, $LaSb_2$, $La_3Ge$, $La_4Ge_3$, $La_4Ge_3$, $La_5Ge_4$, $LaGe$, $La_3Ge_5$, $Ag_2Te$, $Cr_5Te_8$, $Cr_2Te_3$, $CrSb$, $Cr_3Ge$, $Cr_5Ge_3$, $CR_{11}Ge_8$, $CrGe$, $Cr_{11}Ge_{19}$, $PtTe_2$, $Pt_4Te_5$, $Pt_5Te_4$, $Pt_4Sb$, $Pt_3Sb_2$, $PtSb$, $Pt_3Ge$, $Pt_2Ge$, $Pt_3Ge_2$, $PtGe$, $Pt_2Ge_3$, $PtGe_3$, $NiTe$, $NiTe_{0.85}$, $NiSb$, $Ni_3Ge$, $Ni_5Ge_2$, $Ni_5Ge_3$, $NiGe$, $CoTe_2$, $CoSb_2$, $CoSb_3$, $Co_5Ge_2$, $Co_5Ge_3$, $CoGe$, $Co_5Ge_7$, $CoGe_2$, $Si_2Te_3$, $SiSb$, $SiGe$, $CeTe$, $Ce_3Te_4$, $Ce_2Te_3$, $Ce_4Te_7$, $CeTe_2$, $CeTe_3$, $Ce_2Sb$, $Ce_5Sb_3$, $Ce_4Sb_5$, $CeSb$, $CeSb_2$, $Ce_3Ge$, $Ce_5Ge_3$, $Ce_4Ge_3$, $Ce_5Ge_4$, $CeGe$, $Ce_3Ge_5$, $Ce_5Si_3$, $Ce_3Si_2$, $Ce_5Si_4$, $CeSi$, $Ce_3Si_5$, $CeSi_2$, $Cr_3Si$, $Cr_5Si_3$, $CrSi$, $CrSi_3$, $CrSi_2$, $Co_3Si$, $CoSi$, $CoSi_2$, $NiSi_2$, $NiSi$, $Ni_3Si_2$, $Ni_2Si$, $Ni_5Si_2$, $Ni_3Si$, $Pt_5Si_2$, $Pt_2Si$, $PtSi$, $LaSi_2$, $Ag_3In$, $Ag_2In$, $Bi_2Ce$, $BiCe$, $Bi_3Ce_4$, $Bi_3Ce_5$, $BiCe_2$, $Cd_{11}Ce$, $Cd_6Ce$, $Cd_{58}Ce_{13}$, $Cd_3Ce$, $Cd_2Ce$, $CdCe$, $Ce_3In$, $Ce_2In$, $Ce_{1+x}In$, $Ce_3In_5$, $CeIn_2$, $CeIn_3$, $Ce_2Pb$, $CePb$, $CePb_3$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, $CeZn$, $CeZn_2$, $CeZn_3$, $Ce_3Zn_{11}$, $Ce_{13}Zn_{58}$, $CeZn_5$, $Ce_3Zn_{22}$, $Ce_2Zn_{17}$, $CeZn_{11}$, $Cd_{21}Co_5$, $CoGa$, $CoGa_3$, $CoSn$, $Cr_3Ga$, $CrGa$, $Cr_5Ga_6$, $CrGa_4$, $Cu_9Ga_4$, $Cu_3Sn$, $Cu_3Zn$, $Bi_2La$, $BiLa$, $Bi_3La_4$, $Bi_3La_5$, $BiLa_2$, $Cd_{11}La$, $Cd_{17}La_2$, $Cd_9La_2$, $Cd_2La$, $CdLa$, $Ga_6La$, $Ga_2La$, $GaLa$, $Ga_3La_5$, $GaLa_3$, $In_3La$, $In_2La$, $In_5La_3$, $In_xLa$, $InLa$, $InLa_2$, $InLa_3$, $La_5Pb_3$, $La_4Pb_3$, $La_{11}Pb_{10}$, $La_3Pb_4$, $La_5Pb_4$, $LaPb_2$, $LaPb_3$, $LaZn$, $LaZn_2$, $LaZn_4$, $LaZn_5$, $La_3Zn_{22}$, $La_2Zn_{17}$, $LaZn_{11}$, $LaZn_{13}$, $NiBi$, $Ga_3Ni_2$, $GaNi$, $Ga_2Ni_3$, $Ga_3Ni_5$, $GaNi_3$, $Ni_3Sn$, $Ni_3Sn_2$, $Ni_3Sn_4$, $NiZn$, $Ni_5Zn_{21}$, $PtBi$, $PtBi_2$, $PtBi_3$, $PtCd_2$, $Pt_2Cd_9$, $Ga_7Pt_3$, $Ga_2Pt$, $Ga_3Pt_2$, $GaPt$, $Ga_3Pt_5$, $GaPt_2$, $GaPt_3$, $In_7Pt_3$, $In_2Pt$, $In_3Pt_2$, $InPt$, $In_5Pt_6$, $In_2Pt_3$, $InPt_2$, $InPt_3$, $Pt_3Pb$, $PtPb$, $Pt_2Pb_3$, $Pt_3Sn$, $PtSn$, $Pt_2Sn_3$, $PtSn_2$, $PtSn_4$, $Pt_3Zn$, $PtZn_2$, $AlS$, $Al_2S_3$, $BaS$, $BaC_2$, $CdS$, $Co_4S_3$, $Co_9S_8$, $CoS$, $CoO$, $Co_2O_4$, $Co_2O_3$, $Cr_2O_3$, $Cr_3O_4$, $CrO$, $CrS$, $CrN$, $Cr_2N$, $Cr_{23}C_{63}$, $Cr_7C_3$, $Cr_3C_2$, $Cu_2S$, $Cu_9S_5$, $CuO$, $Cu_2O$, $In_4S_5$, $In_3S_4$, $La_2S_3$, $La_2O_3$, $Mo_2C$, $MoC$, $Mn_{23}C_6$, $Mn_4C$, $Mn_7C_3$, $NiO$, $SiS_2$, $SiO_2$, $Si_3N_4$, $Cu_2Te$, $CuTe$, $Cu_3Sb$, $Mn_2Sb$, $MnTe$, $MnTe_2$, $Mn_5Ge_3$, $Mn_{3.25}Ge$, $Mn_5Ge_2$, $Mn_3Ge_2$, $Ge_3W$, $Te_2W$, $AlSb$, $Al_2Te_3$, $Fe_2Ge$, $FeGe_2$, $FeSb_2$, $Mo_3Sb_7$, $Mo_3Te_4$, $MoTe_2$, $PbTe$, $GePd_2$, $Ge_2Pd_5$, $Ge_9Pd_{25}$, $GePd_5$, $Pd_3Sb$, $Pd_5Sb_3$, $PdSb$, $SnTe$, $Ti_5Ge_3$, $Ge_{31}V_{17}$, $Ge_8V_{11}$, $Ge_3V_5$, $GeV_3$, $V_5Te_4$, $V_3Te_4$, $ZnTe$, $Ag_2Se$, $Cu_2Se$, $Al_2Se_3$, $InAs$, $CoSe$, $Mn_3In$, $Ni_3In$, $NiIn$, $Ni_2In_3$, $Ni_3In_7$, and $PbSe$.

Of all the high melting point components mentioned above, the following ones are particularly preferable as their recording and erasing characteristics can be stabilized by fewer times of initial stabilization:

$LaSb$, $La_2Te_3$, $La_3Te_4$, $CrSb$, $CoSb$, $Cr_3Te_4$, $Cr_2Te_3$, $Cr_3Te_4$, $CoTe$, $Co_3Te_4$, $Cu_2Te$, $CuTe$, $Cu_3Sb$, $MnTe$, $MnTe_2$, $Mn_2Sb$, $Cr_4Te_5$.

The second embodiment also can have the precipitated high melting point component 3b made in form of compound, element, and alloy.

(4) Quantities of contents of high melting point components

As in embodiment 1, the oxide, sulphide, nitride, and carbide contained in the precipitate of the high melting point components should be preferably less than 50 atm % of the high melting point components, more preferably less than 20 atm % of the high melting point components. If the contents are too much, they allow difference of their complex refractive indexes from that of the phase change component to be made little, and cause oxygen and other elements to diffuse into the phase change component, thereby deteriorating the recording and reproduction characteristics. The other facts which are not disclosed here are same as in embodiment 1.

Embodiment 3

In embodiment 3 of the present invention, the inventors prepared an information recording thin film in the same way as in embodiment 1 except that a recording layer 3 was formed of $Sb_{16}Te_{39}Ge_{15}Co_{22}Si_8$, that is, $(Co_3Si)_{27}(Ge_2Sb_2Te_5)_{28}$, to which all of Cr of the corresponding Sb—Te—Ge—Cr system of embodiment 1 was replaced by Co and Si as elements denoted by B or X in the general representation mentioned above. Also, embodiment 3 has the same initial crystallization of the thin film and information recording and reproduction methods as embodiment 1.

High melting point component of embodiment 3 is $Co_3Si$ and phase change component is $Ge_2Sb_2Te_5$.

The carrier-to-noise ratio (C/N) of a reproduced signal was changed after rewriting was made $10^5$ times under the severe condition of laser beam power 15% higher than the optimum level when content a of $Co_3Si$ was changed with ratio of remaining content x of Sb to y of Te to p of Ge kept x:y:p=2:5:2. The results were same as in embodiment 1.

(1) Other examples of phase change component

Parts or all of $Ge_2Sb_2Te_5$ which is a phase change component of embodiment 3 can be replaced by at least one of $GeSb_4Te_7$, $GeSb_2Te_4$, $In_3SbTe_2$, $In_{35}Sb_{32}Te_{33}$, and $In_{31}Sb_{26}Te_{43}$ to obtain characteristics similar to the ones mentioned above. Also, parts or all of Ge can be replaced by In to obtain the characteristics similar to the ones mentioned above.

(2) Other examples of high melting point component

Parts or all of Co3Si which is a high melting point component of embodiment 3 can be replaced by at least one of high melting point compounds containing two or more elements denoted by the above-mentioned B, compounds approximate to them, and their mixed compositions or compounds of three or more elements approximate to them to provide effects similar to the ones mentioned above:

$Ce_5Si_3$, $Ce_3Si_2$, $Ce_5Si_4$, $CeSi$, $Ce_3Si_5$, $CeSi_2$, $Cr_5Si_3$, $CrSi$, $CrSi_3$, $CrSi_2$, $Cr_3Si$, $CoSi$, $CoSi_2$, $NiSi_2$, $NiSi$, $Ni_3Si_2$, $Ni_2Si$, $Ni_5Si_2$, $Ni_3Si$, $Pt_5Si_2$, $Pt_2Si$, $PtSi$, $LaSi_2$, $Bi_2Ce$, $BiCe$, $Bi_3Ce_4$, $Bi_3Ce_5$, $BiCe_2$, $Cd_{11}Ce$, $Cd_6Ce$, $Cd_{58}Ce_{13}$, $Cd_3Ce$, $Cd_2Ce$, $CdCe$, $Cd_2Pb$, $CePb$, $CePb_3$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, $CeZn$, $CeZn_2$, $CeZn_3$, $Ce_3Zn_{11}$, $Ce_{13}Zn_{58}$, $CeZn_5$, $Ce_3Zn_{22}$, $Ce_2Zn_{17}$, $CeZn_{11}$, $Cd_{21}Co_5$, $CoGa$, $CoGa_3$, $CoSn$, $Cr_3Ga$, $CrGa$, $Cr_5Ga_6$, $CrGa_4$, $Cu_9Ga_4$, $Cu_3Sn$, $Cu_3Zn$, $Bi_2La$, $BiLa$, $Bi_3La_4$, $Bi_3La_5$, $BiLa_2$, $Cd_{11}La$, $Cd_{17}La_2$, $Cd_9La_2$, $Cd_2La$, $CdLa$, $Ga_6La$, $Ga_2La$, $GaLa$, $Ga_3La_5$, $GaLa_3$, $La_5Pb_3$, $La_4Pb_3$, $La_{11}Pb_{10}$, $La_3Pb_4$, $La_5Pb_4$, $LaPb_2$, $LaPb_3$, $LaZn$, $LaZn_2$, $LaZn_4$, $LaZn_5$, $La_3Zn_{22}$, $La_2Zn_{17}$, $LaZn_{11}$, $LaZn_{13}$, $NiBi$, $Ga_3Ni_2$, $GaNi$, $Ga_2Ni_3$, $Ga_3Ni_5$, $GaNi_3$, $Ni_3Sn$, $Ni_3Sn_2$, $Ni_3Sn_4$, $NiZn$, $Ni_5Zn_{21}$, $PtBi$, $PtBi_2$, $PtBi_3$, $PtCd_2$, $Pt_2Cd_9$, $Ga_7Pt_3$, $Ga_2Pt$, $Ga_3Pt_2$, $GaPt$, $Ga_3Pt_5$, $GaPt_2$, $GaPt_3$, $Pt_3Pb$, $PtPb$, $Pt_2Pb_3$, $Pt_3Sn$, $PtSn$, $Pt_2Sn_3$, $PtSn_2$, $PtSn_4$, $Pt_3Zn$, and $PtZn_2$ The other facts which are not disclosed here are same as in embodiment 1.

Embodiment 4

(1) Structure and preparation

FIG. 3 depicts a cross-sectional structure illustrating a disc-shaped information recording medium having an information recording thin film of embodiment 1 of the present invention. The medium was prepared as follows.

First, the inventors formed a substrate 1 of 13 cm diameter and 1.2 mm thick having cross-sectionally U-shaped tracking groove on its surface. The substrate 1 was put in a magnetron sputtering apparatus to form films on the substrate 1 successively. The apparatus is an apparatus having a plurality of targets by which laminated films can be successively formed. The apparatus also is excellent in uniformity and reproductivity of thickness of the films formed.

The inventors formed a protective layer 2 of ZnS of 80% and $SiO_2$ of 20% to 130 nm thick on the substrate 1 with use of the magnetron sputtering apparatus. On the protective layer 2 a film of high melting point component of $Cr_4Te_5$ (not shown) in the shape of a mass of island to 3 nm mean thick was formed. On the Cr—Te islands a recording layer 3 composed of $Cr_9Ge_7Sb_{27}Te_{57}$, that is, $(GeSb_4Te_7)_8(Cr_4Te_5)_2$ to approximately 22 nm thick was formed. In the process, they used a rotary simultaneous sputtering method with a $Cr_4Te_5$ target and $GeSb_4Te_7$ target.

Forming the island-shaped $Cr_4Te_5$ film is not always needed. In that case, however, flow of recording film tends to occur easily. If the $Cr_4Te_5$ film is formed, the high melting point components precipitated in the recording layer 3 are only the ones produced during the initial crystallization.

In turn, on the recording layer 3 an intermediate layer 4 of $(ZnS)_{80}(SiO_2)_{20}$ film to around 40 nm thick was formed. On the intermediate layer 4 a reflective layer 5 of $Al_{97}Ti_3$ film to 200 nm thick was formed with use of the same magnetron sputtering apparatus. This completed a first disc member.

Also, the inventors obtained a second disc member of the same structure as the first disc member with the very same process. The second disc member has a substrate 1' of 13 cm diameter and 1.2 mm thick, a protective layer 2' of (ZnS) $_{80}(SiO_2)_{20}$ of 125 nm thick, island-shaped $Cr_4Te_5$ layer of 3 nm thick a recording layer 3' composed of $Cr_9Ge_7Sb_{27}Te_{57}$, that is, $(GeSb_4Te_7)_8(Cr_4Te_5)_2$ of approximately 22 nm thick, an intermediate layer 4' of $(ZnS)_{80}(SiO_2)_{20}$ film of around 40 nm thick, and a reflective layer 5' of $Al_{97}Ti_3$ film of 200 nm thick laminated successively.

After that, the inventors stuck the reflective layer 5 of the first disc member and the reflective layer 5' of the second member together via a adhesive layer 6 to obtain the disc-like information recording medium shown in FIG. 3. Ultra-violet light curing resins, epoxy resins, hot-melt resins, such as copolymer of vinyl chloride and vinyl acetate.

The above-mentioned medium having the reflective layers 5 and 5' stuck together on their whole surfaces can have more number of possible rewritings than the one having them stuck not on the whole surfaces. The above-mentioned medium having no adhesive on portions of the reflective layers 5 and 5' corresponding to recording areas, also, has higher recording sensitivity a little than the one having the adhesive on them.

(2) Initial crystallization

The recording films 3 and 3' of the medium made as described above were initial-crystallized. The following explains only the recording layer 3 as the recording layer 3' is the very same as that.

The medium was revolved at 1,800 rpm. A laser beam of 830 nm wavelength of a semiconductor laser was kept at a power level of approximately 1 mW at which recording cannot be made. The laser beam was focused by a lens of a recording head a numerical aperture (NA) of 0.55 to irradiate the recording layer 3 through the substrate 1. A laser beam reflected by the recording layer 3 was detected. Tracking was made so that a spot center of the reflected laser beam should always coincide with a center of a tracking groove of the substrate 1 or with a center between the grooves. At the same time, the recording head was driven while automatic focusing was made so that the laser beam should be focused on the recording layer 3.

First, to make the initial crystallization, continuous (DC) laser beams of 15 mW power was irradiated onto the same recording track of the recording layer 3 200 times each. Each of irradiation periods of time, or beam spot passing time, is approximately 0.1 μsec.

Then, a continuous laser beam of 7 mW power was irradiated onto the recording track 5 times. Each of irradiation periods of time, or beam spot passing time, is approximately 0.1 μsec. The laser beam power may be in a range of 5 to 9 mW.

The lower laser beam of 7 mW of the two kinds may be omitted. However, the irradiation will provide better erase characteristic.

With the laser beam irradiations of different powers, the initial crystallization can be made well.

The above-mentioned laser beam irradiations can be made with use of a semiconductor laser array or a plurality of split beams of a gas laser. It is preferable for them to use an elliptic laser beam spot of a high-power gas laser or semiconductor laser which is made long in a radial direction of the medium. With this, the initial crystallization can be completed with rather fewer number of revolution times of the medium.

If the plurality of laser beam spots are used, they may not be put on the same recording track, but shifted a little in the radial direction of the medium. This is effective in allowing the initial crystallization over a larger area at a time and in little erase residue.

In turn, a high-power continuous laser beam of 15 mW for recording was irradiated to the recording layer 3 every time a circular, high-power continuous laser beam spot of 12 mW for initialization was irradiated to it for approximately 0.1 μsec. This was to make the recording layer 3 amorphous to form recording points. After that, the inventors investigated what times a lower-power continuous laser beam of 7 mW for erasing had to be irradiated to the recording points to crystallize.

With the disc of embodiment 4, it was found that the number of irradiation times of the continuous laser beam of 7 mW needed for crystallization was reduced as the number of irradiation times of the continuous laser beam of 12 mW is increased up to 100 times. That is, the inventors found that the recording points could be easily crystallized with increase of the number of irradiation times. This can be presumed that irradiation of the continuous laser beam of 12 mW precipitated much minute crystal of high melting point component $Cr_4Te_5$ into the recording layer 3 so that composition of the remaining, or phase changing parts, approached to that of $GeSb_4Te_7$ which could be crystallized at a high speed.

On the other hand, the inventors expect a signal of mark edge recording technique. The technique uses two signals: signal A corresponding to repetition of a recording mark of 2 T long (T is 45 nsec) and a space of 8 T long and signal B corresponding to repetition of a recording mark of 8 T long and a space of 2 T long. If a signal having signals A and B repeated by turns is recorded while a write starting position on a recording track is shifted at random in a range of 16 T, a mark forming frequency is changed abruptly and greatly at a switching point of signal A from signal B. This causes the recording film to flow. The flowing recording film material accumulates as blocked. Or, as the recording film material flows out without backward flowing, the film thickness is made thinner. This results in waveform distortion of the reproduced signal. If the elements of the recording film are segregated, also, the elements accumulate or are made low. If flow or segregation is made to a certain degree, gradient of the film thickness or concentration tends to cause reverse flow and segregation, braking the flow. Therefore, the high-power continuous laser beam of 15 mW should be repeatedly irradiated to wider area a little than the recording area before using the disc. This can prevent such changes in the recording area as mentioned above in some degree. The inventors, therefore, obtained necessary number of irradiation repetitions of the continuous laser beam on the basis of magnitude of the signal waveform distortion due to a multiple of rewritings. As described before, the necessary number of initializations for the disc is greater one of the necessary number of irradiation repetitions of the continuous laser to make the crystallization speed sufficiently high and the necessary number of irradiations to make the waveform distortion low. Embodiment 4 had greater necessary number of irradiation repetitions to make the crystallization speed sufficiently high. The necessary number of initiallization irradiations was 100 times.

Note that a melting point of $Cr_4Te_5$ is 1,252° C., and that of $GeSb_4Te_7$ is 605° C.

(3) Relationships 1 with content a of Ge around $GeSb_4Te_7$

Figure 10:
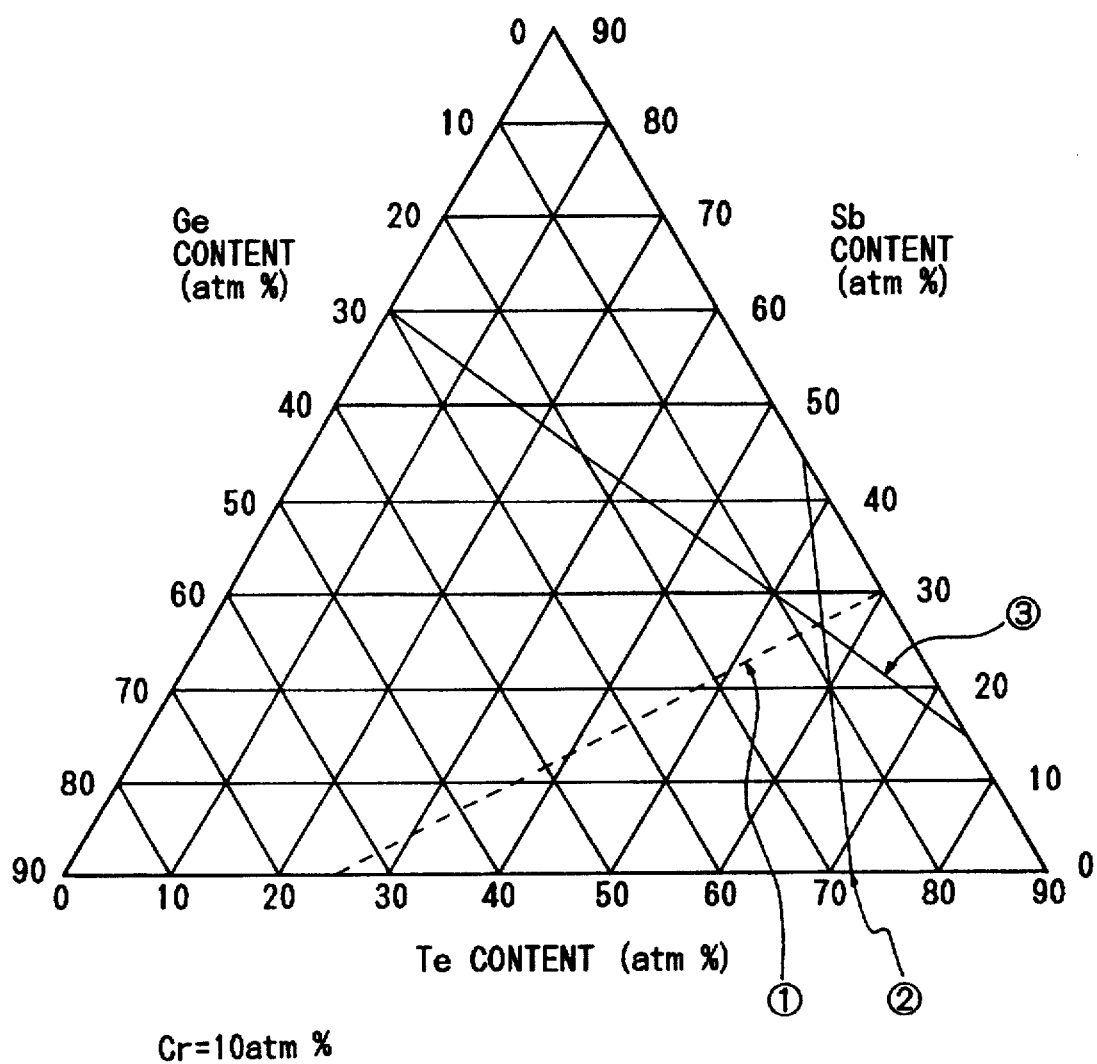
FIG. 10 is another ternary system triangular composition diagram illustrating compositions of a recording thin film in an embodiment according to the present invention.

The inventors measured crystallization temperature of unrecorded portion of the recording layer 3 when the composition of the recording layer 3 was changed on line 1 connecting $Ge_{65}Te_{25}Cr_{10}$ and $Sb_{30}Te_{60}Cr_{10}$ in a ternary system triangular composition diagram in FIG. 10 in which content of Cr was kept constant and when the temperature was increased at a constant speed. They also measured number of laser beam irradiation times to crystallize. As results, the following data were obtained.

| Composition | Crystallization temperature | Number of laser beam irradiation times |
|---|---|---|
| $Sb_{30}Te_{60}Cr_{10}$ | 120° C. | Less than 200 times |
| $Ge_2Sb_{29}Te_{59}Cr_{10}$ | 130° C. | Less than 200 times |
| $Ge_4Sb_{28}Te_{58}Cr_{10}$ | 150° C. | Less than 200 times |
| $Ge_{10}Sb_{25}Te_{55}Cr_{10}$ | 160° C. | Less than 200 times |
| $Ge_{15}Sb_{23}Te_{52}Cr_{10}$ | 170° C. | 500 times |
| $Ge_{17}Sb_{22}Te_{51}Cr_{10}$ | 170° C. | 2,000 times |
| $Ge_{25}Sb_{18}Te_{47}Cr_{10}$ | 180° C. | 5,000 times |

We can see from the results that proper crystallization temperatures could be obtained in a range of $0.02 \leq a \leq 0.19$, thereby reducing the number of laser beam irradiation times to crystallize.

(4) Relationships 1 with content b of Sb around $GeSb_4Te_7$

The inventors measured crystallization temperature of unrecorded portion of the recording layer 3 when the composition of the recording layer 3 was changed on line 2 connecting $Sb_{45}Te_{45}Cr_{10}$ and $Ge_{18}Te_{72}Cr_{10}$ in the ternary system triangular composition diagram in FIG. 10 in which content of Cr was kept constant and when the temperature was increased at a constant speed. They also measured number of laser beam irradiation times to crystallize. As results, the following data were obtained.

| Composition | Crystallization temperature | Number of laser beam irradiation times |
|---|---|---|
| $Ge_{17}Sb_2Te_{71}Cr_{10}$ | 210° C. | 5,000 times |
| $Ge_{17}Sb_4Te_{69}Cr_{10}$ | 200° C. | 1,000 times |
| $Ge_{14}Sb_{10}Te_{66}Cr_{10}$ | 180° C. | 500 times |
| $Ge_{10}Sb_{20}Te_{60}Cr_{10}$ | 170° C. | Less than 200 times |
| $Ge_7Sb_{26}Te_{57}Cr_{10}$ | 160° C. | Less than 200 times |
| $Ge_5Sb_{33}Te_{52}Cr_{10}$ | 150° C. | Less than 200 times |
| $Ge_3Sb_{36}Te_{51}Cr_{10}$ | 140° C. | Less than 200 times |
| $Ge_2Sb_{40}Te_{48}Cr_{10}$ | 120° C. | Less than 200 times |

We can see from the results that proper crystallization temperatures could be obtained in a range of $0.04 \leq b \leq 0.4$, thereby reducing the number of laser beam irradiation times to crystallize.

(5) Relationships 1 with content c of Te around $GeSb_4Te_7$

The inventors measured irradiation time of the laser beam needed for erasing recorded data when the composition of the recording layer 3 was changed on line 3 connecting $Sb_{15}Te_{75}Cr_{10}$ and $Ge_{30}Sb_{60}Cr_{10}$ in the ternary system triangular composition diagram in FIG. 10 in which content of Cr was kept constant. They also measured changes of the carrier-to-noise ratio (C/N) of the reproduced signal after rewriting was made $10^5$ times under the severe condition of laser beam power 15% higher than the optimum level. As results, the following data were obtained.

| Composition | Irradiation time of laser beam | C/N of reproduced signal after $10^5$ rewritings |
|---|---|---|
| $Ge_{14}Sb_{36}Te_{40}Cr_{10}$ | 0.5 μsec | 44 dB |
| $Ge_{12}Sb_{33}Te_{45}Cr_{10}$ | 0.2 μsec | 48 dB |
| $Ge_{11}Sb_{31}Te_{48}Cr_{10}$ | 0.1 μsec | 50 dB |
| $Ge_8Sb_{27}Te_{55}Cr_{10}$ | 0.1 μsec | 50 dB |
| $Ge_5Sb_{22}Te_{63}Cr_{10}$ | 0.5 μsec | 50 dB |
| $Ge_3Sb_{19.5}Te_{67.5}Cr_{10}$ | 1.0 μsec | 50 dB |
| $Sb_{15}Te_{75}Cr_{10}$ | 3.0 μsec | 50 dB |

We can see from the results that the irradiation time of the laser beam needed for erasing recorded data could be made shorter in a range of $0.5 \leq c \leq 0.75$, with high carrier-to-noise ratio (C/N) of the reproduced signal after rewriting was made $10^5$ times under the severe condition of laser beam power 15% higher than the optimum level.

(6) Relationships 1 with content d of Cr around $GeSb_4Te_7$

The inventors measured the C/N of a reproduced signal after rewriting was made $10^5$ times under the severe condition of laser beam power 15% higher than the optimum level when content of $Cr_4Te_5$ was changed with ratio of remaining content a of Ge to b of Sb to c of Te kept a:b:c=1:4:7. As results, the following contents d of Cr were obtained.

| | C/N of reproduced signal after $10^5$ rewritings |
|---|---|
| d = 0 | 42 dB |
| d = 3 | 48 dB |
| d = 10 | 50 dB |
| d = 20 | 50 dB |
| d = 34 | 48 dB |

The inventors measured an "erase ratio" of a reproduced signal recorded one time before overwriting one time after initiallization was made 200 times under the severe condition of laser beam power 15% higher than the optimum level when content d of Cr was changed. The erase ratio is a ratio of the level of a previously recorded signal before and after a new signal of a different frequency is overwritten on it. As results, the following erase ratios were obtained.

| | Erase ratio of reproduced signal recorded one time before overwriting one time |
|---|---|
| d = 10 | 28 dB |
| d = 20 | 25 dB |
| d = 30 | 25 dB |
| d = 40 | 20 dB |

We can see from the results that the erase ratio is decreased with the content d of Cr.

Also, we can see from the results that the irradiation time of the laser beam needed for erasing recorded data could be made shorter in a range of $0.03 \leq d \leq 0.3$, with high carrier-to-noise ratio (C/N) of the reproduced signal after rewriting was made $10^5$ times under the severe condition of laser beam power 15% higher than the optimum level.

Mean composition of the recording thin film is given by $$L_jH_k$$

where L is a low melting point component of elements or compound composition, and H is a high melting point component of the elements or compound composition.

The crystallization temperature and the C/N of a reproduced signal after rewriting was made $10^5$ times under the severe condition of laser beam power 15% higher than the optimum level were changed when content k of the mean composition was changed.

| Composition | C/N of reproduced signal after $10^5$ rewritings | Crystallization temperature |
|---|---|---|
| $(GeSb_4Te_7)_{95}(Cr_4Te_5)_5$ | 45 dB | 170° C. |
| $(GeSb_4Te_7)_{90}(Cr_4Te_5)_{10}$ | 48 dB | 170° C. |
| $(GeSb_4Te_7)_{80}(Cr_4Te_5)_{20}$ | 50 dB | 160° C. |
| $(GeSb_4Te_7)_{65}(Cr_4Te_5)_{35}$ | 50 dB | 150° C. |
| $(GeSb_4Te_7)_{50}(Cr_4Te_5)_{50}$ | 50 dB | 130° C. |
| $(GeSb_4Te_7)_{40}(Cr_4Te_5)_{60}$ | 49 dB | 120° C. |

We can see from the results that k/(j+k) is preferably $20 \leq k/(j+k) \leq 40$.

(7) Relationship with high melting point component evaporated in filming

In forming the information recording thin film of embodiment 4, the initial process has the high melting point component $Cr_4Te_5$ evaporated. When mean film thickness z of the high melting point component $Cr_4Te_5$ was changed, the number of possible rewritings and the carrier-to-noise ratio (C/N) of a reproduced signal after rewriting was made $10^5$ times under the severe condition of laser beam power 15% higher than the optimum level were changed as follows. The change of C/N is mainly due to change of the carrier level.

| | Number of possible rewritings |
|---|---|
| z = 0 nm | $5 \times 10^4$ times |
| z = 1 nm | $1 \times 10^5$ times |
| z = 5 nm | $2 \times 10^5$ times |

| | C/N of reproduced signal after $10^5$ rewritings |
|---|---|
| z = 1 nm | 47 dB |
| z = 5 nm | 47 dB |
| z = 10 nm | 46 dB |
| z = 20 nm | 40 dB |

We can see from the results that the mean film thickness z should be preferably in a range of $1 \text{ nm} \leq z \leq 10 \text{ nm}$.

(8) Protective layer, intermediate layer, reflective layer, and others

The embodiment 4 has the protective layer 2 and intermediate layer 4 formed of $ZnS-SiO_2$. The $ZnS-SiO_2$ may be alternatively replaced by any of materials of Si—N system, materials of Si—O—N system, $SiO_2$, SiO, $TiO_2$, $Ta_2O_5$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$, $ZrO_2$, and similar oxides, TaN, AlN, $Si_3N_4$, materials (for example, $AlSiN_2$) of Al—Si—N system, or similar nitrides, ZnS, $Sb_2S_3$, CdS, $In_2S_3$, $Ga_2S_3$, GeS, $SnS_2$, PbS, $Bi_2S_3$, and similar sulphides, $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, and similar selenides, $CeF_3$, $MgF_2$, $CaF_2$, and similar fluorides, Si, $TiB_2$, $B_4C$, B, C, and Ge and materials close to the composition of the above-mentioned materials. The protective layer 2 and intermediate layer 4 may be alternatively replaced by layers formed of mixture of the above-mentioned materials or multi-layers of them. For the multi-layers, a double layer film of a material containing not less than 70 mol % of ZnS, for example, $(ZnS)_{80}(SiO_2)_{20}$ and a material containing at least one of Si and Ge not less than 70 atm %, for example, Si, or oxide of Si, for example, $SiO_2$ is preferable. To prevent the recording sensitivity from decreasing, $ZnS$—$SiO_2$ layer should be put on the recording film side, and its thickness should be not thinner than 3 nm. To make low thermal expansion coefficient of the $SiO_2$, etc. layer suppress the recording film flow effectively, the thickness is not thicker than 10 nm. The double layer film should be preferably provided in place of the protective layer 2. Alternatively, it may be provided in place of the intermediate layer 4. For the protective layer 2, thickness of the $SiO_2$, etc. layer should be preferably between 50 nm and 250 nm. If the double layer film is used instead of the intermediate layer, thickness of the $SiO_2$, etc. layer should be preferably between 10 nm and 80 nm. The double layer film is preferable not only for the recording film of the present invention, but also for other already known phase change recording film.

If a double layer film of $ZnS$—$SiO_2$ layer and Au layer provided on the substrate side is used, degree of freedom of determining the reflection coefficient can be preferably increased. Thickness of the Au layer should be preferably not thicker than 30 nm. Au may be alternatively replaced by Au—Co, Au—Cr, Au—Ti, Au—Ni, Au—Ag, or similar mixed materials having Au as main component.

When the intermediate layer 4 was not formed, the recording sensitivity was decreased around 30%, the erase residue was increased around 5 dB, and the number of possible rewritings was decreased.

When the refractive index of the intermediate layer 4 was in a range of 1.7 to 2.3, the C/N obtained was not lower than 50 dB with film thicknesses being in ranges of 1 to 100 nm and 180 nm to 400 nm.

Instead of Al—Ti used for the reflective layer 5 in embodiment 4, Si—Ge mixed material can be used as material for the reflective layer. The Si—Ge mixed material can make the light absorptance of the recording marking area lower than that of the area other than the recording marking area. This can prevent the erase residue due to light absorptance difference and does not lower the number of possible rewritings. Content of Ge should be preferably between 10 atm % and 80 atm % to make hard reduction of the number of possible rewritings.

In turn, Si—Sn and Si—In mixed materials or mixed materials of two or more of these mixed materials provided similar results. Those materials for the reflective layer are effective not only for use with the phase change film of the present invention, but also with another phase change film not to make the number of possible rewritings lower than the conventional materials for the reflective layer.

Further, the Al—Ti may be alternatively replaced by any of elements, including Si, Ge, C, Au, Ag, Cu, Al, Ni, Fe, Co, Cr, Ti, Pd, Pt, W, Ta, Mo, and Sb, alloys formed mainly of them, layers of the alloys, multi-layers of the layers, composite layers of them with oxides or similar materials.

Embodiment 4 has the substrate 1 of polycarbonate having ruggedness formed directly on the surface for tracking guide. The polycarbonate may be alternatively replaced by any of polyolefin, epoxy, acrylic resin, chemically toughened glass having ultra-violet light curing resin layers formed on the surfaces, and similar ones.

Any of the intermediate layer 4, the reflective layer 5, and the protective layer 2 can be omitted to make the medium lamination simple. For example, the medium can be formed of substrate 1/protective layer 2/recording layer 3, substrate 1/recording layer 3/intermediate layer 4, or substrate 1/recording layer 3/reflective layer 5. Even such simple medium laminations provided superior characteristics to the conventional ones, with better results even in more number of rewritings.

As described so far, the information recording thin film of embodiment 4 can make more number of rewriting times than the conventional ones while it keeps high recording, reproduction, and erase characteristics. It also has the advantage that the recording and erasing laser beam power may be low.

The other facts which are not disclosed here are same as in embodiment 1.

Embodiment 5

An information recording thin film of embodiment 5 of the present invention is structured as follows. The Ge—Sb—Te—Cr system of embodiment 5 has a recording film 3 formed of $Ge_{40}Sb_{10}Te_{40}Cr_{10}$ close to composition of GeTe. The disk having the recording film 3 has a metal layer of 15 nm thick formed under a protective layer of 20 nm thick. The disk 3 also has a recording layer of 20 nm thick, an intermediate layer of 40 nm, and a reflective layer of 70 nm. Material used for the metal layer and the reflective layer is Au. The other details of embodiment 5 are the same as those of embodiment 1. Initiallization and recording and reproduction method of the information recording thin film also are the same as those of embodiment 1.

(1) Relationship with content b of Sb −2: compositions close to GeTe

Figure 11:
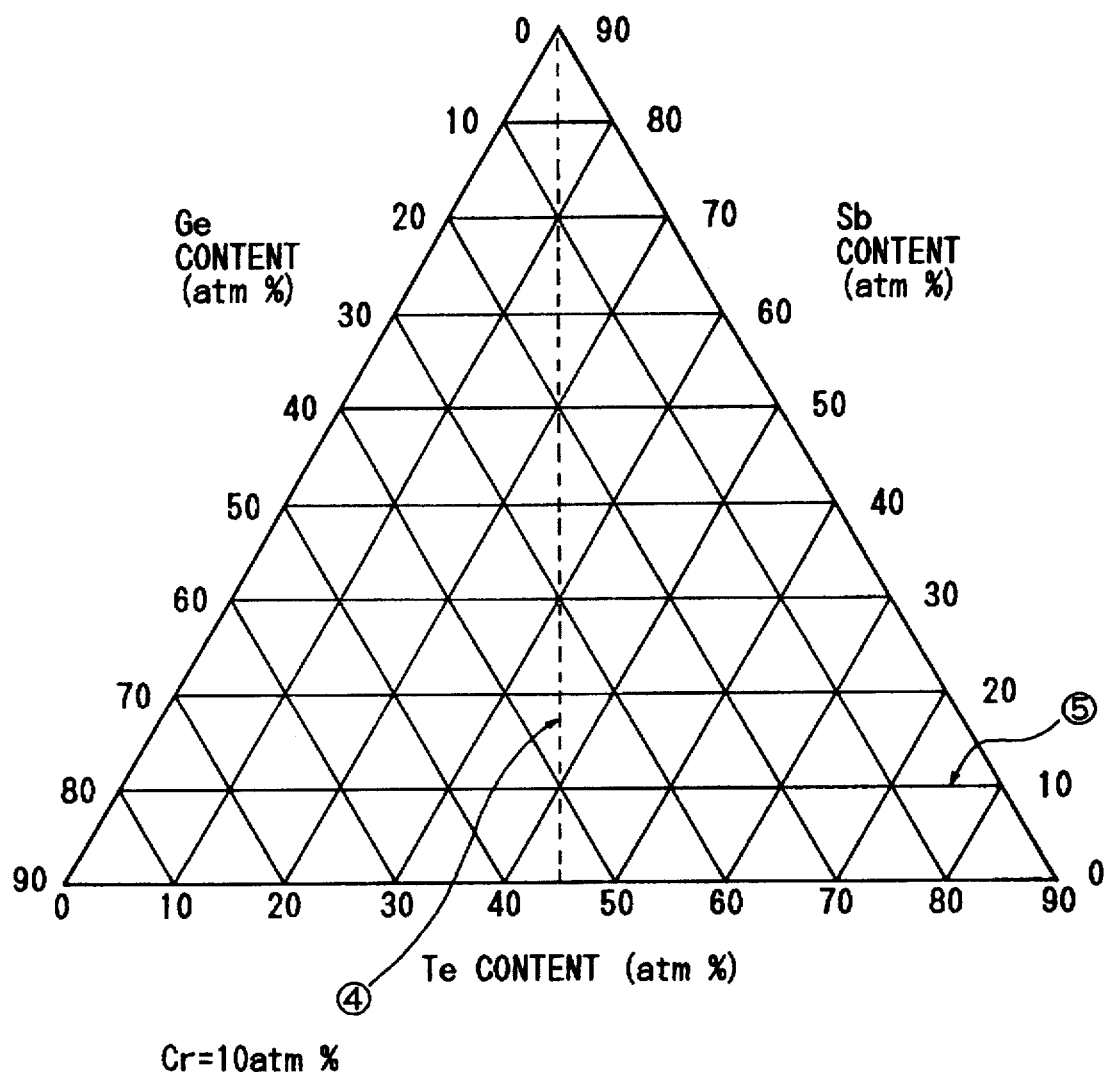
FIG. 11 is still another ternary system triangular composition diagram illustrating compositions of a recording thin film in an embodiment according to the present invention.

The inventors measured difference of reflectances of an amorphous state and a crystallized state of the recording film 3 when the composition of the recording film 3 was changed on line 4 connecting $Ge_{45}Te_{45}Cr_{10}$ and $Sb_{90}Cr_{10}$ and in a ternary system triangular composition diagram in FIG. 11 in which content of Cr was kept constant. As results, the following data were obtained.

| Composition | Reflectance difference |
| --- | --- |
| $Ge_{45}Te_{45}Cr_{10}$ | 50% |
| $Ge_{43}Sb_4Te_{43}Cr_{10}$ | 51% |
| $Ge_{40}Sb_{10}Te_{40}Cr_{10}$ | 51% |
| $Ge_{37}Sb_{16}Te_{37}Cr_{10}$ | 44% |
| $Ge_{35}Sb_{20}Te_{35}Cr_{10}$ | 30% |

We can see from the results that around the GeTe composition, high reflectance differences can be obtained in a range of $0 \leq b \leq 0.2$.

When Sb was added in a range of $0.01 \leq b \leq 0.2$, film-cracking at 60° C., 80% relative humidity was prevented, but more precise composition control was required than a film not containing Sb.

(2) Relationship with contents a and c of Ge and Te −2: composition close to GeTe The inventors measured difference of reflectances of an amorphous state and a crystallized state of the recording film 3 when the composition of the recording film 3 was changed on line 5 connecting $Sb_{10}Te_{80}Cr_{10}$ and $Ge_{80}Sb_{10}Cr_{10}$ and in the ternary system triangular composition diagram in FIG. 11 in which content of Cr was kept constant. As results, the following data were obtained.

| Composition | Reflectance difference |
| --- | --- |
| $Ge_{15}Sb_{10}Te_{65}Cr_{10}$ | 35% |
| $Ge_{20}Sb_{10}Te_{60}Cr_{10}$ | 45% |
| $Ge_{28}Sb_{10}Te_{52}Cr_{10}$ | 50% |
| $Ge_{40}Sb_{10}Te_{40}Cr_{10}$ | 51% |
| $Ge_{52}Sb_{10}Te_{28}Cr_{10}$ | 46% |
| $Ge_{60}Sb_{10}Te_{20}Cr_{10}$ | 36% |

We can see from the results that around the GeTe composition, high reflectance differences can be obtained in ranges of $0.25 \leq a \leq 0.65$ and $0.35 \leq c \leq 0.75$.

(3) Relationships 2 with content d of Cr −2: composition close to GeTe

The inventors measured the C/N of a reproduced signal after rewriting was made $10^5$ times under the severe condition of laser beam power 15% higher than the optimum level when content of $Cr_4Te_5$ was changed with ratio of remaining content a of Ge to b of Sb to c of Te kept a:b:c=4:1:4. As results, the following contents d of Cr were obtained.

|   | C/N of reproduced signal after $10^5$ rewritings |
|---|---|
| d = 0 | 42 dB |
| d = 3 | 48 dB |
| d = 10 | 50 dB |
| d = 20 | 50 dB |
| d = 34 | 48 dB |

The inventors measured an "erase ratio" of a reproduced signal recorded one time before overwriting one time after initiallization was made 200 times under the severe condition of laser beam power 15% higher than the optimum level when content d of Cr was changed. The erase ratio is a ratio of a signal overwritten on a previously recorded signal of different frequency to the previous signal, being in dB. As results, the following erase ratios were obtained.

|   | Erase ratio of reproduced signal recorded one time before overwriting one time |
|---|---|
| d = 10 | 28 dB |
| d = 20 | 25 dB |
| d = 30 | 25 dB |
| d = 40 | 20 dB |

We can see from the results that the erase ratio is decreased with the content d of Cr.

Also, we can see from the results that the erase ratios were sufficiently high in a range of $0.03 \leq d \leq 0.3$, with high carrier-to-noise ratio (C/N) of the reproduced signal after rewriting was made $10^5$ times under the severe condition of laser beam power 15% higher than the optimum level.

The other facts which are not disclosed here are same as in embodiment 1.

Embodiment 6

In embodiment 6 of the present invention, the inventors prepared an information recording thin film in the same way as in embodiment 1 except that the high melting point component was made to change in a thickness direction thereof. The other portions were formed as was the case with the disc-like information recording medium of embodiment 1. Also, embodiment 6 has the same initial crystallization of the thin film and information recording and reproduction methods as embodiment 1.

(1) Structure and preparation

Forming the recording layer having the high melting point component made to change in the thickness direction was made in the rotary simultaneous magnetron sputtering technique in which the magnetron sputtering apparatus was used with the $Cr_4Te_5$ and $GeSb_4Te_7$ targets. In the fabrication, a $Cr_4Te_5$ film was formed to 3 nm thick before a voltage applied to the $Cr_4Te_5$ target was gradually decreased while a voltage applied to the $GeSb_4Te_7$ target was kept constant.

| Sputtering time, sec. | Sputtering power, W $GeSb_4Te_7$ target | $Cr_4Te_5$ target | Recording film thickness from light coming direction, nm | Contents of $Cr_4Te_5$, atm % |
|---|---|---|---|---|
| 0–9 | 49 | 150 | 0–6 | 50 |
| 10–20 | 49 | 100 | 6–12 | 40 |
| 21–33 | 49 | 65 | 13–18 | 30 |
| 34–47 | 49 | 40 | 19–24 | 20 |
| 48–63 | 49 | 20 | 24–30 | 10 |

Also, the recording layer having the high melting point component made to change in the thickness direction can be formed in an alternative way that the voltage applied to the $GeSb_4Te_7$ target is gradually increased while the voltage applied to the $Cr_4Te_5$ target was kept constant. The gradual increase of the voltage provided greater recording characteristics. Further, the recording layer can be formed in another alternative way that an inline sputtering apparatus is used to have targets of which areas of the $Cr_4Te_5$ and $GeSb_4Te_7$ compositions are changed gradually. The inventors fabricated a disc having the recording film mentioned above.

The disc of embodiment 6 is more complicated in the fabrication process than that of embodiment 1 in which the percentage of high melting point component in the recording layer is made constant in the thickness direction. However, the disc of embodiment 6 could decrease number of laser beam irradiations for initial crystallization than the disk in which the percentage of high melting point component in the recording layer is made constant.

The other facts which are not disclosed here are same as in embodiment 1.

Embodiment 7

Figure 12:
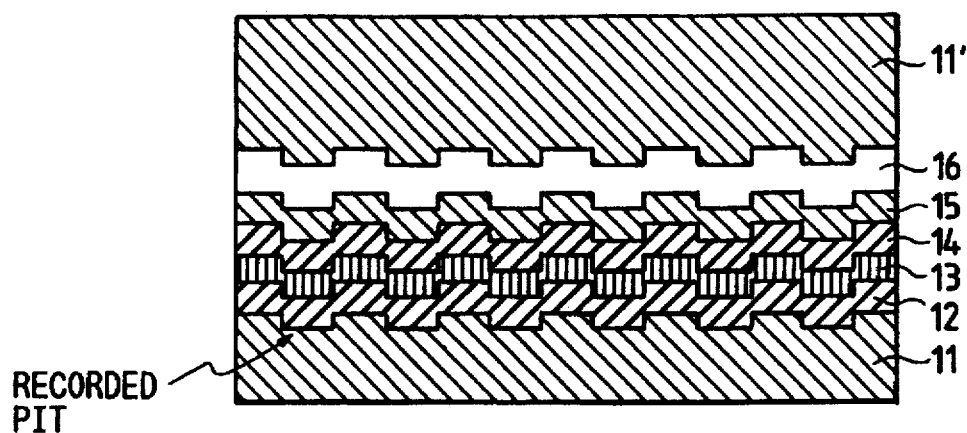
FIG. 12 is a cross-sectional structure illustrating a superresolution readout disc in an embodiment according to the present invention.

FIG. 12 depicts a structural cross-section illustrating a disc information recording medium having a superresolution readout film of the present invention used therein.

The medium shown in FIG. 12 was prepared as follows. First, the inventors formed a polycarbonate substrate 11 of 13 cm diameter and 1.2 mm thick having ruggedness to record data. The substrate 11 was put in a magnetron sputtering apparatus having a plurality of targets that can successively form laminated films thereon in high film thickness uniformity and reproducibility. On the substrate was formed a layer 12 of $(ZnS)_{80}(SiO_2)_{20}$ to 125 nm thick on the substrate 1 in the magnetron sputtering apparatus. In turn, on the protective layer 12 the superresolution readout thin film 13 of $(Cr_4Te_5)_{20}(GeSb_2Te_4)_{80}$ to 30 nm thick was formed. Then, on the superresolution readout thin film 13 was formed a layer 14 of $(ZnS)_{80}(SiO_2)_{20}$ to 20 nm thick and a layer 15 of $Al_{97}Ti_3$ to 100 nm thick successively were formed. After that, the layer 15 had a polycarbonate substrate 11' stuck thereto via an adhesive layer 16.

If light is irradiated to a thin film, in general, a light reflected from an outside surface of the thin film overlap the one reflected from an inside face to interfere. To make higher change of reflectance of the superresolution readout thin film, a light "reflective layer" should be provided near the thin film. This increases effect of the interference. Instead, there may be provided a light absorbing layer. The layer 15 of $Al_{97}Ti_3$ shown in FIG. 12 serves as the reflective layer.

To make the interference effect further higher, it is preferable to have an "intermediate layer" between the superresolution thin film and the reflective layer. The intermediate layer serves to prevent dispersion from occurring mutually between the superresolution readout thin film and the reflective layer when superresolution readout is made. The intermediate layer also reduces escape of heat to the reflective layer to increase the readout sensitivity. The intermediate layer further can crystallize the films after superresolution readout. The layer 14 of $(ZnS)_{80}(SiO_2)_{20}$ shown in FIG. 12 serves as the intermediate layer.

At least one interface of the superresolution readout thin film 13 should be preferably made in close contact with the other material to protect. It is further preferable to make the both interfaces in close contact with the other material to protect. The protection can be made by the substrate or the protective layer formed apart from the substrate. The "protective layer" can prevent deformation of superresolution readout thin film from causing noises. The layer 12 of $(ZnS)_{80}(SiO_2)_{20}$ serves as the protective layer.

Figure 13:
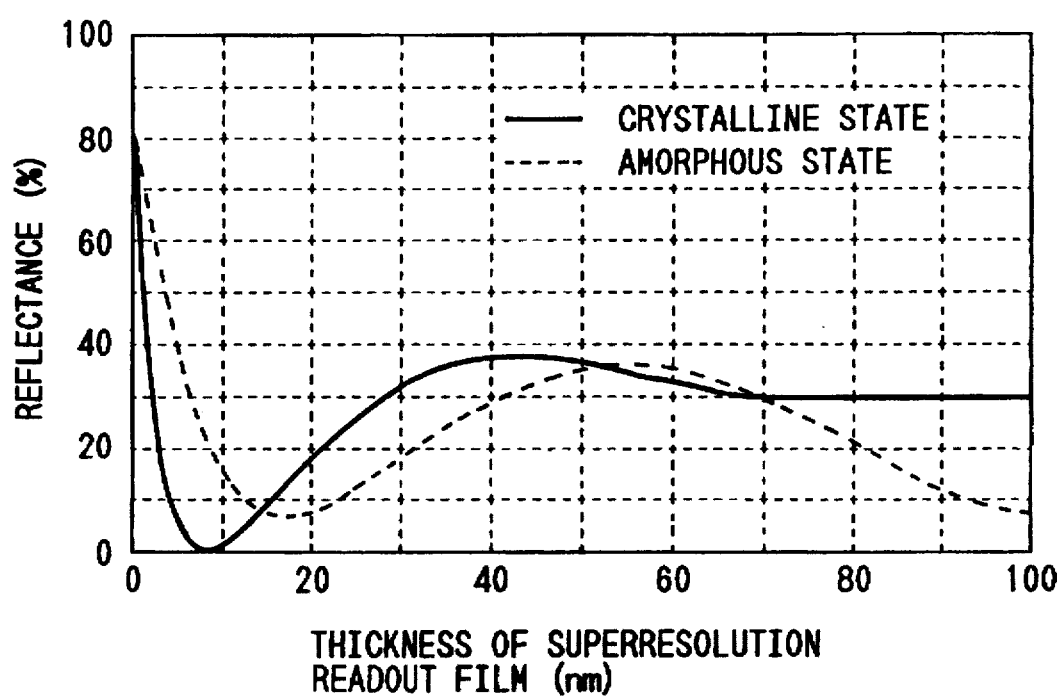
FIG. 13 is a graph illustrating relationship of reflectance of superresolution readout film with a thickness of the film in an embodiment according to the present invention; and, FIG. 14 is a block diagram illustrating a circuit system for use in superresolution readout in an embodiment according to the present invention.

Thickness of the readout film 13 was determined on the basis of the results of the reflectances of the crystallized state and the amorphous state shown in FIG. 13. When the film was 30 nm thick, as shown in FIG. 13, the reflectance of the crystallized state was higher than the amorphous state. As difference of the reflectances of the crystallized state and the amorphous state was maximum, the thickness of the superresolution readout thin film 13 of $(Cr_4Te_5)_{20}(GeSb_2Te_4)_{80}$ was set to 30 nm.

The disc fabricated as described above was initiallized as follows. First, the disc was pre-crystallized with flash light before being revolved at 1,800 rpm. A semiconductor laser beam was kept at a light intensity level of around 1 mW at which superresolution readout cannot be made. The laser beam was focused through a lens of a recording head to irradiate to the readout film 13 through the substrate 11. The reflectance was detected to control driving the head so that a spot center of the reflected laser beam should always coincide with a center of a tracking groove of the substrate 11. While tracking is made, further, automatic focusing was made so that the laser beam should be focused on the superresolution recording layer 13. First, to make the initial crystallization, a continuous laser beams of 11 mW powers was irradiated onto the same recording track five times. This irradiation power may be in a range of 9 to 18 mW. Then, a continuous laser beam of 6 mW power was irradiated onto the recording track three times. This irradiation power may be in a range of 4 to 9 mW. The two kinds of laser beam irradiation should be one or more times each. The higher laser beam power irradiation should be preferably two or more times.

The superresolution readout film containing high melting point component has to be initial-crystallized enough to make high the C/N. For the purpose, the initial crystallization should be made by the laser beams, particularly of the lower power. First, the continuous laser beam of 6 mW power was irradiated to the same track 500 times. In turn, the continuous laser beam of 11 mW power was irradiated to the track three times. Finally, continuous laser beam of 6 mW power was irradiated to the track ten times. The 500 times of laser irradiations of 6 mW and the three times of laser irradiations of 11 mW should be repeated several times to make further higher the C/N and number of possible superresolution readouts although it takes time.

The above-mentioned laser beam irradiations can be made with use of a semiconductor laser array or a plurality of split beams of a gas laser. It is preferable for them to use an elliptic laser beam spot of a high-power gas laser or semiconductor laser which is made long in a radial direction of the medium. With this, initial crystallization can be simultaneously accomplished for all the tracks in a single turn of the disc. If the plurality of laser beam spots are not arranged on the same recording track, but shifted little by little in the radial direction of the medium, it is effective in that initial crystallization can be made over a larger area and erase residue can be is made little.

At the end of initiallization, a continuous laser beam may be irradiated to the circumference of the track and the track as well to crystallize while tracking is made between the grooves. This method could reduce cross-talk 2 dB. For the crystallization, the continuous laser beam power was 6 mW.

Figure 8:
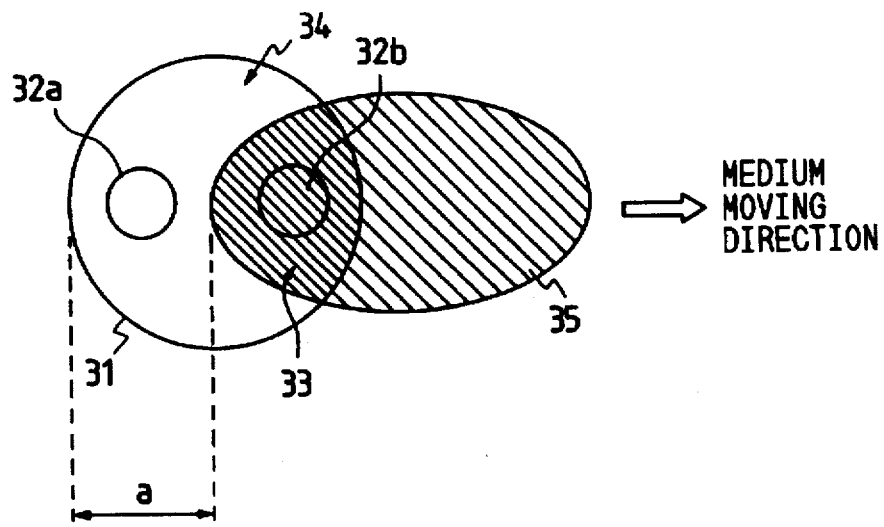
FIG. 8 is a schematic depiction illustrating principles of superresolution effect in an embodiment according to the present invention.

Principles of superresolution readout by a superresolution effect are as follows. In FIG. 8 are indicated a light spot 31 of the laser beam or the like and recording marks 32a and 32b formed on a surface of the substrate 1. Diameter of the light spot is defined as diameter of the laser beam at a position at which the light intensity is at peak ($1/e^2$). Minimum interval between the recording marks are set less than the diameter of the light spot 31.

In a high temperature area of the light spot, at lease the phase change component $GeSb_2Te_4$ of the superresolution readout film is melted. At least one of a real part n or imaginary part k of a complex refractive index in a high temperature area is decreased, thereby lowering the reflectance. The superresolution readout layer 13 hides the recording 32b in the high temperature 35 irrespective of the fact that the light spot 31 has the two recording marks 32a and 32b. Thus, only the recording mark 32a is detected. In other words, as shown in FIG. 8, an actual detection area 34 becomes a crescent shape left as a circular area of the light spot 31 has an overlapping area of the high temperature area 35 subtracted therefrom. In such a way, it is possible to make the superresolution readout of smaller recording mark than the light spot diameter.

For the area in which superresolution readout is to be made, the laser power was kept at 8 mW. This power differs depending on a melting point of the superresolution readout film. After readout passed beyond the superresolution readout area, the laser power was lowered to 1 mW to allow tracking and automatic focusing. Lowering the laser power to 1 mW was effective in preventing the masking layer from deteriorating. It should be noted that tracking and automatic focusing were made to continue also during superresolution readout. Let Pt denote the laser power for tracking and automatic focusing, and Pr be the one for superresolution readout. High superresolution readout characteristics were obtained in the range below.

Pr/Pt ≧ 2.

The disc having the superresolution readout film left amorphous after superresolution readout had to be crystallized. The disc having the superresolution readout film re-crystallized after superresolution readout was needed to crystallize.

The C/N of the disc having the superresolution readout film of embodiment 7 was compared with that of the disc having no superresolution readout film when micro-marks of different sizes were superresolution-read. The disc having the superresolution readout film of embodiment 7 provided the superresolution effect for the micro-marks as follows.

| Mark size, μm | With superresolution readout film, dB | Without superresolution readout film, dB |
| --- | --- | --- |
| 0.3 | 30 | — |
| 0.4 | 43 | 30 |

-continued

| Mark size, µm | With superresolution readout film, dB | Without superresolution readout film, dB |
|---|---|---|
| 0.5 | 47 | 35 |
| 0.6 | 49 | 40 |
| 0.7 | 50 | 46 |
| 0.8 | 50 | 50 |

The embodiment 7 has the protective layer and intermediate layer formed of $ZnS$—$SiO_2$. The $ZnS$—$SiO_2$ may be alternatively replaced by any of materials of Si—N system, materials of Si—O—N system, $SiO_2$, $SiO$, $TiO_2$, $Al_2O_3$, $Y_2O_3$, $CeO$, $La_2O_3$, $In_2O_3$, $GeO$, $GeO_2$, $PbO$, $SnO$, $SnO_2$, $Bi_2O_3$, $TeO_2$, $WO_2$, $WO_3$, $Sc_2O_3$, $ZrO_2$, and similar oxides, $TaN$, $AlN$, $Si_3N_4$ materials of Al—Si—N system, such as $AlSiN_2$, or similar nitrides, $ZnS$, $Sb_2S_3$, $CdS$, $In_2S_3$, $Ga_2S_3$, $GeS$, $SnS_2$, $PbS$, $Bi_2S_3$, and similar sulphides, $SnSe_2$, $Sb_2Se_3$, $CdSe$, $ZnSe$, $In_2Se_3$, $Ga_2Se_3$, $GeSe$, $GeSe_2$, $SnSe$, $PbSe$, $Bi_2Se_3$, and similar selenides, $CeF_3$, $MgF_2$, $CaF_2$ and similar fluorides, Si, Ge, $TiB_2$, $B_4C$, SiC, B, C, and materials whose compositions are close to the compositions of all the materials mentioned above for the protective layer. The protective layer, also, may be alternatively formed of any of acrylic resin, polycarbonate, polyolefin, epoxy resins, polyimide, polystyrene, polyethylene, polyethylene terephtalate, polytetrafluoroethylene, and similar fluoroplastics. The protective layer, further, may be alternatively formed of any of adhesives, such as copolymer of ethylene and vinyl acetate known as hot-melt resin. The protective layer, still further, may be alternatively formed of any of ultra-violet light curing resins having at least one of the resins mentioned above as main component. The protective layer, still further, may be also served by the substrate of an organic material. The protective layer, still further, may be alternatively formed of any of layers formed of mixture of the above-mentioned materials or multi-layers of them. When the intermediate layer was omitted, the superresolution readout sensitivity was decreased around 30%, and also the number of possible superresolution readouts was reduced. When the refractive index of the intermediate layer was in a range of 1.7 to 2.3, the C/N obtained was not lower than 48 dB with film thickness being in a range of 3 to 400 nm.

The Al—Ti used for the reflective layer may be alternatively replaced by any of elements, including Au, Ag, Cu, C, Si, Ge, Al, Ni, Fe, Co, Cr, Ti, Pd, Pt, W, Ta, Mo, and Sb, alloys, compounds, and mixtures formed mainly of any of the elements, layers and multi-layers of the alloys, and composite layers of them with oxides and similar materials.

Further, embodiment 7 has the substrate of polycarbonate having ruggedness formed directly on the surface for tracking guide. The polycarbonate may be alternatively replaced by any of polyolefin, epoxy, acrylic resin, chemically toughened glass having ultra-violet light curing resin layers formed on the surfaces thereof, and similar ones.

The disc having the superresolution readout film shown in FIG. 12 is of single-side structure. The disc can be made of double-side structure in a way that an additional structure should be made of the same layers 11 to 15 in place of the polycarbonate substrate 11' before the two structures should be stuck together through the adhesive layer 16.

Embodiment 8

When the composition of the superresolution readout film of the disc shown in FIG. 12 was changed, difference $\Delta k'$ of extinction coefficients k of the superresolution readout film before and after laser beam irradiation was changed as charted below. The disc having the superresolution readout film had recording marks of around 25% long of diameter of the light spot formed thereon. The C/N of a reproduced signal after superresolution readout was made $10^5$ times was measured.

| Composition of film | Difference of extinction signal coefficient k | C/N of reproduced after $10^5$ superresolution readouts |
|---|---|---|
| $(Cr_4Te_5)_{80}(GeSb_2Te_4)_{20}$ | $\Delta k' = 5\%$ | 37 dB |
| $(Cr_4Te_5)_{60}(GeSb_2Te_4)_{40}$ | $\Delta k' = 10\%$ | 42 dB |
| $(Cr_4Te_5)_{40}(GeSb_2Te_4)_{60}$ | $\Delta k' = 20\%$ | 46 dB |
| $(Cr_4Te_5)_{20}(GeSb_2Te_4)_{80}$ | $\Delta k' = 30\%$ | 48 dB |

We can see from the results that the difference range of $\Delta k' \leq 20\%$ is preferable.

Embodiment 9

The number of possible superresolution readouts was increased if a high melting point component was put in the superresolution readout film. The inventors measured differences of the numbers of possible superresolution readouts depending on difference of the melting points of the superresolution readout films ($\Delta m.p.$=difference of the melting point of the high melting point component from that of the phase change component). The high melting point component was changed with use of the phase change component of $GeSb_2Te_4$.

| High melting point component | $\Delta m.p.$, °C. | Number of possible superresolution readouts |
|---|---|---|
| $Pt_3Sb$ | 50 | $5 \times 10^5$ |
| $Mo_3Sb_7$ | 150 | $1 \times 10^6$ |
| $CoSb_3$ | 200 | $2 \times 10^6$ |
| $Cr_4Te_5$ | $\geq 300$ | $\geq 2 \times 10^6$ |

We can see from the results that the difference range of $\Delta m.p. \geq 150°$ C. is preferable.

Embodiment 10

In the superresolution readout film described in embodiment 7, the phase change component of $GeSb_2Te_4$ can be alternatively replaced by at least one of the group D given below or ones similar to them, any of compounds of melting point not higher than 650° C. or ones similar to them, or at least one of mixed compositions of them or compounds of three or more elements approximate to the mixed compositions to provide effects similar to the ones mentioned above.

Group D:

Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeSb_2Te_4$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, $Ba_2Tl$.

The high melting point compound $Cr_4Te_5$ can be alternatively replaced by at least one of the compounds or alloys listed below or ones of compositions approximate to those of them, mixed compositions of them or compounds of three or more elements approximate to the mixed compositions to provide effects similar to the ones mentioned above.

(a) If the melting point of the phase change component is in a range of 450° to 650° C.: The compounds of the group A listed below or compounds of melting point not lower than 800° C.

Group A:
 BaPd$_2$, BaPd$_5$, NdPd, NdPd$_3$, NdPd$_5$, Nd$_7$Pt$_3$, Nd$_3$Pt$_2$, NdPt, Nd$_3$Pt$_4$, NdPt$_2$, NdPt$_5$, Bi$_2$Nd, BiNd, Bi$_3$Nd$_4$, Bi$_3$Nd$_5$, BiNd$_2$, Cd$_2$Nd, CdNd, Mn$_2$Nd, Mn$_{23}$Nd$_6$, Mn$_{12}$Nd, Nd$_5$Sb$_3$, Nd$_4$Sb$_3$, NdSb, NdSb$_2$, Fe$_2$Nd, Fe$_{17}$Nd$_2$, Cs$_3$Ge$_2$, CsGe, CsGe$_4$, Nd$_5$Si$_3$, Nd$_5$Si$_4$, NdSi, Nd$_3$Si$_4$, Nd$_2$Si$_3$, Nd$_5$Si$_9$, Cs$_2$Te, NdTe$_3$, Nd$_2$Te$_5$, NdTe$_2$, Nd$_4$Te$_7$, Nd$_2$Te$_3$, Nd$_3$Te$_4$, NdTe, Ce$_3$Ir, Ce$_2$Ir, Ce$_{55}$Ir$_{45}$, CeIr$_2$, CeIr$_3$, Ce$_2$Ir$_7$, CeIr$_5$, CaPd, CaPd$_2$, CaGe, Ca$_2$Ge, GeNa$_3$, GeNa, CaSi$_2$, Ca$_2$Si, CaSi, Se$_2$Sr, Se$_3$Sr$_2$, SeSr, GeSr$_2$, GeSr, Ge$_2$Sr, SnSr, Sn$_3$Sr$_5$, SnSr$_2$, Ce$_2$Tl, Ce$_5$Tl$_3$, CeTl$_3$, Ce$_3$Tl$_5$, CeTl, BaTl, Pd$_{13}$Tl$_9$, Pd$_2$Tl, Pd$_3$Tl, Mg$_2$Si, Mg$_2$Ge, BaPd$_2$, BaPd$_5$, Ce$_4$Se$_7$, Ce$_3$Se$_4$, Ce$_2$Se$_3$, CeSe, Ce$_5$Se$_3$, Ce$_4$Ge$_3$, Ce$_5$Ge$_4$, CeGe, Ce$_3$Ge$_5$, Ce$_5$Si$_3$, Ce$_3$Si$_2$, Ce$_5$Si$_4$, CeSi, Ce$_3$Si$_5$, CeSi$_2$, CeTe$_3$, Ce$_2$Te$_5$, CeTe$_2$, Ce$_4$Te$_7$, Ce$_3$Te$_4$, CeTe, La$_3$Se$_7$, LaSe$_2$, La$_4$Se$_7$, La$_2$Se$_3$, La$_3$Se$_4$, LaSe, GeLa$_3$, Ge$_3$La$_5$, Ge$_3$La$_4$, Ge$_4$La$_5$, GeLa, Ge$_5$La$_3$, BaSe$_2$, Ba$_2$Se$_3$, BaSe, PdSe, Mo$_3$Se$_4$, MoSe$_2$, Ba$_2$Ge, BaGe$_2$, BaGe, Ba$_2$Te$_3$, BaTe, Ge$_2$Pd$_5$, GePd$_2$, Ge$_9$Pd$_{25}$, GePd, Ge$_3$Pt, Ge$_3$Pt$_2$, GePt, Ge$_2$Pt$_3$, GePt$_2$, GePt$_3$, Pu$_3$Sn, Pu$_5$Sn$_3$, Pu$_5$Sn$_4$, Pu$_8$Sn$_7$, Pu$_7$Sn$_8$, PuSn$_2$, PuSn$_3$, Pt$_5$Te$_4$, Pt$_4$Te$_5$, PtTe$_2$, GeNi, Ge$_3$Ni$_5$, Ge$_2$Ni$_5$, GeNi$_3$, NiTe$_{0.85}$, NiTe$_{0.775}$, Ni$_{3\pm x}$Te$_x$, Cr$_{11}$Ge$_{19}$, CrGe, Cr$_{11}$Ge$_8$, Cr$_5$Ge$_3$, Cr$_3$Ge, CrSi$_2$, Cr$_5$Si$_3$, Cr$_3$Si, Cr$_5$Te$_8$, Cr$_4$Te$_5$, Cr$_3$Te$_4$, Cr$_{1-x}$Te, Ge$_3$Mn$_5$, GeMn$_2$, Mn$_6$Si, Mn$_9$Si$_2$, Mn$_3$Si, Mn$_5$Si$_2$, Mn$_5$Si$_3$, MnSi, Mn$_{11}$Si$_{19}$, Mn$_2$Sn, Mn$_{3.25}$Sn, MnTe, Te$_2$W, FeGe$_2$, Fe$_5$Ge$_3$, Fe$_3$Ge, Fe$_2$Si, Fe$_5$Si$_3$, FeSi, FeSi$_2$, Ge$_2$Mo, Ge$_{41}$Mo$_{23}$, Ge$_{16}$Mo$_9$, Ge$_{23}$Mo$_{13}$, Ge$_3$Mo$_5$, GeMo$_3$, Mo$_3$Si, Mo$_5$Si$_3$, MoSi$_2$, MoSn, MoSn$_2$, Mo$_3$Te$_4$, MoTe$_2$, Si$_2$Ti, SiTi, Si$_4$Ti$_5$, Si$_3$Ti$_5$, SiTi$_3$, Sn$_5$Ti$_6$, Sn$_3$Ti$_5$, SnTi$_2$, SnTi$_3$, CoGe$_2$, Co$_5$Ge$_7$, CoGe, Co$_5$Ge$_3$, Co$_4$Ge, Co$_3$Te$_4$, Ge$_7$Re$_3$, Re$_5$Si$_3$, ReSi, ReSi$_2$, Re$_2$Te (b) If the melting point of the phase change component is in a range of 250° to 450° C.:

The compounds of the group A listed above or the compounds of the group B listed below or compounds of melting point not lower than 600° C.

Group B:
 Cs$_3$Ge, Ba$_2$Tl, GePd$_3$, Fe$_6$Ge$_5$, FeTe$_2$, Co$_5$Ge$_2$, Nd$_3$Pd, Cs$_3$Te$_2$, Ce$_4$Ir, NaPd, Ca$_9$Pd, Ca$_3$Pd$_2$, Ca$_2$Ge, Se$_3$Sr, Ce$_3$Tl, CeSe$_2$, Ce$_3$Ge, BaSe$_3$, GeSe$_2$, GeSe, BaTe$_2$, GePd$_5$, Ge$_8$Mn$_{11}$, MnTe$_2$, Ge$_3$W$_2$, FeGe, Fe$_4$Ge$_3$, Fe$_3$Sn, Fe$_3$Sn$_2$, FeSn, CoTe$_2$.

(c) If the melting point of the phase change component is not higher than 250° C.

The compounds of the groups A, B and C listed above or compounds of melting point not lower than 400° C.

Group C:
 Ba$_4$Tl, CsTe, Ba$_4$Tl, Ba$_{13}$Tl, Cd$_{11}$Nd, Cd$_6$Nd, Cs$_5$Te$_4$, Ca$_3$Pd, Ca$_5$Pd$_2$, Sn$_3$Sr, Ba$_{13}$Tl, PdTl$_2$, FeSe$_2$, FeSe, Cr$_2$Te$_3$, CrTe$_3$, FeSn$_2$.

Embodiment 11

It was found that the superresolution readout film having the same element in the above-mentioned high melting point components, such as Cr$_4$Te$_5$, and the above-mentioned phase change components, such as GeSb$_2$Te$_4$, provided high superresolution readout characteristics. If quantity of the same element was too much, however, difference of the melting points of the two components became little. It was preferable that the quantity of the same element was not more than 80 atm %. If the quantity of the same element was too little, on the other hand, the refractive indexes of the both components at an aperture portion were often not equal. It was preferable that the quantity of the same element was not less than 30 atm %.

Embodiment 12

The superresolution readout film has the phase change component of GeSb$_2$Te$_4$ and the high melting point component of Cr$_4$Te$_5$ used. The inventors measured the C/N and the number of possible superresolution readouts when quantity (atm %) of the high melting point component was changed. The following results were obtained.

| Quantity (atm %) of high melting point component | Number of possible superresolution readouts (times) |
|---|---|
| 5 | 6 × 10$^5$ |
| 10 | 1 × 10$^6$ |
| 20 | 2 × 10$^6$ |
| ≧30 | ≧2 × 10$^6$ |

| Quantity (atm %) of high melting point component | C/N, dB |
|---|---|
| ≦30 | ≦48 |
| 40 | 48 |
| 50 | 46 |
| 60 | 42 |

We can see from the results that the quantity (atm %) of the high melting point component is preferably in a range of 10 to 50%, more preferably in a range of 20 to 40%.

The oxide, sulphide, nitride, and carbide contained in the high melting point component should be preferably less than 50% of the high melting point component, more preferably less than 20% of the high melting point component. If the contents are too much, they allow difference of their complex refractive indexes from that of the phase change component to be made large, and cause oxygen and other elements to diffuse into the phase change component, thereby deteriorating the superresolution readout characteristics.

Embodiment 13

The melting point of the superresolution readout film differs depending on material for the superresolution readout film. The inventors measured optimum superresolution readout power when composition of the phase change component was changed, with use of the high melting point component of Cr$_4$Te$_5$.

| Composition of phase change component of film | Melting point, °C. | Superresolution readout power, mW |
|---|---|---|
| Sn$_{75}$Zn$_{25}$ | 250 | 3 |
| In$_2$Te$_5$ | 450 | 6 |
| Ge$_2$Sb$_2$Te$_5$ | 650 | 8 |

We can see from the results that the superresolution readout power can be preferably made low for lower melting point of the superresolution readout film.

Embodiment 14

Line speeds of inside tracks of the disc are different from that of outside if its rotational frequency is constant. A 5-inch disc has the line speed changed from 5.7 to 11.3 m/sec. Corresponding to this, thickness of the superresolution readout film was varied from 20 nm at the inside tracks to 40 nm at the outside tracks. Width of the area not masked of the light spot was made less toward the inside tracks. The superresolution readout characteristics obtained were so preferable that C/Ns on the both inside and outside tracks were as high as 48 dB.

Deviation of the GeSb$_2$Te$_4$ or Ge$_2$Sb$_2$Te$_5$ composition of the Ge—Sb—Te system was made little from the inside to the outside. This made fast the crystallizaion speed toward the outside circle. Corresponding to the line speed was made easier. The superresolution readout characteristics obtained were so preferable that C/Ns on the both inside and outside tracks were as high as 48 dB.

Embodiment 15

Figure 14:
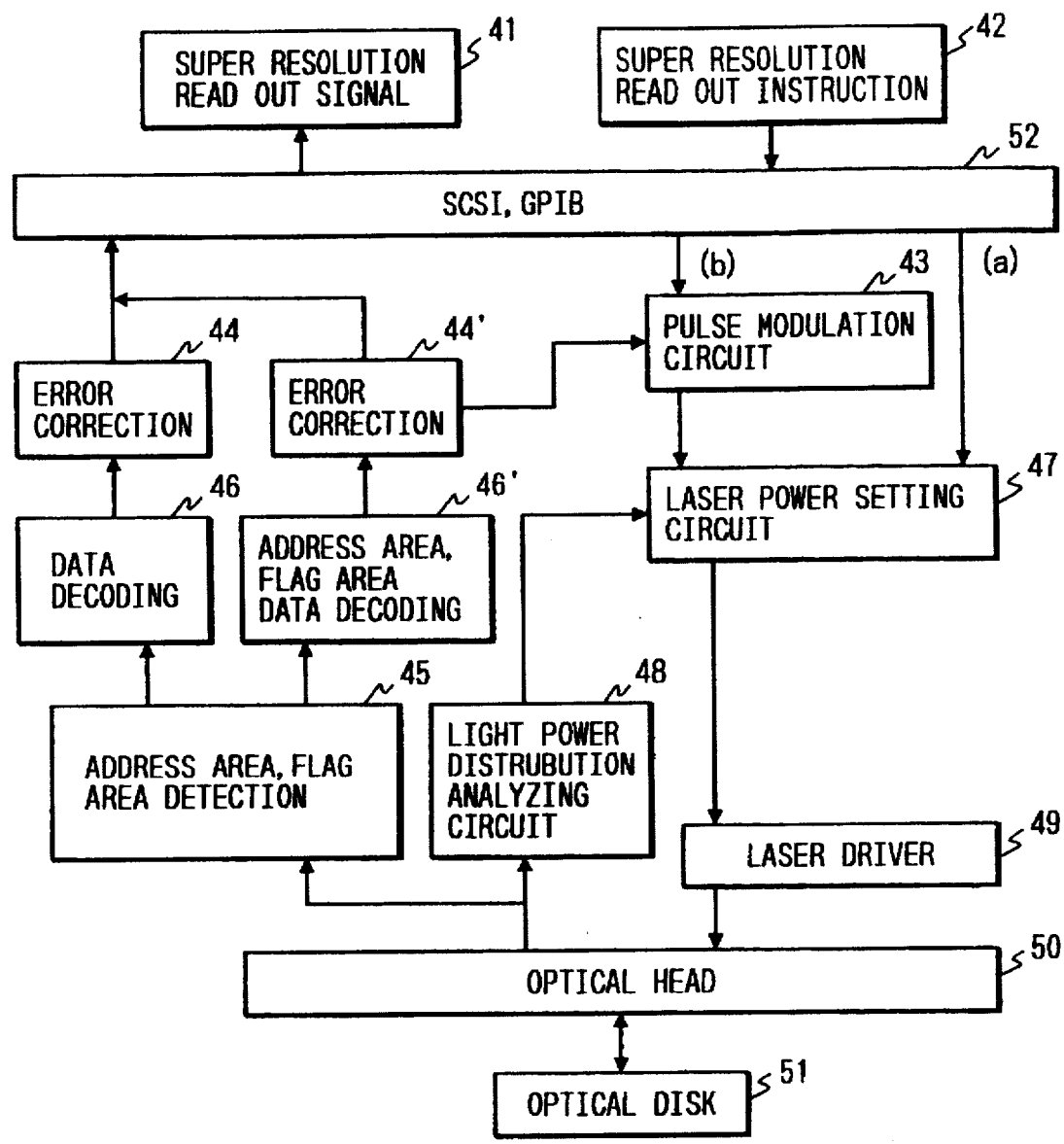

FIG. 14 depicts a block diagram illustrating a superresolution readout system for the superresolution readout apparatus. If a superresolution readout instruction 42 is given in the system, an optical head 50 makes laser beam irradiation. The head 50 also detects a beam reflected by an optical disc 51.

If the continuous laser beam is used, a subsystem (a) in the figure is employed. If the pulsed laser beam is used, a subsystem (b) in the figure is employed with a pulse modulation circuit 43 inserted therein. Synchronization of the pulsed laser beam is made through a address area and flag area detection 45.

To obtain high superresolution readout characteristics, a laser power setting circuit 47 keeps relationship between the laser power Pt for tracking and automatic focusing and the one Pr for superresolution readout as given below.

$$Pr/Pt \geq 2.$$

To keep the high melting point component in solid phase even at a maximum temperature of the superresolution readout film without melting the whole film, a light power distribution anaylyzing circuit 48 detects and analyzes disorder of power distribution of the reflected light during laser beam irradiation. A circuit is built in the laser power setting circuit 47 to control the laser beam power depending on the disorder. The system could make hard deterioration of the superresolution readout film.

The disorder of light power distribution refered to above is change of the disorder of light power distribution with respect to time, that is, change of ratio of detector outputs with respect to time. The disorder of light power distribution was detected in a way that two or more detectors are arranged in one or two dimensions in virtually parallel to the recording medium, and the detector outputs was connected to the light power distribution anaylyzing circuit 48.

To prevent the superresolution readout film from deteriorating, the pulsed superresolution readout laser beam was used. With this, ratio, a:$\lambda$/NA, of trackingward length of a center portion of the aperture along to tracks, a, to laser spot diameter, $\lambda$/NA, could be made ⅓ to ½. For the disc having micro-marks, the overlapped area of the light spot was not less than 30% in a range of 0.4 $\lambda$/NA≦vT. Effect of the superresolution readout laser beam made to pulse was little. It was found that the marks were skipped in a range of vT≦1.5 $\lambda$/NA.

Figure 7:
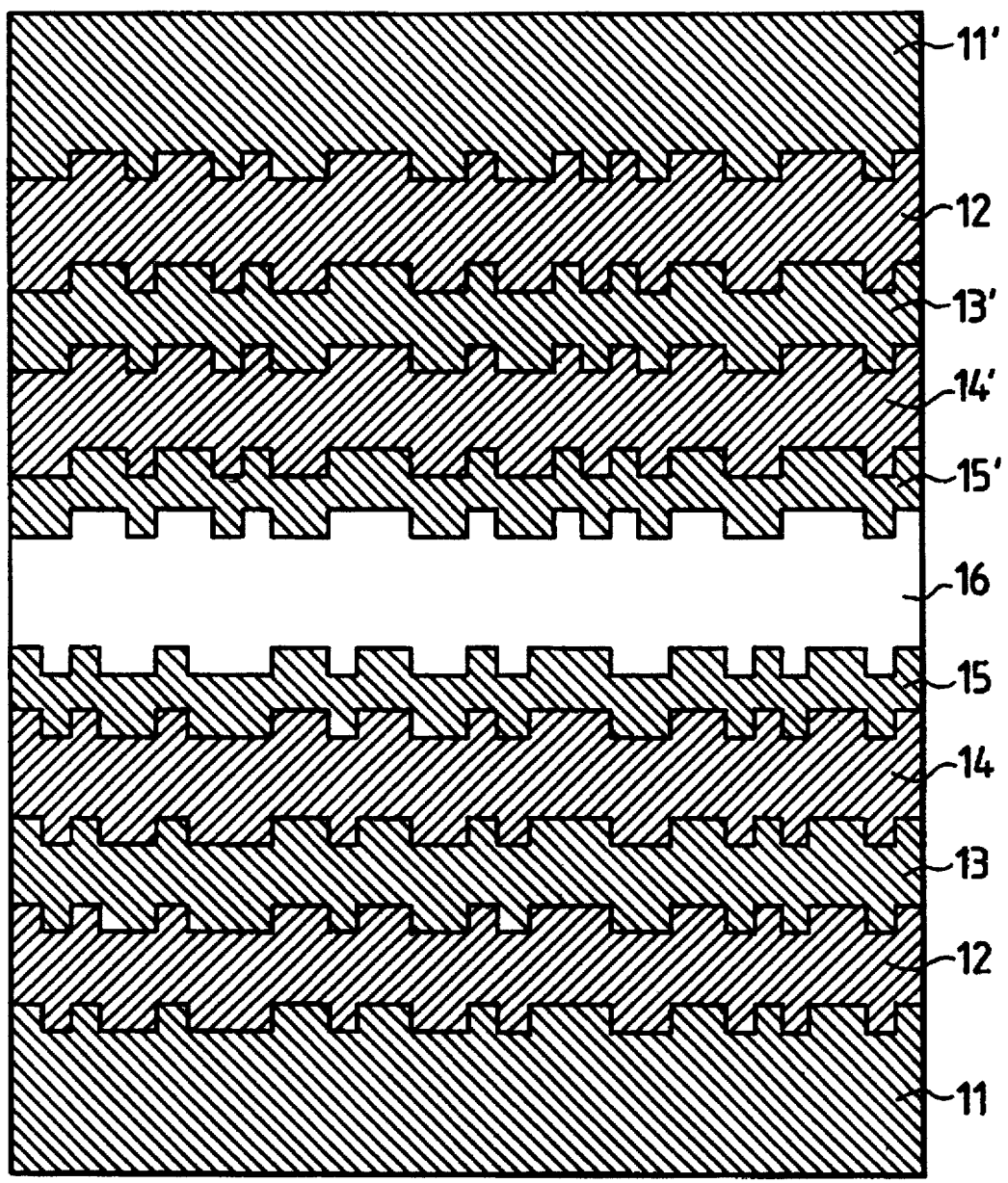
FIG. 7 is a cross-sectional structure illustrating a superresolution readout disc in an embodiment according to the present invention.

To make superresolution readout of the marks secure, a circuit meeting the equations given below was built in the pulse modulation circuit 43 shown in FIG. 14.

$$0.4\ \lambda/NA \leq vT \leq 1.5\ \lambda/NA$$

and $$0.3\ k \leq x/T \leq 0.5k$$

where k is a proportion constant, which was 1 when the laser beam power and the line speed were 8 mW and 8 m/sec, respectively, for the disc of structure in FIG. 7. As a result, the C/N obtained was 46 dB. The C/N was further increased by 2 dB when the following equations were met.

$$0.5\ \lambda/NA \leq vT \leq 0.9\ \lambda/NA$$

and $$0.3\ k \leq x/T \leq 0.5k$$

Embodiment 16

Figure 9:
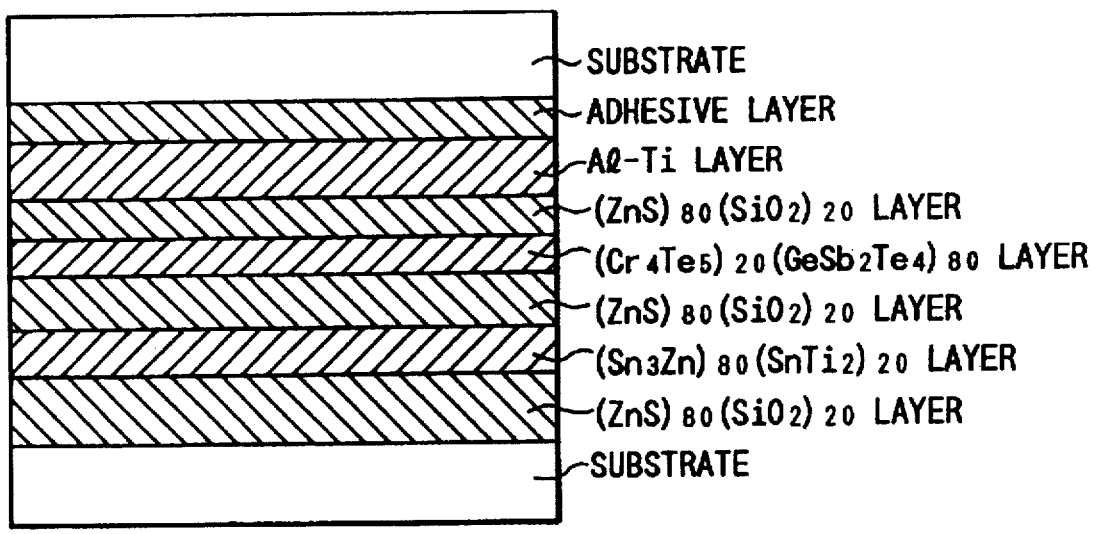
FIG. 9 is a cross-sectional structure illustrating an information recording medium in an embodiment according to the present invention.

FIG. 9 depicts a structural cross-section illustrating an example of readable and writable disc having the superresolution readout film of the present invention used therein. Embodiment 16 used the superresolution readout film having the mean composition of the general representation (8) mentioned above.

First, the inventors formed a substrate of 13 cm diameter and 1.2 mm thick. The substrate was put in a magnetron sputtering apparatus to form film lamination on the substrate successively. The apparatus is an apparatus having a plurality of targets by which laminated films can be successively formed. The apparatus also is excellent in uniformity and reproductivity of thickness of the films formed. The inventors formed a layer of $(ZnS)_{80}(SiO_2)_{20}$ of 125 nm thick on the substrate with use of the magnetron sputtering apparatus. On that layer a film of $(Sn_3Zn)_{80}(SnTi_2)_{20}$ of 30 nm, a layer of $(ZnS)_{80}(SiO_2)_{20}$, and a layer of $(Cr_4Te_5)_{20}(GeSb_2Te_4)_{80}$ of 30 nm thick were formed. Further, on that layer a film of $(ZnS)_{80}(SiO_2)_{20}$ of 20 nm thick and an Al—Ti layer of 100 nm thick were formed successively. After that, the Al—Ti layer had a polycarbonate substrate stuck thereto via an adhesive layer. The disc is of single-side structure. The disc can be made of double-side structure in a way that an additional structure should be made of the same layers in place of the polycarbonate substrate before the two structures should be stuck together through the adhesive layer.

For the area in which superresolution readout is to be made, the laser power was kept at 3 mW. This power differs depending on a melting point of the superresolution readout film. After readout passed beyond the superresolution readout area, the laser power was lowered to 1 mW to allow tracking and automatic focusing. It should be noted that tracking and automatic focusing were made to continue also during superresolution readout.

As the superresolution readout film was crystallized again after superresolution readout, no crystallization was needed.

Embodiment 17

The number of possible superresolution readouts and the C/N of a reproduced signal after $10^5$ times superresolution readouts were changed as listed below when the superresolution readout film of $(Sn_3Zn)_{80}(SnTi_2)_{20}$ as shown in FIG. 9 of embodiment 16 had content of Zn kept constant therein.

| Composition | Number of possible superresolution readouts |
|---|---|
| $Sn_{55}Zn_{20}Ti_{25}$ | >2 × $10^6$ times |
| $Sn_{67}Zn_{20}Ti_{13}$ | 2 × $10^6$ times |
| $Sn_{75}Zn_{20}Ti_5$ | 1 × $10^6$ times |
| $Sn_{80}Zn_{20}$ | 5 × $10^5$ times |

| Composition | C/N of reproduced signal after $10^5$ times superresolution readouts |
|---|---|
| $Sn_{25}Zn_{20}Ti_{55}$ | 44 dB |
| $Sn_{30}Zn_{20}Ti_{50}$ | 46 dB |
| $Sn_{40}Zn_{20}Ti_{40}$ | 48 dB |
| $Sn_{55}Zn_{20}Ti_{25}$ | 50 dB |

We can see from the results that ranges of e and f of the general representation (8) mentioned above are preferably 30≦e≦95 and 5≦f≦50, more preferably 40≦e≦87 and 13≦f≦40, respectively.

Also, the C/N of a reproduced signal after $10^5$ times superresolution readouts was changed as listed below when addition of Tl to the superresolution readout film of $(Sn_3Zn)_{80}(SnTi_2)_{20}$ was changed while contents of Sn, Zn, and Ti were kept constant therein.

| Content of T1 | C/N of reproduced signal after $10^5$ times superresolution readouts |
|---|---|
| g = 0% | 46 dB |
| g = 10% | 48 dB |
| g = 20% | 46 dB |
| g = 25% | 43 dB |

We can see from the results that ranges of g of the general representation (8) mentioned above are preferably $0 \leq g \leq 20$, more preferably $0 \leq g \leq 10$.

Also, it was preferable that high melting point components of combinations of D, D', E, and F, whose D were two elements such as Sn and Zn, including combinations D–E, E–F, and D'–E had no eutectic points or had melting points 150° C. not lower than melting points of D and D–D' even having the eutectic points.

Embodiment 18

The superresolution readout film of Sn—Zn—Ti as shown in FIG. 9 in embodiment 16 can be alternatively replaced by any of materials of the mean composition denoted by the general representation (8) to provide effects similar to the ones mentioned above:

Pb—Se, Pb—Ce, Pb—La, Pb—Pt, Pb—Si, Sn—Sb, Sn—Se, Sn—Co, Sn—Cu, Sn—Ni, Sn—Pt, Bi—Te, Bi—Se, Bi—Ce, Bi—Cu, Bi—Cd, Bi—Pt, Zn—Ni, Zn—Pt, Zn—La, Zn—Ce, Ga—Cr, Ga—Cu, Ga—Ni, Ga—La, Ga—Pt, Ga—Ce, In—Se, In—Sb, In—Te, In—As, In—Mn, In—Ni, In—Ag, Pb—Sn—Se, Pb—Sn—Ce, Pb—Sn—La, Pb—Sn—Pt, Pb—Sn—Si, Pb—Sn—Sb, Pb—Sn—Co, Pb—Sn—Cu, Pb—Sn—Ni, Sn—Bi—Sb, Sn—Bi—Se, Sn—Bi—Co, Sn—Bi—Cu, Sn—Bi—Ni, Sn—Bi—Pt, Sn—Bi—Te, Sn—Bi—Ce, Sn—Bi—Cd, Zn—Sn—Sb, Zn—Sn—Se, Zn—Sn—Co, Zn—Sn—Cu, Zn—Sn—Ni, Zn—Sn—Pt, Zn—Sn—Ni, Zn—Sn—La, Zn—Sn—Ce, Sn—Ga—Sb, Sn—Ga—Se, Sn—Ga—Co, Sb—Ga—Cu, Sn—Ga—Ni, Sn—Ga—Pt, Sn—Ga—Cr, Sn—Ga—La, Sn—Ga—Ce, Bi—Ga—Te, Bi—Ga—Se, Bi—Ga—Cu, Bi—Ga—Cd, Bi—Ga—Pt, Bi—Ga—Cr, Bi—Ga—Ni, Bi—Ga—La, Bi—Ga—Ce, In—Ga—Cr, In—Ga—Cu, In—Ga—Ni, In—Ga—La, In—Ga—Pt, In—Ga—Ce, In—Ga—Se, In—Ga—Sb, In—Ga—Te, In—Ga—As, In—Ga—Mn, In—Ga—Ag, In—Bi—Te, In—Bi—Se, In—Bi—Cu, In—Bi—Cd, In—Bi—Pt, In—Bi—Sb, In—Bi—As, In—Bi—Mn, In—Bi—Ni, In—Bi—Ag, In—Bi—Ce.

Embodiment 19

The superresolution readout film of $(Sn_3Zn)_{80}(SnTi_2)_{20}$ as shown in FIG. 9 in embodiment 16 can be alternatively replaced by any of materials of the mean composition denoted by the general representation (11), such as $Se_{51}In_{40}Cr_9$ containing a high melting component $Cr_3Se_4$ and a phase change component InSe, to provide effects similar to the ones mentioned above. For the C/N of a reproduced signal after $10^5$ times superresolution readouts not lower than 46 dB, preferable ranges of p, q, r and s were $40 \leq p \leq 95$, $0 \leq q \leq 55$, $5 \leq r \leq 50$, and $0 \leq s \leq 20$, respectively. For the C/N of a reproduced signal after $10^5$ times superresolution readouts not lower than 48 dB, more preferable ranges of p, q, r, and s were $50 \leq p \leq 80$, $0 \leq q \leq 40$, $10 \leq r \leq 40$, and $0 \leq s \leq 10$, respectively. The composition could be used for the phase change recording film 28. The composition, also, could be used for the phase change recording film for the recording medium which has no superresolution readout film.

Embodiment 20

The superresolution readout film of Se—In—Cr in embodiment 19 can be alternatively replaced by any of materials of the mean composition denoted by the general representation (11) to provide effects similar to the ones mentioned above:

Se—In—Si, Se—In—Ag, Se—In—Al, Se—In—Ba, Se—In—Ca, Se—In—Cd, Se—In—Co, Se—In—Cu, Se—In—Mg, Se—In—Mn, Se—In—Mo, Se—In—Ni, Se—In—Pd, Se—In—Pt, Se—In—Ta, Se—In—Ti, Se—In—V, Se—In—W, Se—In—Y, Se—In—Pb, Se—Sb—Si, Se—Sb—Ag, Se—Sb—Al, Se—Sb—Ba, Se—Sb—Ca, Se—Sb—Cd, Se—Sb—Co, Se—Sb—Cr, Se—Sb—Cu, Se—Sb—Mg, Se—Sb—Mn, Se—Sb—Mo, Se—Sb—Ni, Se—Sb—Pd, Se—Sb—Pt, Se—Sb—Ta, Se—Sb—Ti, Se—Sb—V, Se—Sb—W, Se—Sb—Y, Se—Sb—Pb, Se—Bi—Si, Se—Bi—Ag, Se—Bi—Al, Se—Bi—Ba, Se—Bi—Ca, Se—Bi—Cd, Se—Bi—Co, Se—Bi—Cr, Se—Bi—Cu, Se—Bi—Mg, Se—Bi—Mn, Se—Bi—Mo, Se—Bi—Ni, Se—Bi—Pd, Se—Bi—Pt, Se—Bi—Ta, Se—Bi—Ti, Se—Bi—V, Se—Bi—W, Se—Bi—Y, Se—Bi—Pb, Se—Te—Si, Se—Te—Ag, Se—Te—Al, Se—Te—Ba, Se—Te—Ca, Se—Te—Cd, Se—Te—Co, Se—Te—Cr, Se—Te—Cu, Se—Te—Mg, Se—Te—Mn, Se—Te—Mo, Se—Te—Ni, Se—Te—Pd, Se—Te—Pt, Se—Te—Ta, Se—Te—Ti, Se—Te—V, Se—Te—W, Se—Te—Y, Se—Te—Pb, Se—Au—Si, Se—Au—Ag, Se—Au—Al, Se—Au—Ba, Se—Au—Ca, Se—Au—Cd, Se—Au—Co, Se—Au—Cr, Se—Au—Cu, Se—Au—Mg, Se—Au—Mn, Se—Au—Mo, Se—Au—Ni, Se—Au—Pd, Se—Au—Pt, Se—Au—Ta, Se—Au—Ti, Se—Au—V, Se—Au—W, Se—Au—Y, Se—Au—Pb, Se—B—Si, Se—B—Ag, Se—B—Al, Se—B—Ba, Se—B—Ca, Se—B—Cd, Se—B—Co, Se—B—Cr, Se—B—Cu, Se—B—Mg, Se—B—Mn, Se—B—Mo, Se—B—Ni, Se—B—Pd, Se—B—Pt, Se—B—Ta, Se—B—Ti, Se—B—V, Se—B—W, Se—B—Y, Se—B—Pb, Se—Cs—Si, Se—Cs—Ag, Se—Cs—Al, Se—Cs—Ba, Se—Cs—Ca, Se—Cs—Cd, Se—Cs—Co, Se—Cs—Cr, Se—Cs—Cu, Se—Cs—Mg, Se—Cs—Mn, Se—Cs—Mo, Se—Cs—Ni, Se—Cs—Pd, Se—Cs—Pt, Se—Cs—Ta, Se—Cs—Ti, Se—Cs—V, Se—Cs—W, Se—Cs—Y, Se—Cs—Pb, Se—Sn—Si, Se—Sn—Ag, Se—Sn—Al, Se—Sn—Ba, Se—Sn—Ca, Se—Sn—Cd, Se—Sn—Co, Se—Sn—Cr, Se—Sn—Cu, Se—Sn—Mg, Se—Sn—Mn, Se—Sn—Mo, Se—Sn—Ni, Se—Sn—Pd, Se—Sn—Pt, Se—Sn—Ta, Se—Sn—Ti, Se—Sn—V, Se—Sn—W, Se—Sn—Y, Se—Sn—Pb, Se—Tl—Si, Se—Tl—Ag, Se—Tl—Al, Se—Tl—Ba, Se—Tl—Ca, Se—Tl—Cd, Se—Tl—Co, Se—Tl—Cr, Se—Tl—Cu, Se—Tl—Mg, Se—Tl—Mn, Se—Tl—Mo, Se—Tl—Ni, Se—Tl—Pd, Se—Tl—Pt, Se—Tl—Ta, Se—Tl—Ti, Se—Tl—V, Se—Tl—W, Se—Tl—Y, Se—Tl—Pb, Se—S—Si, Se—S—Ag, Se—S—Al, Se—S—Ba, Se—S—Ca, Se—S—Cd, Se—S—Co, Se—S—Cr, Se—S—Cu, Se—S—Mg, Se—S—Mn, Se—S—Mo, Se—S—Ni, Se—S—Pd, Se—S—Pt, Se—S—Ta, Se—S—Ti, Se—S—V, Se—S—W, Se—S—Y, Se—S—Pb, Se—Ge—Si, Se—Ge—Ag, Se—Ge—Al, Se—Ge—Ba, Se—Ge—Ca, Se—Ge—Cd, Se—Ge—Co, Se—Ge—Cr, Se—Ge—Cu, Se—Ge—Mg, Se—Ge—Mn, Se—Ge—Mo, Se—Ge—Ni, Se—Ge—Pd, Se—Ge—Pt, Se—Ge—Ta, Se—Ge—Ti, Se—Ge—V, Se—Ge—W, Se—Ge—Y, Se—Ge—Pb, Se—Fe—Si, Se—Fe—Ag, Se—Fe—Al, Se—Fe—Ba, Se—Fe—Ca, Se—Fe—Cd, Se—Fe—Co, Se—Fe—Cr, Se—Fe—Cu, Se—Fe—Mg, Se—Fe—Mn, Se—Fe—Mo, Se—Fe—Ni, Se—Fe—Pd, Se—Fe—Pt, Se—Fe—Ta, Se—Fe—Ti, Se—Fe—V, Se—Fe—W, Se—Fe—Y, Se—Fe—Pb, Se—Zn—Si, Se—Zn—Ag, Se—Zn—Al, Se—Zn—Ba, Se—Zn—Ca, Se—Zn—Cd, Se—Zn—Co, Se—Zn—Cr,

Se—Zn—Cu, Se—Zn—Mg, Se—Zn—Mn, Se—Zn—Mo, Se—Zn—Ni, Se—Zn—Pd, Se—Zn—Pt, Se—Zn—Ta, Se—Zn—Ti, Se—Zn—V, Se—Zn—W, Se—Zn—Y, and Se—Zn—Pb.

Embodiment 21

FIG. 7 depicts a structural cross-section illustrating a disc-like information recording medium for reproduction only having rugged bits engraved on a surface of a substrate.

The disc-like medium was formed in the same way as in embodiment 1 except that the bits are engraved on the surface of the substrate and recording films are used as masking layers 13 and 13'.

That is, the polycarbonate substrates 11 and 11' having data bits on their surfaces have protective layers 12 and 12' of $(ZnS)_{80}(SiO_2)_{20}$ film of 125 nm thick formed thereon, respectively. On the protective layers 12 and 12' island-like $Ag_2Te$ film of 3 nm mean thick (not shown) and masking layers 13 and 13' of $(Ag_2Te)_{30}(Se_{80}-Te_{20})_{70}$ film, or composition of $Ag_{20}Te_{24}Se_{56}$, of around 30 nm are formed, respectively. On the masking layers 13 and 13' are formed intermediate layers 14 and 14' of $(ZnS)_{80}(SiO_2)_{20}$ film of around 25 nm thick, respectively. On the intermediate layers 14 and 14' are formed reflective layers 15 and 15' of $Al_{97}Ti_3$ film of 80 nm thick. The two reflective layers 15 and 15' are stuck together by an adhesive layer 16 of hot-melt adhesive of vinyl chloride-vinyl acetate system.

A reading laser beam is made to come in from the substrate side. The masking layers 13 and 13' have the high melting component $Ag_2Te$ precipitated therein in a form similar to that of embodiment 1 (see FIGS. 1A, 1B, and 1C). The remaining component corresponding to the phase change component 3a in FIGS. 1A, 1B, and 1C is $Se_{80}-Te_{20}$.

(1) Other examples of high melting component

The high melting component precipitated in the masking layers 13 and 13' may be alternatively replaced by any of the materials mentioned in embodiments 1 and 3. Forming the island-like $Ag_2Te$ film can be omitted.

(2) Other examples of remaining component after precipitation of high melting component Parts or all of the remaining component $Se_{80}-Te_{20}$ other than the high melting component may be alternatively replaced by any of materials of at least one of the following main components or any of materials similar to them to obtain characteristics similar to those of the remaining component described above.

Sn, Pb, Sb, Bi, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeSb_2Te_4$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, and $In_2Te_5$.

The remaining components should be preferably metals, compounds, or alloys having melting points not higher than 650° C.

It should be noted that in the superresolution readout, the thickness of the layers can be changed to mask only the area outside the shaded portion in the light spot in a fashion opposite the one in FIG. 8.

If the melting point of the remaining component is 250° C., the characteristics can be made approximate to those as long as that of the high melting point component is not lower than 450° C.

If the record mark length is around 25% of the diameter of the light spot 31, the C/N of the reproduced signal after $10^5$ times superresolution readouts was changed with the change of $\Delta k'$ of the extinction coefficient k of the masking layers 13 and 13' before and after irradiation of the laser beam.

| | C/N of reproduced signal after $10^5$ times superresolution readouts |
|---|---|
| $\Delta k' = 5\%$ | 37 dB |
| $\Delta k' = 10\%$ | 42 dB |
| $\Delta k' = 20\%$ | 46 dB |
| $\Delta k' = 30\%$ | 48 dB |

We can see from the results that the change is preferably in a range of $20\% \leq \Delta k'$.

When the melting point (m.p.) of the remaining component was changed after the high melting point component was precipitated, the C/N of the reproduced signal after $10^5$ times superresolution readouts was changed as follows.

| | C/N of reproduced signal after $10^5$ times superresolution readouts |
|---|---|
| m.p. = 100° C. | 49 dB |
| m.p. = 250° C. | 48 dB |
| m.p. = 400° C. | 47 dB |
| m.p. = 650° C. | 46 dB |
| m.p. = 700° C. | 40 dB |
| m.p. = 750° C. | 33 dB |

We can see from the results that the melting point (m.p.) of the remaining component after precipitation of the high melting point component is preferably not higher than 650° C., more preferably not higher than 250° C.

FIG. 9 depicts an example of information recording medium that can use the superresolution effect in an information reproduction mode of operation. The example of information recording medium is the one of phase change type in embodiment 1 having the masking layer similar to the one in embodiment 4 added thereto.

This disc-shaped medium is structured same as the information recording medium in embodiment 1 except that the recording film has a multi-layer structure. That is, the polycarbonate substrates 1 and 1', like in embodiment 1, are formed protective layers 2 and 2' of $(ZnS)_{80}(SiO_2)_{20}$ film, respectively. On the protective layers 2 and 2' are successively formed the recording films 3 and 3', intermediate layers 4 and 4' of $(ZnS)_{80}(SiO_2)_{20}$ film, and reflective layers 5 and 5' of $Al_{97}Ti_3$ film, respectively. The disks are struck together by sticking reflective layers 5 and 5' together by an adhesive layer 6. The recording film 3' is formed of a masking layer, a dielectric layer, and a recording layer put in this sequence from the substrate 1' side. The recording film 3 is formed in the same fashion as the recording film 3'.

The masking layer has the same composition as in embodiment 21, the composition of $(Ag_2Te)_{30}(Se_{80}Te_{20})_{70}$, that is, $Ag_{20}Te_{24}Se_{56}$. The masking layer provides the same masking feature as in embodiment 21. The dielectric layer is composed of $(ZnS)_{80}(SiO_2)_{20}$ film. The same recording films as the recording films 3 and 3' in embodiment 1 may be alternatively replaced by any of already known recording films of phase change type.

When a record mark of 0.4 μm long was formed at intervals of 0.8 μm, the C/N obtained of the reproduced signal was not less than 46 dB and the erase ratio was not less than 25 dB.

The masking layers provide similar effects for the information recording media of already known phase change type and other information recording media, such as a magneto-optical disc, for recording in principles different from the phase change media of the present invention as well.

The other facts which are not disclosed here are the same as in embodiment 1.

Embodiment 23

A disc-like information recording medium (not shown) in embodiment 23 is structured virtually the same as the one shown in FIG. 3 in embodiment 1 except that the reflective layers 1 and 1' of Al—Ti in embodiment 1 is replaced by the ones that contain such a high melting point component as in the recording films 3 and 3'.

The high melting point component of the reflective layers is the same as in embodiment 1.

The remaining component after precipitation of the high melting point component in the reflective layers is preferably a metal, compound, or alloy having a melting point of not higher than 650° C., having the real part n or the imaginary part k (extinction coefficient) of the complex refractive index changed not less than 20% by irradiation of the laser beam, and having the reflectance R not less than 60% when the real part n and the imaginary part k are high.

When the reflective layers were formed of $(LaBi)_{30}Bi_{70}$ of 80 nm thick, the superresolution effect was obtained in the reproduction mode of operation. When a record mark of 0.4 μm long was written at intervals of 0.8 μm, the C/N obtained of the reproduced signal was not less than 46 dB and the erase ratio was not less than 25 dB. The high melting point component of the $(LaBi)_{30}Bi_{70}$ layer was LaBi, and the phase change component was Bi.

The superresolution effect is obtained in the following principles. As shown in FIG. 8, a high temperature area 35 of a light spot 31 has at least a phase change component Bi of the reflective layer melted to make low at least one of the real part n and the imaginary part k of the complex refractive index. This weakens the reflected light inn an area 33 which serves as a mask in FIG. 8. For the reason, the light reflected from the area 33 cannot provide a contrast enough to read from the recording film.

On the other hand, a low temperature area in a crystallized solid state has higher value of at least one of the real part n and the imaginary part k of the complex refractive index than the high temperature area. For the reason, the light reflected from the area 33 can provide a contrast enough to read.

As a result, as shown in FIG. 8, the mark detection area 34 becomes a crescent shape. It is possible to securely read out the record marks 32 recorded at a density as high as narrower intervals of the distance between the center of marks than diameter of the light spot.

Thicknesses of the layers can be changed to vary the detection area 34.

Examples of other remaining components

Parts or all of Bi which is the remaining component of the high melting point component LaBi may be alternatively replaced by:

Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, Pb—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeSb_2Te_4$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$.

What is claimed is:

1. A superresolution readout thin film formed directly on a substrate or through a protective layer to provide a superresolution effect by irradiation of a readout beam, said superresolution readout thin film comprising at least a phase change component and a high melting point component having a higher melting point than the phase change component, wherein a mean composition thereof is given by:

$$L_jH_k,$$

where L is a low melting point component comprising at least one element and H is a high melting point component comprising at least one element, the high melting point component having a higher melting point than the phase change component, and j and k are amounts of L and H, respectively; and wherein a composition satisfying $20 \leq k/(j+k) \leq 40\%$ is a basic composition, and amounts of each element of L and each element of H are within ±10 atm % of a value determined by the basic composition and said superresolution readout thin film contains precipitates having a relatively higher melting point than the remaining component, said precipitates including at least one element of H;

L is a mixture of $GeSb_2Te_4$ and at least one selected from the group consisting of Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, PB—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, and $Ba_2Tl$, and H is at least one selected from the group consisting of: $BaPd_2$, $BaPd_5$, NdPd, $NdPd_3$, $NdPd_5$, $Nd_7Pt_3$, $Nd_3Pt_2$, NdPt, $Nd_3Pt_4$, $NdPt_2$, $NdPt_5$, $Bi_2Nd$, BiNd, $Bi_3Nd_4$, $Bi_3Nd_5$, $BiNd_2$, $Cd_2Nd$, CdNd, $Mn_2Nd$, $Mn_{23}Nd_6$, $Mn_{12}Nd$, $Ndhd\ 5b_3$, $Nd_4Sb_3$, NdSb, $NdSb_2$, $Fe_2Nd$, $Fe_{17}Nd_2$, $Cs_3Ge_2$, CsGe, $CsGe_4$, $Nd_5Si_3$, $Nd_5Si_4$, NdSi, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3$, $Te_4$, NdTe, $Ce_3Ir$, $Ce_2Ir$, $Ce_{55}Ir_{45}$, $CeIr_2$, $CeIr_3$, $Ce_2Ir_7$, $CeIr_5$, CaPd, $CaPd_2$, CaGe, $Ca_2Ge$, $GeNa_3$, GeNa, $CaSi_2$, $Ca_2Si$, CaSi, $Se_2Sr$, $Se_3Sr_2$, SeSr, $GeSr_2$, GeSr, $Ge_2Sr$, SnSr, $Sn_3Sr_5$, $SnSr_2$, $Ce_2Tl$, $Ce_5Tl_3$, $CeTl_3$, $Ce_3Tl_5$, CeTl, BaTl, $Pd_{13}Tl_9$, $Pd_2Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, CeSe, $Ce_5Se_3$, $Ce_4Ge_3$, $Ce_5Ge_4$, CeGe, $Ce_3Ge_5$, $Ce_5Si_3$, $Ce_3Si_2$, $Ce_5Si_4$, CeSi, $Ce_3Si_5$, $CeSi_2$, $CeTe_3$, $Ce_2Te_5$, $CeTe_2$, $Ce_4Te_7$, $Ce_3Te_4$, CeTe, $La_3Se_7$, $LaSe_2$, $La_4Se_7$, $La_2Se_3$, $La_3Se_4$, LaSe, $GeLa_3$, $Ge_3La_5$, $Ge_3La_4$, $Ge_4La_5$, GeLa, $Ge_5La_3$, $BaSe_2$, $Ba_2Se_3$, BaSe, PdSe, $Mo_3Se_4$, $MoSe_2$, $Ba_2Ge$, BaGe$_2$, BaGe, $Ba_2Te_3$, BaTe, $Ge_2Pd_5$, $GePd_2$, $Ge_9$, $Pd_{25}$, GePd, $Ge_3Pt$, $Ge_3Pt$, $Ge_3Pt_2$, GePt, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$, GeNi, $Ge_3Ni_5$, $Ge_2Ni_5$, $GeNi_3$, $NiTe_{0.85}$, $NiTe_{0.775}$, $Cr_{11}Ge_{19}$, CrGe, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Ge_3Mn_5$, $GeMn_2$, $Mn_6Si$, $Mn_5Si_2$, $Mn_3Si$, $Mn_5Si_2$, $Mn_5Si_3$, MnSi, $Mn_{11}Si_{19}$, $Mn_2Sn$, $Mn_{3.25}Sn$, MnTe, $Te_2W$, $FeGe_2$, $Fe_5Ge_3$, $Fe_3Ge$, $Fe_2Si$, $Fe_5Si_3$, FeSi, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, MoSn, $MoSn_2$, $Mo_3Te_4$, $MoTe_2$, $Si_2Ti$, $SiTi$, $Si_4$, $Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, $CoGe$, $Co_5Ge_3$, $Co_4Ge$, $Co_3Te_4$, $Ge_7Re_3$, $Re_5Si_3$, $ReSi$, $ReSi_2$, and $Re_2Te$.

2. The superresolution readout thin film according to claim 1, wherein the melting point of the low melting point component of the thin film is not higher than 650° C.

3. The superresolution readout thin film according to claim 1, wherein the melting point of the low melting point component of the thin film is not higher than 250° C.

4. The superresolution readout thin film according to claim 1, wherein at least one of the real part and the imaginary part of the complex refractive index of the thin film is changed by not less than 20% by irradiation of the energy beam as compared with one before the irradiation.

5. The superresolution readout thin film according to claim 1, wherein sum of numbers of atoms composing the high melting point component is in a range of 10 to 50% of sum of numbers of all atoms composing the thin film.

6. The superresolution readout thin film according to claim 1, wherein the melting point of the high melting point component is not lower than 780° C.

7. The superresolution readout thin film according to claim 1, wherein difference of the melting point of the high melting point component from the melting point of the low melting point component of the thin film is not smaller than 150° C.

8. The superresolution readout thin film according to claim 1, wherein the high melting point component is precipitated in a columnar shape or a granular shape.

9. The superresolution readout thin film according to claim 1, wherein the high melting point component is precipitated in a porous state.

10. The superresolution readout thin film according to claim 1, wherein both of the low melting point component and the high melting point component contain a metal element or a semi-metal element by not less than 50 atm %.

11. An information recording medium comprising a superresolution readout thin film provided on a substrate, said superresolution readout thin film comprising at least a phase change component and a high melting point component having a higher melting point than the phase change component, wherein a mean composition thereof is given by:

$$L_j H_k,$$

where L is a low melting point component comprising at least one element and H is a high melting point component comprising at least one element, the high melting point component having a higher melting point than the phase change component, and j and k are amounts of L and H, respectively, and wherein a composition satisfying $20 \leq k/(j+k) \leq 40\%$ is a basic composition, and amounts of each element of L and each element of H are within $\pm 10$ atm % of a value determined by the basic composition and said superresolution readout thin film contains precipitates having a relatively higher melting point than the remaining component, said precipitates including at least one element of H;

L is a mixture of $GeSb_2Te_4$ and at least one selected from the group consisting of Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, PB—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, and $Ba_2Tl$, and H is at least one selected from the group consisting of: $BaPd_2$, $BaPd_5$, NdPd, $NdPd_3$, $NdPd_5$, $Nd_3Pt_3$, $Nd_3Pt_2$, NdPt, $Nd_3Pt_4$, $NdPt_2$, $NdPt_5$, $Bi_2Nd$, BiNd, $Bi_3Nd_4$, $Bi_3Nd_5$, $BiNd_2$, $Cd_2Nd$, CdNd, $Mn_2Nd$, $Mn_{23}Nd_6$, $Mn_{12}Nd$, $Nd_5Sb_3$, $Nd_4Sb_3$, NdSb, $NdSb_2$, $Fe_2Nd$, $Fe_{17}Nd_2$, $Cs_3Ge_2$, CsGe, $CsGe_4$, $Nd_5Si_3$, $Nd_5Si_4$, NdSi, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3$, $Te_4$, NdTe, $Ce_3Ir$, $Ce_2Ir$, $Ce_{55}Ir_{45}$, $CeIr_2$, $CeIr_3$, $Ce_2Ir_7$, $CeIr_5$, CaPd, $CaPd_2$, CaGe, $Ca_2Ge$, $GeNa_3$, GeNa, $CaSi_2$, $Ca_2Si$, CaSi, $Se_2Sr$, $Se_3Sr_2$, SeSr, $GeSr_2$, GeSr, $Ge_2Sr$, SnSr, $Sn_3Sr_5$, $SnSr_2$, $Ce_2Tl$, $Ce_5Tl_3$, $CeTl_3$, $Ce_3Tl_5$, CeTl, BaTl, $Pd_{13}Tl_9$, $Pd_2Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, CeSe, $Ce_5Se_3$, $Ce_4Ge_3$, $Ce_5Ge_4$, CeGe, $Ce_3Ge_5$, $Ce_5Si_3$, $Ce_3Si_2$, $Ce_5Si_4$, CeSi, $Ce_3Si_5$, $CeSi_2$, $CeTe_3$, $Ce_2Te_5$, $CeTe_2$, $Ce_4Te_7$, $Ce_3Te_4$, CeTe, $La_3Se_7$, $LaSe_2$, $La_4Se_7$, $La_2Se_3$, $La_3Se_4$, LaSe, $GeLa_3$, $Ge_3La_3$, $Ge_3La_4$, $Ge_4La_5$, GeLa, $Ge_5La_3$, $BaSe_2$, $Ba_2Se_3$, BaSe, PdSe, $Mo_3Se_4$, $MoSe_2$, $Ba_2Ge$, $BaGe_2$, BaGe, $Ba_2Te_3$, BaTe, $Ge_2Pd_5$, $GePd_2$, $Ge_9$, $Pd_{25}$, GePd, $Ge_3Pt$, $Ge_3Pt$, $Ge_3Pt_2$, GePt, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$. GeNi, $Ge_3Ni_5$, $Ge_2Ni_5$, $GeNi_3$, $NiTe_{0.85}$, $NiTe_{0.775}$, $Cr_{11}Ge_{19}$, CrGe, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Ge_3Mn_5$, $GeMn_2$, $Mn_6Si$, $Mn_9Si_2$, $Mn_3Si$, $Mn_5Si_2$, $Mn_5Si_3$, MnSi, $Mn_{11}Si_{19}$, $Mn_2Sn$, $Mn_{3.25}Sn$, MnTe, $Te_2W$, $FeGe_2$, $Fe_5Ge_3$, $Fe_3Ge$, $Fe_2Si$, $Fe_5Si_3$, FeSi, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, MoSn, $MoSn_2$, $Mo_3Te_4$, $MoTe_2$, $Si_2Ti$, $SiTi$, $Si_4$, $Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, $CoGe$, $Co_5Ge_3$, $Co_4Ge$, $Co_3Te_4$, $Ge_7Re_3$, $Re_5Si_3$, $ReSi$, $ReSi_2$, and $Re_2Te$.

12. The information recording medium according to claim 11, wherein the substrate is transparent and has concavities or convexities for recording information, and the superresolution readout thin film has a reflective layer formed thereon.

13. The information recording medium according to claim 11, wherein the substrate is transparent and has concavities or convexities for recording information, and a protective layer is provided between the transparent substrate and the superresolution readout thin film.

14. The information recording medium according to claim 11, further comprising an intermediate layer provided on the superresolution readout thin film and a reflective layer provided on the intermediate layer.

15. The information recording medium according to claim 11, wherein the substrate is transparent, an information recording film is provided on said superresolution readout thin film and a reflective layer is provided on said information recording film.

16. The information recording medium according to claim 11, wherein the substrate is transparent and a protective layer is provided between the transparent substrate and the superresolution readout thin film.

17. The information recording medium according to claim 11, further comprising an information recording layer provided on said superresolution readout thin film, a reflective layer provided on said information recording layer, and an intermediate layer provided between at least one of said information recording layer and said superresolution readout thin film, and said reflective layer and said information recording layer.

18. A superresolution readout apparatus comprising an information recording medium, said recording medium comprising a superresolution readout thin film provided on a substrate; and an optical head for irradiating a laser beam to the information recording medium and detecting a reflected light; wherein said superresolution readout thin film comprises:
at least a phase change component and a high melting point component having a higher melting point than the phase change component, wherein a mean composition thereof is given by:

$$L_j H_k,$$

where L is a low melting point component comprising at least one element and H is a high melting point component comprising at least one element, the high melting point component having a higher melting point than the phase change component, and j and k are amounts of L and H, respectively, and wherein a composition satisfying $20 \leq k/(j+k) \leq 40\%$ is a basic composition, and amounts of each element of L and each element of H are within $\pm 10$ atm % of a value determined by the basic composition and said superresolution readout thin film contains precipitates having a relatively higher melting point than the remaining component, said precipitates including at least one element of H;

L is a mixture of $GeSb_2Te_4$ and at least one selected from the group consisting of Sn, Pb, Sb, Te, Zn, Cd, Se, In, Ga, S, Tl, Mg, $Tl_2Se$, TlSe, $Tl_2Se_3$, $Tl_3Te_2$, TlTe, InBi, $In_2Bi$, TeBi, Tl—Se, Tl—Te, PB—Sn, Bi—Sn, Se—Te, S—Se, Bi—Ga, Sn—Zn, Ga—Sn, Ga—In, $In_3SeTe_2$, $AgInTe_2$, $GeSb_4Te_7$, $Ge_2Sb_2Te_5$, $GeBi_4Te_7$, $GeBi_2Te_4$, $Ge_3Bi_2Te_6$, $Sn_2Sb_6Se_{11}$, $Sn_2Sb_2Se_5$, $SnSb_2Te_4$, $Pb_2Sb_6Te_{11}$, $CuAsSe_2$, $Cu_3AsSe_3$, $CuSbS_2$, $CuSbSe_2$, InSe, $Sb_2Se_3$, $Sb_2Te_3$, $Bi_2Te_3$, SnSb, FeTe, $Fe_2Te_3$, $FeTe_2$, ZnSb, $Zn_3Sb_2$, $VTe_2$, $V_5Te_8$, $AgIn_2$, BiSe, InSb, $In_2Te$, $In_2Te_5$, $Ba_4Tl$, $Cd_{11}Nd$, $Ba_{13}Tl$, $Cd_6Nd$, and $Ba_2Tl$, and H is at least one selected from the group consisting of: $BaPd_2$, $BaPd_5$, NdPd, $NdPd_3$, $NdPd_5$, $Nd_7Pt_3$, $Nd_3Pt_2$, NdPt, $Nd_3Pt_4$, $NdPt_2$, $NdPt_5$, $Bi_2Nd$, BiNd, $Bi_3Nd_4$, $Bi_3Nd_5$, $BiNd_2$, $Cd_2Nd$, CdNd, $Mn_2Nd$, $Mn_{23}Nd_6$, $Mn_{12}Nd$, $Nd_5Sb_3$, $Nd_4Sb_3$, NdSb, $NdSb_2$, $Fe_2Nd$, $Fe_{17}Nd_2$, $Cs_3Ge_2$, CsGe, $CsGe_4$, $Nd_5Si_3$, $Nd_5Si_4$, NdSi, $Nd_3Si_4$, $Nd_2Si_3$, $Nd_5Si_9$, $Cs_2Te$, $NdTe_3$, $Nd_2Te_5$, $NdTe_2$, $Nd_4Te_7$, $Nd_2Te_3$, $Nd_3$, $Te_4$, NdTe, $Ce_3Ir$, $Ce_2Ir$, $Ce_{55}Ir_{45}$, $CeIr_2$, $CeIr_3$, $Ce_2Ir_7$, $CeIr_5$, CaPd, $CaPd_2$, CaGe, $Ca_2Ge$, $GeNa_3$, GeNa, $CaSi_2$, $Ca_2Si$, CaSi, $Se_2Sr$, $Se_3Sr_2$, SeSr, $GeSr_2$, GeSr, $Ge_2Sr$, SnSr, $Sn_3Sr_5$, $SnSr_2$, $Ce_2Tl$, $Ce_5Tl_3$, $CeTl_3$, $Ce_3Tl_5$, CeTl, BaTl, $Pd_{13}Tl_9$, $Pd_2Tl$, $Pd_3Tl$, $Mg_2Si$, $Mg_2Ge$, $BaPd_2$, $BaPd_5$, $Ce_4Se_7$, $Ce_3Se_4$, $Ce_2Se_3$, CeSe, $Ce_5Se_3$, $Ce_4Ge_3$, $Ce_5Ge_4$, CeGe, $Ce_3Ge_5$, $Ce_5Si_3$, $Ce_3Si_2$, $Ce_5Si_4$, CeSi, $Ce_3Si_5$, $CeSi_2$, $CeTe_3$, $Ce_2Te_5$, $CeTe_2$, $Ce_4Te_7$, $Ce_3Te_4$, CeTe, $La_3Se_7$, $LaSe_2$, $La_4Se_7$, $La_2Se_3$, $La_3Se_4$, LaSe, $GeLa_3$, $Ge_3La_5$, $Ge_3La_4$, $Ge_4La_5$, GeLa, $Ge_5La_3$, $BaSe_2$, $Ba_2Se_3$, BaSe, PdSe, $Mo_3Se_4$, $MoSe_2$, $Ba_2Ge$, $BaGe_2$, BaGe, $Ba_2Te_3$, BaTe, $Ge_2Pd_5$, $GePd_2$, $Ge_9$, $Pd_{25}$, GePd, $Ge_3Pt$, $Ge_3Pt$, $Ge_3Pt_2$, GePt, $Ge_2Pt_3$, $GePt_2$, $GePt_3$, $Pu_3Sn$, $Pu_5Sn_3$, $Pu_5Sn_4$, $Pu_8Sn_7$, $Pu_7Sn_8$, $PuSn_2$, $PuSn_3$, $Pt_5Te_4$, $Pt_4Te_5$, $PtTe_2$, GeNi, $Ge_3Ni_5$, $Ge_2Ni_5$, $GeNi_3$, $NiTe_{0.85}$, $NiTe_{0.775}$, $Cr_{11}Ge_{19}$, CrGe, $Cr_{11}Ge_8$, $Cr_5Ge_3$, $Cr_3Ge$, $CrSi_2$, $Cr_5Si_3$, $Cr_3Si$, $Cr_5Te_8$, $Cr_4Te_5$, $Cr_3Te_4$, $Ge_3Mn_5$, $GeMn_2$, $Mn_6Si$, $Mn_9Si_2$, $Mn_3Si$, $Mn_5Si_2$, $Mn_5Si_3$, MnSi, $Mn_{11}Si_{19}$, $Mn_2Sn$, $Mn_{3.25}Sn$, MnTe, $Te_2W$, $FeGe_2$, $Fe_5Ge_3$, $Fe_3Ge$, $Fe_2Si$, $Fe_5Si_3$, FeSi, $FeSi_2$, $Ge_2Mo$, $Ge_{41}Mo_{23}$, $Ge_{16}Mo_9$, $Ge_{23}Mo_{13}$, $Ge_3Mo_5$, $GeMo_3$, $Mo_3Si$, $Mo_5Si_3$, $MoSi_2$, MoSn, $MoSn_2$, $Mo_3Te_4$, $MoTe_2$, $Si_2Ti$, SiTi, $Si_4$, $Ti_5$, $Si_3Ti_5$, $SiTi_3$, $Sn_5Ti_6$, $Sn_3Ti_5$, $SnTi_2$, $SnTi_3$, $CoGe_2$, $Co_5Ge_7$, CoGe, $Co_5Ge_3$, $Co_4Ge$, $Co_3Te_4$, $Ge_7Re_3$, $Re_5Si_3$, ReSi, $ReSi_2$, and $Re_2Te$.

19. A superresolution readout apparatus according to claim 18, further comprising means for detecting a disturbance of power distribution of the reflected light during superresolution readout, and means for controlling the power of the laser beam in response to the disturbance.

20. A superresolution readout apparatus according to claim 18 the laser beam is pulsating light, and relationships $$0.4 \, \lambda/NA \leq vT \, 1.5 \, \lambda/NA,$$

and $$0.3 \, k \leq x/T \leq 0.5k$$

are met, where k is a proportion constant, T is a period of the laser pulses, v is the linear velocity, $\lambda/NA$ is the spot diameter, and x is the pulse width.

21. A superresolution readout apparatus according to claim 18, further comprising means for setting an output power of the laser beam at which the whole superresolution readout thin film cannot be melted even in a region of maximum temperatures thereof.

* * * * *

UNITED STATES PATENT AND TRADEMARK OFFICE
CERTIFICATE OF CORRECTION

PATENT NO. : 5,709,978
DATED : January 20, 1998
INVENTOR(S) : Hirotsune et al.

It is certified that error appears in the above-identified patent and that said Letters Patent is hereby corrected as shown below:

On the title page

Item "[75] Inventors:"

Akemi Hirotsune, Higashimurayama should be corrected as follows:

Akemi Hirotsune, Higashimurayama-shi

Motoyasu Terao, Nishitama-gun is correct as is; and

Yasushi Miyauchi, Akishima should be corrected as follows:

Yasushi Miyauchi, Akishima-shi

Claims

In Claim 1: column 68, end of line 53 & beginning of line 54, delete "$Ge_9Pd_{25}$," and insert $Ge_9Pd_{25}$, In Claim 1: column 69, line 1, delete "$Si_4Ti_5$," and insert $Si_4Ti_5$, In Claim 11: column 70, end of line 27 & beginning of line 28, delete "$Ge_9Pd_{25}$," and insert $Ge_9Pd_{25}$, In Claim 11: column 70, line 39, delete "$Si_4Ti_5$," and insert $Si_4Ti_5$, In Claim 18: column 72, end of line 14 & beginning of line 15, delete "$Ge_9Pd_{25}$," and insert $Ge_9Pd_{25}$, In Claim 18: column 72, line 26, delete "$Si_4Ti_5$," and insert $Si_4Ti_5$, Signed and Sealed this First Day of September, 1998

*Attest:*

*Attesting Officer*

BRUCE LEHMAN

*Commissioner of Patents and Trademarks*